US012783304B2

(12) United States Patent
Crabtree et al.

(10) Patent No.: US 12,783,304 B2
(45) Date of Patent: Nov. 3, 2026

(54) RISK PROFILING AND RATING OF EXTENDED RELATIONSHIPS USING ONTOLOGICAL DATABASES

(71) Applicant: QOMPLX LLC, Reston, VA (US)

(72) Inventors: Jason Crabtree, Vienna, VA (US); Andrew Sellers, Monument, CO (US)

(73) Assignee: QOMPLX LLC, Reston, VA (US)

( * ) Notice: Subject to any disclaimer, the term of this patent is extended or adjusted under 35 U.S.C. 154(b) by 0 days.

(21) Appl. No.: 18/444,759

(22) Filed: Feb. 18, 2024

(65) Prior Publication Data

US 2024/0241752 A1 Jul. 18, 2024

Related U.S. Application Data

(63) Continuation of application No. 17/088,387, filed on Nov. 3, 2020, which is a continuation-in-part of
(Continued)

(51) Int. Cl.
*G06F 9/50* (2006.01)
*G06N 5/025* (2023.01)
(Continued)

(52) U.S. Cl.
CPC ........... *G06F 9/5011* (2013.01); *G06N 5/025* (2013.01); *G06Q 10/067* (2013.01);
(Continued)

(58) Field of Classification Search
CPC ........... G06Q 10/0672; G06Q 10/0674; G06Q 30/02011; G06Q 30/020112;
(Continued)

(56) References Cited

U.S. PATENT DOCUMENTS

| | | | |
|---|---|---|---|
| 6,256,544 | B1 | 7/2001 | Weissinger |
| 7,171,515 | B2 | 1/2007 | Ohta et al. |

(Continued)

FOREIGN PATENT DOCUMENTS

| | | | |
|---|---|---|---|
| WO | 2014159150 | A1 | 10/2014 |
| WO | 2017075543 | A1 | 5/2017 |

*Primary Examiner* — Kavita Stanley
*Assistant Examiner* — Cao D Vuong
(74) *Attorney, Agent, or Firm* — NK Patent Law

(57) ABSTRACT

A system and method for understanding and analyzing risk for use in business and financial decisions. The system and method allow a user to query an individual or business and return a profile and a rating associated with the risk of that entity. The profile consists of an advanced temporospatial weighted and directional knowledge graph that is generated by ingesting, processing, and transforming a vast amount of complex data for the purpose of human comprehension and further system analysis. Meanwhile, the rating is generated from a risk analysis algorithm that conducts a comprehensive analysis by categorizing and weighting all available risk factors. The system and method provide advanced insights and analytics into the inherent state, value, and risk associated with an entity and its relations, geographies, industry sectors, and/or the like.

16 Claims, 42 Drawing Sheets

Related U.S. Application Data application No. 16/945,698, filed on Jul. 31, 2020, now abandoned, which is a continuation-in-part of application No. 16/864,133, filed on Apr. 30, 2020, now Pat. No. 11,494,665, which is a continuation-in-part of application No. 15/847,443, filed on Dec. 19, 2017, now abandoned, which is a continuation-in-part of application No. 15/790,457, filed on Oct. 23, 2017, now Pat. No. 10,884,999, which is a continuation-in-part of application No. 15/790,327, filed on Oct. 23, 2017, now Pat. No. 10,860,951, which is a continuation-in-part of application No. 15/616,427, filed on Jun. 7, 2017, now abandoned, and a continuation-in-part of application No. 15/141,752, filed on Apr. 28, 2016, now Pat. No. 10,860,962, which is a continuation-in-part of application No. 15/091,563, filed on Apr. 5, 2016, now Pat. No. 10,204,147, and a continuation-in-part of application No. 14/986,536, filed on Dec. 31, 2015, now Pat. No. 10,210,255, and a continuation-in-part of application No. 14/925,974, filed on Oct. 28, 2015, now abandoned, said application No. 15/847,443 is a continuation-in-part of application No. 15/616,427, filed on Jun. 7, 2017, now abandoned, which is a continuation-in-part of application No. 14/925,974, filed on Oct. 28, 2015, now abandoned, said application No. 15/847,443 is a continuation-in-part of application No. 15/489,716, filed on Apr. 17, 2017, now abandoned, which is a continuation-in-part of application No. 15/409,510, filed on Jan. 18, 2017, now abandoned, which is a continuation-in-part of application No. 15/379,899, filed on Dec. 15, 2016, now abandoned, which is a continuation-in-part of application No. 15/376,657, filed on Dec. 13, 2016, now Pat. No. 10,402,906, which is a continuation-in-part of application No. 15/237,625, filed on Aug. 15, 2016, now Pat. No. 10,248,910, which is a continuation-in-part of application No. 15/206,195, filed on Jul. 8, 2016, now abandoned, which is a continuation-in-part of application No. 15/186,453, filed on Jun. 18, 2016, now abandoned, which is a continuation-in-part of application No. 15/166,158, filed on May 26, 2016, now abandoned, which is a continuation-in-part of application No. 15/141,752, filed on Apr. 28, 2016, now Pat. No. 10,860,962, said application No. 16/945,698 is a continuation-in-part of application No. 16/915,176, filed on Jun. 29, 2020, now abandoned, which is a continuation-in-part of application No. 15/847,443, filed on Dec. 19, 2017, now abandoned, and a continuation-in-part of application No. 15/891,329, filed on Feb. 7, 2018, now abandoned, which is a continuation-in-part of application No. 15/860,980, filed on Jan. 3, 2018, now abandoned, which is a continuation-in-part of application No. 15/850,037, filed on Dec. 21, 2017, now abandoned, which is a continuation-in-part of application No. 15/489,716, filed on Apr. 17, 2017, now abandoned, and a continuation-in-part of application No. 15/673,368, filed on Aug. 9, 2017, now abandoned, which is a continuation-in-part of application No. 15/376,657, filed on Dec. 13, 2016, now Pat. No. 10,402,906, said application No. 15/860,980 is a continuation-in-part of application No. 15/788,002, filed on Oct. 19, 2017, now abandoned, which is a continuation-in-part of application No. 15/787,601, filed on Oct. 18, 2017, now Pat. No. 10,860,660, which is a continuation-in-part of application No. 15/616,427, filed on Jun. 7, 2017, now abandoned, said application No. 16/915,176 is a continuation-in-part of application No. 15/905,041, filed on Feb. 26, 2018, now Pat. No. 10,706,063, which is a continuation-in-part of application No. 15/237,625, filed on Aug. 15, 2016, now Pat. No. 10,248,910, said application No. 16/945,698 is a continuation-in-part of application No. 15/931,534, filed on May 13, 2020, now abandoned, which is a continuation-in-part of application No. 16/777,270, filed on Jan. 30, 2020, now Pat. No. 11,025,674, which is a continuation-in-part of application No. 16/720,383, filed on Dec. 19, 2019, now Pat. No. 10,944,795, which is a continuation-in-part of application No. 15/823,363, filed on Nov. 27, 2017, now Pat. No. 10,560,483, which is a continuation-in-part of application No. 15/725,274, filed on Oct. 4, 2017, now Pat. No. 10,609,079, which is a continuation-in-part of application No. 15/655,113, filed on Jul. 20, 2017, now Pat. No. 10,735,456, which is a continuation-in-part of application No. 15/616,427, filed on Jun. 7, 2017, now abandoned, said application No. 15/931,534 is a continuation-in-part of application No. 15/683,765, filed on Aug. 22, 2017, now abandoned, which is a continuation-in-part of application No. 15/409,510, filed on Jan. 18, 2017, now abandoned, said application No. 15/931,534 is a continuation-in-part of application No. 16/718,906, filed on Dec. 18, 2019, now Pat. No. 11,055,140, which is a continuation of application No. 15/879,182, filed on Jan. 24, 2018, now Pat. No. 10,514,954, which is a continuation-in-part of application No. 15/850,037, filed on Dec. 21, 2017, now abandoned, said application No. 15/931,534 is a continuation-in-part of application No. 15/905,041, filed on Feb. 26, 2018, now Pat. No. 10,706,063, and a continuation-in-part of application No. 16/191,054, filed on Nov. 14, 2018, now Pat. No. 10,681,074, which is a continuation-in-part of application No. 15/655,113, filed on Jul. 20, 2017, now Pat. No. 10,735,456, which is a continuation-in-part of application No. 15/237,625, filed on Aug. 15, 2016, now Pat. No. 10,248,910, said application No. 15/931,534 is a continuation-in-part of application No. 16/654,309, filed on Oct. 16, 2019, now abandoned, which is a continuation-in-part of application No. 15/847,443, filed on Dec. 19, 2017, now abandoned, said application No. 15/931,534 is a continuation-in-part of application No. 16/660,727, filed on Oct. 22, 2019, now Pat. No. 10,938,683, which is a continuation of application No. 15/229,476, filed on Aug. 5, 2016, now Pat. No. 10,454,791, which is a continuation-in-part of application No. 15/206,195, filed on Jul. 8, 2016, now abandoned.

(60) Provisional application No. 62/568,298, filed on Oct. 4, 2017, provisional application No. 62/568,291, filed on Oct. 4, 2017, provisional application No. 62/568,305, filed on Oct. 4, 2017, provisional application No. 62/568,312, filed on Oct. 4, 2017.

(51) Int. Cl.

| | |
|---|---|
| ***G06Q 10/067*** | (2023.01) |
| ***G06Q 30/0201*** | (2023.01) |
| ***G06Q 30/0204*** | (2023.01) |
| ***G06Q 40/04*** | (2012.01) |

(52) U.S. Cl.
CPC ..... *G06Q 30/0201* (2013.01); *G06Q 30/0205* (2013.01); *G06Q 40/04* (2013.01)

(58) Field of Classification Search
CPC ..... G06Q 30/02012; G06Q 30/020121; G06Q 30/020122; G06Q 30/02013; G06Q 30/02014; G06Q 30/020141; G06Q 30/02015; G06Q 30/02016; G06Q 30/02017; G06Q 30/02018; G06Q 10/067; G06Q 30/0201; G06Q 30/0205; G06Q 40/04; G06Q 40/042; G06Q 40/0421; G06Q 40/043; G06Q 40/0431; G06Q 40/0432; G06Q 40/044; G06Q 40/045; G06Q 40/0451; G06Q 40/046; G06Q 40/047; G06Q 40/048; G06Q 40/049; G06Q 40/05; G06Q 40/051; G06Q 40/052; G06Q 40/0525; G06Q 40/053; G06Q 40/054; G06Q 40/0545; G06Q 40/055; G06F 9/5011; G06F 18/29; G06F 16/9024; G06N 5/025; G06N 5/022
See application file for complete search history.

(56) References Cited

U.S. PATENT DOCUMENTS

| | | | | |
|---|---|---|---|---|
| 7,526,425 | B2 * | 4/2009 | Marchisio | G06F 16/3338 707/999.102 |
| 8,132,260 | B1 | 3/2012 | Mayer et al. | |
| 8,429,179 | B1 | 4/2013 | Mirhaji | |
| 9,619,772 | B1 | 4/2017 | Adogla et al. | |
| 9,798,803 | B2 | 10/2017 | Chen et al. | |
| 10,164,995 | B1 | 12/2018 | Fang et al. | |
| 10,810,193 | B1 | 10/2020 | Subramanya et al. | |
| 2005/0000165 | A1 | 1/2005 | Dischinat et al. | |
| 2007/0012161 | A1 | 1/2007 | Lyles | |
| 2008/0172353 | A1 | 7/2008 | Lim et al. | |
| 2009/0164387 | A1 | 6/2009 | Armstrong et al. | |
| 2010/0228693 | A1 | 9/2010 | Dawson et al. | |
| 2010/0280989 | A1 * | 11/2010 | Mehra | G06N 5/022 707/E17.014 |
| 2011/0185432 | A1 | 7/2011 | Sandoval et al. | |
| 2012/0046992 | A1 | 2/2012 | Hu et al. | |
| 2012/0203708 | A1 | 8/2012 | Psota et al. | |
| 2013/0041921 | A1 | 2/2013 | Cooper et al. | |
| 2013/0091539 | A1 | 4/2013 | Khurana et al. | |
| 2013/0104236 | A1 | 4/2013 | Ray et al. | |
| 2013/0347116 | A1 | 12/2013 | Flores et al. | |
| 2014/0040975 | A1 | 2/2014 | Raleigh et al. | |
| 2014/0074826 | A1 | 3/2014 | Cooper et al. | |
| 2014/0359552 | A1 | 12/2014 | Misra et al. | |
| 2015/0073929 | A1 | 3/2015 | Psota et al. | |
| 2015/0127632 | A1 * | 5/2015 | Khaitan | G06F 16/9535 707/755 |
| 2015/0379445 | A1 | 12/2015 | Wang et al. | |
| 2016/0006629 | A1 | 1/2016 | Ianakiev et al. | |
| 2016/0071035 | A1 * | 3/2016 | Chee | G06Q 10/0635 705/7.28 |
| 2016/0125751 | A1 | 5/2016 | Barker et al. | |
| 2016/0179945 | A1 * | 6/2016 | Lastra Diaz | G06F 16/284 707/739 |
| 2016/0275123 | A1 | 9/2016 | Lin et al. | |
| 2016/0350441 | A1 | 12/2016 | Kakrania et al. | |
| 2017/0011037 | A1 | 1/2017 | Qian et al. | |

* cited by examiner

2000

RISK PROFILING AND RATING OF EXTENDED RELATIONSHIPS USING ONTOLOGICAL DATABASES

CROSS-REFERENCE TO RELATED APPLICATIONS

Priority is claimed in the application data sheet to the following patents or patent applications, each of which is expressly incorporated herein by reference in its entirety:

Ser. No. 17/088,387
Ser. No. 16/945,698
Ser. No. 15/141,752
Ser. No. 15/091,563
Ser. No. 14/986,536
Ser. No. 14/925,974
Ser. No. 16/864,133
Ser. No. 15/847,443
Ser. No. 15/616,427
Ser. No. 15/489,716
Ser. No. 15/409,510
Ser. No. 15/379,899
Ser. No. 15/376,657
Ser. No. 15/237,625
Ser. No. 15/206,195
Ser. No. 15/186,453
Ser. No. 15/166,158
Ser. No. 16/915,176
Ser. No. 15/891,329
Ser. No. 15/860,980
Ser. No. 15/850,037
Ser. No. 15/673,368
Ser. No. 15/790,457
Ser. No. 15/788,002
62/568,305
Ser. No. 15/787,601
62/568,312
62/568,298
Ser. No. 15/905,041
Ser. No. 15/931,534
Ser. No. 16/777,270
Ser. No. 16/720,383
Ser. No. 15/823,363
Ser. No. 15/725,274
Ser. No. 15/655,113
Ser. No. 15/790,327
Ser. No. 15/683,765
Ser. No. 16/718,906
Ser. No. 15/879,182
62/568,291
Ser. No. 16/191,054
Ser. No. 16/654,309
Ser. No. 16/660,727
Ser. No. 15/229,476

BACKGROUND OF THE INVENTION

Field of the Invention

The disclosure relates to the field of computer systems for context-based searching, complex knowledge data set development, and artificial intelligence and machine learning driven risk modeling.

Discussion of the State of the Art

Challenges associated with managing and understanding risk for ongoing business relationships and enterprise management are growing. As individuals and corporate entities expand in this increasingly interconnected world so do the complexity of their relationships, ergo their potential risk factors. When it comes to informed decision making in the realm of business or financial relations, interested parties need a full understanding of a counterparty's relative state, value, and risk, including their own risk factors for that matter. The sheer volume of information associated with different individual and corporate entities is overwhelmingly complex and diffuse. The current state of risk management lacks the ability to perform reliable and comprehensive indexing and analysis of all available data pertinent to understanding an organization's risk.

What is needed is a system and method for identifying, profiling, and analyzing an entity's risk associated with second party, third party, and more extended relationships, one that automatically ingests both structured and unstructured data while computing dynamic relational attributes observed and inferred from a plurality of disparate data sources, and includes temporal and geospatial analyses for historical and geographical context.

SUMMARY OF THE INVENTION

A system and method for understanding and analyzing risk for use in business and financial decisions. The system and method allow a user to query an individual or business and return a profile and a rating associated with the risk of that entity. The profile consists of an advanced temporospatial weighted and directional knowledge graph that is generated by ingesting, processing, and transforming a vast amount of complex data for the purpose of human comprehension and further system analysis. Meanwhile, the rating is generated from a risk analysis algorithm that conducts a comprehensive analysis by categorizing and weighting all available risk factors (e.g., industry specific risks, $3^{rd}$ and $4_{th}$ party risk, etc.). The system and method provide advanced insights and analytics into the inherent state, value, and risk associated with an entity and its relations, geographies, industry sectors, and/or the like.

According to a preferred embodiment, a computing system for risk profiling and rating of extended relationships using ontological databases employing a cyber decision platform, the computing system comprising: one or more hardware processors configured for: receiving a natural language query; processing the query through a natural language processing engine to extract a context of the query; sending the query and the context to an ontological database generator; receiving the query and the context; determining whether or not to run the received query and context necessitate the construction of a new ontological database, or if a semantically similar ontological database already exists; conducting an Internet search for information related to the query and the context using a web scraper tool to obtain search results, the search results comprising temporospatial information; receiving heterogeneous data from third party sources to be searched for information related to the query and the context, the result of the search comprising temporospatial information; generating an ontological database of relationships from the search results, the relationships comprising a temporospatial dimension generated from the temporospatial information; analyzing the ontological database for query-related information, the query-related information comprising entities, locations, and topics associated with the subject; wherein the ontological database may be of any subject domain or ontological framework, as resulting from the construction of the database by the ontological database generator using queries and context from a semantic query analyzer; creating a weighted and directed knowledge graph, the weighted and directed knowledge graph comprising nodes representing the entities, locations, and topics associated with the subject and edges representing the relationships to the nodes in relation to the subject or the associated nodes, wherein: each node is assigned a risk value based on relationships in the ontological database, the risk value being based in part on a temporospatial comparative analysis of the temporospatial dimension of the ontological database; and each edge is assigned a probability of influence between the nodes to which it is connected; applying a graph analysis algorithm to identify a plurality of paths within the directed graph; iterating over the nodes and edges in each identified path to determine a probability of occurrence and risk impact associated with that path; and assigning a risk rating to each path identified, based on the probability of occurrence and risk impact associated with that path.

According to a preferred embodiment, a computer-implemented method executed on a cyber decision platform for risk profiling and rating of extended relationships using ontological databases, the computer-implemented method comprising: receiving a natural language query; processing the query through a natural language processing engine to extract a context of the query; sending the query and the context to an ontological database generator; receiving the query and the context; determining whether or not to run the received query and context necessitate the construction of a new ontological database, or if a semantically similar ontological database already exists; conducting an Internet search for information related to the query and the context using a web scraper tool to obtain search results, the search results comprising temporospatial information; receiving heterogeneous data from third party sources to be searched for information related to the query and the context, the result of the search comprising temporospatial information; generating an ontological database of relationships from the search results, the relationships comprising a temporospatial dimension generated from the temporospatial information; analyzing the ontological database for query-related information, the query-related information comprising entities, locations, and topics associated with the subject; wherein the ontological database may be of any subject domain or ontological framework, as resulting from the construction of the database by the ontological database generator using queries and context from a semantic query analyzer; creating a weighted and directed knowledge graph, the weighted and directed knowledge graph comprising nodes representing the entities, locations, and topics associated with the subject and edges representing the relationships to the nodes in relation to the subject or the associated nodes, wherein: each node is assigned a risk value based on relationships in the ontological database, the risk value being based in part on a temporospatial comparative analysis of the temporospatial dimension of the ontological database; and each edge is assigned a probability of influence between the nodes to which it is connected; applying a graph analysis algorithm to identify a plurality of paths within the directed graph; iterating over the nodes and edges in each identified path to determine a probability of occurrence and risk impact associated with that path; and assigning a risk rating to each path identified, based on the probability of occurrence and risk impact associated with that path.

According to a preferred embodiment, a system for risk profiling and rating of extended relationships using ontological databases employing a cyber decision platform, comprising one or more computers with executable instructions that, when executed, cause the system to: receive a natural language query; process the query through a natural language processing engine to extract a context of the query; send the query and the context to an ontological database generator; receive the query and the context; determine whether or not to run the received query and context necessitate the construction of a new ontological database, or if a semantically similar ontological database already exists; conduct an Internet search for information related to the query and the context using a web scraper tool to obtain search results, the search results comprising temporospatial information; receive heterogeneous data from third party sources to be searched for information related to the query and the context, the result of the search comprising temporospatial information; generate an ontological database of relationships from the search results, the relationships comprising a temporospatial dimension generated from the temporospatial information; analyze the ontological database for query-related information, the query-related information comprising entities, locations, and topics associated with the subject; wherein the ontological database may be of any subject domain or ontological framework, as resulting from the construction of the database by the ontological database generator using queries and context from a semantic query analyzer; create a weighted and directed knowledge graph, the weighted and directed knowledge graph comprising nodes representing the entities, locations, and topics associated with the subject and edges representing the relationships to the nodes in relation to the subject or the associated nodes, wherein: each node is assigned a risk value based on relationships in the ontological database, the risk value being based in part on a temporospatial comparative analysis of the temporospatial dimension of the ontological database; and each edge is assigned a probability of influence between the nodes to which it is connected; apply a graph analysis algorithm to identify a plurality of paths within the directed graph; iterate over the nodes and edges in each identified path to determine a probability of occurrence and risk impact associated with that path; and assign a risk rating to each path identified, based on the probability of occurrence and risk impact associated with that path.

According to a preferred embodiment, non-transitory, computer-readable storage media having computer-executable instructions embodied thereon that, when executed by one or more processors of a computing system employing a cyber decision platform for risk profiling and rating of extended relationships using ontological databases, cause the computing system to: receive a natural language query; process the query through a natural language processing engine to extract a context of the query; and send the query and the context to an ontological database generator; receive the query and the context; determine whether or not to run the received query and context necessitate the construction of a new ontological database, or if a semantically similar ontological database already exists; conduct an Internet search for information related to the query and the context using a web scraper tool to obtain search results, the search results comprising temporospatial information; receive heterogeneous data from third party sources to be searched for information related to the query and the context, the result of the search comprising temporospatial information; generate an ontological database of relationships from the search results, the relationships comprising a temporospatial dimension generated from the temporospatial information; analyze the ontological database for query-related information, the query-related information comprising entities, locations, and topics associated with the subject; wherein the ontological database may be of any subject domain or ontological framework, as resulting from the construction of the database by the ontological database generator using queries and context from a semantic query analyzer; create a weighted and directed knowledge graph, the weighted and directed knowledge graph comprising nodes representing the entities, locations, and topics associated with the subject and edges representing the relationships to the nodes in relation to the subject or the associated nodes, wherein: each node is assigned a risk value based on relationships in the ontological database, the risk value being based in part on a temporospatial comparative analysis of the temporospatial dimension of the ontological database; and each edge is assigned a probability of influence between the nodes to which it is connected; and apply a graph analysis algorithm to identify a plurality of paths within the directed graph; iterate over the nodes and edges in each identified path to determine a probability of occurrence and risk impact associated with that path; and assign a risk rating to each path identified, based on the probability of occurrence and risk impact associated with that path.

According to an aspect of an embodiment, the heterogenous data comprises information obtained from governmental databases, legislative actions, and news reports.

According to an aspect of an embodiment, the risk rating is associated with a third-party risk or a fourth-party risk.

According to an aspect of an embodiment, the risk rating is associated with an industry-specific risk.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION OF THE INVENTION

Figure 1:
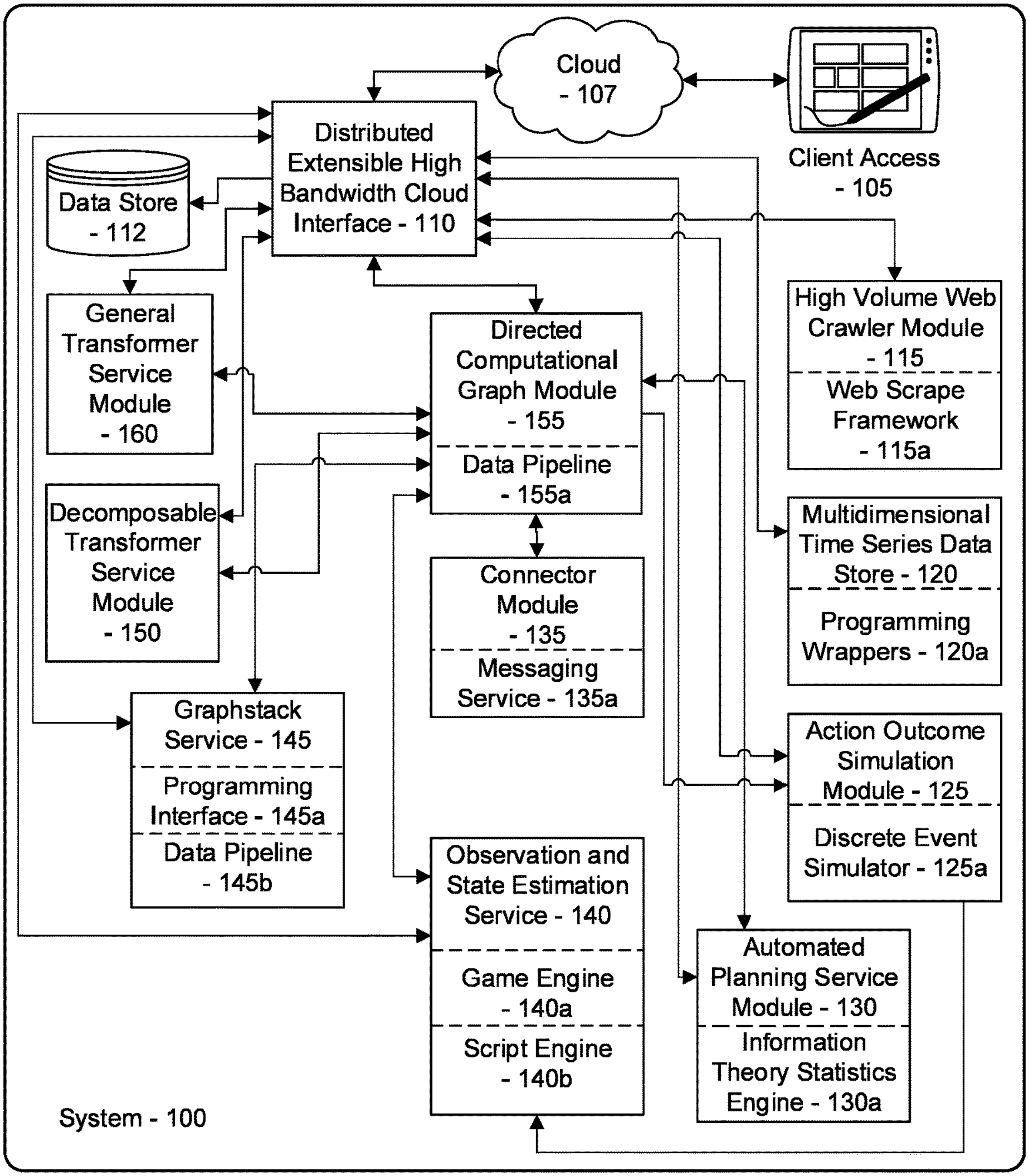
FIG. 1 is a block diagram of an exemplary system architecture for an advanced cyber decision platform.

The inventor has conceived and reduced to practice system and method for understanding and analyzing extended relationship risks for use in business and financial decisions. The system and method allow a user to query an individual or business and returns a profile and a rating associated with the relationship risk of that entity. The profile consists of an advanced temporospatial weighted and directional knowledge graph that is generated by ingesting, processing, and transforming a vast amount of complex data for the purpose of human comprehension and further system analysis. Meanwhile, the rating is generated from a risk analysis algorithm that conducts a comprehensive analysis by categorizing and weighting all available risk factors. The system and method provide advanced insights and analytics into the inherent state, value, and risk associated with an entity and its relations.

The system and method work by receiving a query about an entity and resolving the query through semantic computing. As used herein, semantic computing is the use of natural language processing (NLP) and machine learning to derive context and meaning from the search before converting the search into a structured query that is then used to parse and update ontological databases within the system.

Once the query has been analyzed semantically, the system then pulls information from a variety of available sources using data-extraction, web-scraping, and network reconnaissance techniques. This includes all private, public, and proprietary sources accessible by the system. A comprehension engine, using the same semantic computing techniques, observes and infers primary, secondary, and tertiary relationships and attributes of the entity in question. This data is stored in ontological databases. In some embodiments, the system may use web ontology language (OWL) and financial industry business ontology (FIBO) standards.

Once the ontological databases are created or updated, where the data has been organized into typical ontological data structures e.g., classes, attributes, relations, axioms, etc., a knowledge graph is generated which may be presented to the user for advanced insight and analysis into the risk factors and relationships associated with the queried entity, but also is used by the system to answer additional queries through various procedures. The procedures used by the system to accomplish this may include GraphFrames (e.g., Spark, Jupyter, etc.) and vectorization (e.g., adjacency matrices) of the knowledge graph.

This leads to the risk analysis which can be used to generate a risk score or rating. The system and method use semantics computing and machine learning to generate a risk rating of the queried entity. The first step is to derive context and meaning from each bit of ingested data and the insight from the knowledge graph to identify what type of risk it is and how impactful it is to the entity. Machine learning algorithms assist in determining the impact and severity of the risk by consulting actuarial tables and commercial-off-the-shelf (COTS) modeling tools, and together with the system's semantic computing, assign a summed total of the risk rating. The risk rating scale is customizable but as an example, it may be configured where a negative numerical score means a higher risk, a risk rating of zero is neutral, and a positive numerical rating is of low risk or beneficial relationship to the user.

A few detailed aspects of the system include the ability to use geoJSON data coupled with semantic computing to determine dynamic risks based on market conditions, locality, and sentiment/hype to enable analyses to remain consistent and potentially risk-normalized. Additionally, basic data sets can be extended to include official inquiries as well as internal/external scans, network infrastructure, behavioral, news sources, and interpreted historical and cultural information from sources such as Wikipedia.

On the topic of risk management, another aspect of the system and method is additionally mitigating risk from an actual disruption of services from real-world events by considering regulatory or legislative disruption which can be imposed on organizations. These may comprise societal expectations, observation, validation, and enforcement change, where the actual and near-actual credible histories associated with legal and regulatory action are processed through the system by analyzing bodies of discourse, proposed actions, and realized actions. Salient examples include the Federal Trade Commission actions and the Securities and Exchange Commission actions against Facebook and Equifax. Linking these actions with the nature of public and private (mainly proprietary) discourse and the actual state of the entities and their competitive set from the perspective of establishing industry norms is a critical part of the invention and aids in understanding historical context and the ongoing change of today's daily news cycle and events.

To summarize, the system dynamically comprehends the context and relations of a very large number of data points with relation to a queried entity and then organizes and stores the information in ontological relational databases thus creating comprehensive and holistic data models, from which the system infers and observes risks to produce a weighted and directed temporospatial knowledge graph and risk rating. Additionally, the knowledge graphs generated are not only weighted and directional but attribute temporal and spatial context which may be viewed as independent time-slices, geospatial-slices, or temporospatial-slices, to give historical and geospatial information to the user but also to serve in artificial intelligence and machine learning feedback loops for predictive risk analysis. The risk rating is a comprehensive numerical score generated from a myriad of data points proving near-real time risk analysis for business decisions.

The system and method are equally valuable for counterparty trade negotiations and investors in public or private companies seeking to understand the relative state, value, and risks associated with their holdings. The system and method further integrate holding information such as Carta-like financial information, and combinations of public, private licensed, and proprietary data that when processed together is useful for any interested party to improve the efficacy of their investment, governance, and operational decisions.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

As used herein, "graph" is a representation of information and relationships, where each primary unit of information makes up a "node" or "vertex" of the graph and the relationship between two nodes makes up an edge of the graph. Nodes can be further qualified by the connection of one or more descriptors or "properties" to that node. For example, given the node "James R," name information for a person, qualifying properties might be "183 cm tall," "DOB Aug. 13, 1965" and "speaks English." Similar to the use of properties to further describe the information in a node, a relationship between two nodes that forms an edge can be qualified using a "label." Thus, given a second node "Thomas G," an edge between "James R" and "Thomas G" that indicates that the two people know each other might be labeled "knows." When graph theory notation (Graph=(Vertices, Edges)) is applied this situation, the set of nodes are used as one parameter of the ordered pair, V and the set of 2 element edge endpoints are used as the second parameter of the ordered pair, E. When the order of the edge endpoints within the pairs of E is not significant, for example, the edge James R, Thomas G is equivalent to Thomas G, James R, the graph is designated as "undirected." Under circumstances when a relationship flows from one node to another in one direction, for example James R is "taller" than Thomas G, the order of the endpoints is significant. Graphs with such edges are designated as "directed." In the distributed computational graph system, transformations within transformation pipeline are represented as directed graphs with each transformation comprising a node and the output messages between transformations comprising edges. Distributed computational graph stipulates the potential use of non-linear transformation pipelines which are programmatically linearized. Such linearization can result in exponential growth of resource consumption. The most sensible approach to overcome possibility is to introduce new transformation pipelines just as they are needed, creating only those that are ready to compute. Such method results in transformation graphs which are highly variable in size and node, edge composition as the system processes data streams (and/or bulk data sets). Those familiar with the art will realize that transformation graphs may assume many shapes and sizes with a vast topography of edge relationships and are composable with various sub-graphs or tasks capable of being aggregated inside other graphs/subgraphs. The examples given were chosen for illustrative purposes only and represent a small number of the simplest of possibilities. These examples should not be taken to define the possible graphs expected as part of the operation of the invention.

As used herein, "transformation" is a function performed on zero or more streams of input data which results in a single stream of output which may or may not then be used as input for another transformation. Transformations may comprise any combination of machine, human or machine-human interactions Transformations need not change data that enters them, one example of this type of transformation would be a storage transformation which would receive input and then act as a queue for that data for subsequent transformations. As implied above, a specific transformation may generate output data in the absence of input data. A time stamp serves as an example. In the invention, transformations are placed into pipelines such that the output of one transformation may serve as an input for another. These pipelines can consist of two or more transformations with the number of transformations limited only by the resources of the system. Historically, transformation pipelines have been linear with each transformation in the pipeline receiving input from one antecedent and providing output to one subsequent with no branching or iteration. Other pipeline configurations are possible. The invention is designed to permit several of these configurations including, but not limited to: linear, afferent branch, efferent branch and cyclical.

A "database" or "data storage subsystem" (these terms may be considered substantially synonymous), as used herein, is a system adapted for the long-term storage, indexing, and retrieval of data, the retrieval typically being via some sort of querying interface or language. "Database" may be used to refer to relational database management systems known in the art, but should not be considered to be limited to such systems. Many alternative database or data storage system technologies have been, and indeed are being, introduced in the art, including but not limited to distributed non-relational data storage systems such as Hadoop, column-oriented databases, in-memory databases, document, relational, key-value, column, graph, timeseries, vector, etc. and/or the like. While various aspects may preferentially employ one or another of the various data storage subsystems available in the art (or available in the future), the invention should not be construed to be so limited, as any data storage architecture may be used according to the aspects. Similarly, while in some cases one or more particular data storage needs are described as being satisfied by separate components (for example, an expanded private capital markets database and a configuration database), these descriptions refer to functional uses of data storage systems and do not refer to their physical architecture. For instance, any group of data storage systems of databases referred to herein may be included together in a single database management system operating on a single machine, or they may be included in a single database management system operating on a cluster of machines as is known in the art. Similarly, any single database (such as an expanded private capital markets database) may be implemented on a single machine, on a set of machines using clustering technology, on several machines connected by one or more messaging systems known in the art, or in a master/slave arrangement common in the art. These examples should make clear that no particular architectural approaches to database management is preferred according to the invention, and choice of data storage technology is at the discretion of each implementer, without departing from the scope of the invention as claimed.

A "data context," as used herein, refers to a set of arguments identifying the location of data. This could be a Rabbit queue, a .csv file in cloud-based storage, or any other such location reference except a single event or record. Activities may pass either events or data contexts to each other for processing. The nature of a pipeline allows for direct information passing between activities, and data locations or files do not need to be predetermined at pipeline start.

A "pipeline," as used herein and interchangeably referred to as a "data pipeline" or a "processing pipeline," refers to a set of data streaming activities and batch activities. Streaming and batch activities can be connected indiscriminately within a pipeline. Events will flow through the streaming activity actors in a reactive way. At the junction of a streaming activity to batch activity, there will exist a StreamBatchProtocol data object. This object is responsible for determining when and if the batch process is run. One or more of three possibilities can be used for processing triggers: regular timing interval, every N event, or optionally an external trigger. The events are held in a queue or similar until processing. Each batch activity may contain a "source" data context (this may be a streaming context if the upstream activities are streaming), and a "destination" data context (which is passed to the next activity). Streaming activities may have an optional "destination" streaming data context (optional meaning: caching/persistence of events vs. ephemeral), though this should not be part of the initial implementation.

"Artificial intelligence" or "AI" as used herein means a computer system or component that has been programmed in such a way that it mimics some aspect or aspects of cognitive functions that humans associate with human intelligence, such as learning, problem solving, and decision-making. Examples of current AI technologies include understanding human speech, competing successfully in strategic games such as chess and Go, autonomous operation of vehicles, complex simulations, and interpretation of complex data such as images and video.

"Machine learning" as used herein is an aspect of artificial intelligence in which the computer system or component can modify its behavior or understanding without being explicitly programmed to do so. Machine learning algorithms develop models of behavior or understanding based on information fed to them as training sets, and can modify those models based on new incoming information. An example of a machine learning algorithm is AlphaGo, the first computer program to defeat a human world champion in the game of Go. AlphaGo was not explicitly programmed to play Go. It was fed millions of games of Go, and developed its own model of the game and strategies of play.

"Domain-specific ontology" refers to a hierarchical taxonomy of concepts and their relationships within a particular ontological domain (i.e., a set of reference ideas that establishes context). For example, the word "card" has many different meanings, depending on the ontological domain (context) in which it is used. In the domain of poker, the term "card" would refer to a "playing card" as used in playing the game of poker. In the domain of computer software, the term "card" may refer to the antiquated "punch card" form of information storage. In the domain of computer hardware, the term "card" could refer to a "video card", an "SD card" (a type of memory storage device), or similar pieces of hardware.

"Knowledge graph stack" or "KGS" is used as shorthand to refer to a system for single-tenant or multi-tenant graph databases with dynamic specification and enforcement of ontological data models, although other terms such as system, method, methodology, etc., may be used.

"Ontology" refers to a formal naming and definition of the types, properties, and interrelationships of the entities that exist in a particular domain of discourse. Ontologies are a method of classification of things and their relationships with other things. They are related to, but more flexible than, taxonomies, hierarchies, and class definitions given that relationships between concept entities can be specified. The term ontologies, as used herein, has the meaning associated with information and computer science, rather than the definition used in philosophy of classifying things as they exist in reality.

Conceptual Architecture

FIG. 1 is a block diagram of an advanced cyber decision platform (ACDP) for external network reconnaissance and cybersecurity rating. Client access to the system 105 for specific data entry, system control and for interaction with system output such as automated predictive decision making and planning and alternate pathway simulations, occurs through the system's distributed, extensible high bandwidth cloud interface 110 which uses a versatile, robust web application driven interface for both input and display of client-facing information via network 107 and operates a data store 112 such as, but not limited to MONGODB™, COUCHDB™, CASSANDRA™ or REDIS™ according to various arrangements. Much of the business data analyzed by the system both from sources within the confines of the client business, and from cloud based sources, also enter the system through the cloud interface 110, data being passed to the connector module 135 which may possess the API routines 135*a* needed to accept and convert the external data and then pass the normalized information to other analysis and transformation components of the system, the directed computational graph module 155, high volume web crawler module 115, multidimensional time series database (MDTSDB) 120 and the graph stack service 145. The directed computational graph module 155 retrieves one or more streams of data from a plurality of sources, which includes, but is in no way not limited to, a plurality of physical sensors, network service providers, web based questionnaires and surveys, monitoring of electronic infrastructure, crowdsourcing campaigns, and human input device information. Within the directed computational graph module 155, data may be split into two identical streams in a specialized pre-programmed data pipeline 155*a*, wherein one sub-stream may be sent for batch processing and storage while the other sub-stream may be reformatted for transformation pipeline analysis. The data is then transferred to the general transformer service module 160 for linear data transformation as part of analysis or the decomposable transformer service module 150 for branching or iterative transformations that are part of analysis. The directed computational graph module 155 represents all data as directed graphs where the transformations are nodes and the result messages between transformations edges of the graph. The high volume web crawling module 115 uses multiple server hosted preprogrammed web spiders, which while autonomously configured are deployed within a web scraping framework 115*a* of which SCRAPY™ is an example, to identify and retrieve data of interest from web based sources that are not well tagged by conventional web crawling technology. The multiple dimension time series data store module 120 may receive streaming data from a large plurality of sensors that may be of several different types. The multiple dimension time series data store module may also store any time series data encountered by the system such as but not limited to enterprise network usage data, component and system logs, performance data, network service information captures such as, but not limited to news and financial feeds, and sales and service related customer data. The module is designed to accommodate irregular and high volume surges by dynamically allocating network bandwidth and server processing channels to process the incoming data. Inclusion of programming wrappers 120*a* for languages examples of which are, but not limited to C++, PERL, PYTHON, and ERLANG™ allows sophisticated programming logic to be added to the default function of the multidimensional time series database 120 without intimate knowledge of the core programming, greatly extending breadth of function. Data retrieved by the multidimensional time series database (MDTSDB) 120 and the high volume web crawling module 115 may be further analyzed and transformed into task optimized results by the directed computational graph 155 and associated general transformer service 150 and decomposable transformer service 160 modules. Alternately, data from the multidimensional time series database and high volume web crawling modules may be sent, often with scripted cuing information determining important vertexes 145*a*, to the graph stack service module 145 which, employing standardized protocols for converting streams of information into graph representations of that data, for example, open graph internet technology although the invention is not reliant on any one standard. Through the steps, the graph stack service module 145 represents data in graphical form influenced by any pre-determined scripted modifications 145*a* and stores it in a graph-based data store 145*b* such as GIRAPH™ or a key value pair type data store REDIS™, or RIAK™, among others, all of which are suitable for storing graph-based information.

Results of the transformative analysis process may then be combined with further client directives, and additional business rules and practices relevant to the analysis and situational information external to the already available data in the automated planning service module 130 which also runs powerful information theory 130*a* based predictive statistics functions and machine learning algorithms to allow future trends and outcomes to be rapidly forecast based upon the current system derived results and choosing each a plurality of possible business decisions. Using all available data, the automated planning service module 130 may propose business decisions most likely to result is the most favorable business outcome with a usably high level of certainty. Closely related to the automated planning service module in the use of system derived results in conjunction with possible externally supplied additional information in the assistance of end user business decision making, the action outcome simulation module 125 with its discrete event simulator programming module 125*a* coupled with the end user facing observation and state estimation service 140 which is highly scriptable 140*b* as circumstances require and has a game engine 140*a* to more realistically stage possible outcomes of business decisions under consideration, allows business decision makers to investigate the probable outcomes of choosing one pending course of action over another based upon analysis of the current available data.

When performing external reconnaissance via a network 107, web crawler 115 may be used to perform a variety of port and service scanning operations on a plurality of hosts. This may be used to target individual network hosts (for example, to examine a specific server or client device) or to broadly scan any number of hosts (such as all hosts within a particular domain, or any number of hosts up to the complete IPv4 address space). Port scanning is primarily used for gathering information about hosts and services connected to a network, using probe messages sent to hosts that prompt a response from that host. Port scanning is generally centered around the transmission control protocol (TCP), and using the information provided in a prompted response a port scan can provide information about network and application layers on the targeted host.

Port scan results can yield information on open, closed, or undetermined ports on a target host. An open port indicates that an application or service is accepting connections on this port (such as ports used for receiving customer web traffic on a web server), and these ports generally disclose the greatest quantity of useful information about the host. A closed port indicates that no application or service is listening for connections on that port, and still provides information about the host such as revealing the operating system of the host, which may be discovered by fingerprinting the TCP/IP stack in a response. Different operating systems exhibit identifiable behaviors when populating TCP fields, and collecting multiple responses and matching the fields against a database of known fingerprints makes it possible to determine the OS of the host even when no ports are open. An undetermined port is one that does not produce a requested response, generally because the port is being filtered by a firewall on the host or between the host and the network (for example, a corporate firewall behind which all internal servers operate).

Scanning may be defined by scope to limit the scan according to two dimensions, hosts and ports. A horizontal scan checks the same port on multiple hosts, often used by attackers to check for an open port on any available hosts to select a target for an attack that exploits a vulnerability using that port. This type of scan is also useful for security audits, to ensure that vulnerabilities are not exposed on any of the target hosts. A vertical scan defines multiple ports to examine on a single host, for example a "vanilla scan" which targets every port of a single host, or a "strobe scan" that targets a small subset of ports on the host. This type of scan is usually performed for vulnerability detection on single systems, and due to the single-host nature is impractical for large network scans. A block scan combines elements of both horizontal and vertical scanning, to scan multiple ports on multiple hosts. This type of scan is useful for a variety of service discovery and data collection tasks, as it allows a broad scan of many hosts (up to the entire Internet, using the complete IPv4 address space) for a number of desired ports in a single sweep.

Large port scans involve quantitative research, and as such may be treated as experimental scientific measurement and are subject to measurement and quality standards to ensure the usefulness of results. To avoid observational errors during measurement, results must be precise (describing a degree of relative proximity between individual measured values), accurate (describing relative proximity of measured values to a reference value), preserve any metadata that accompanies the measured data, avoid misinterpretation of data due to faulty measurement execution, and must be well-calibrated to efficiently expose and address issues of inaccuracy or misinterpretation. In addition to these basic requirements, large volumes of data may lead to unexpected behavior of analysis tools and extracting a subset to perform initial analysis may help to provide an initial overview before working with the complete data set. Analysis should also be reproducible, as with all experimental science, and should incorporate publicly-available data to add value to the comprehensibility of the research as well as contributing to a "common framework" that may be used to confirm results.

When performing a port scan, web crawler 115 may employ a variety of software suitable for the task, such as Nmap, ZMap, or masscan. Nmap is suitable for large scans as well as scanning individual hosts, and excels in offering a variety of diverse scanning techniques. ZMap is a newer application and unlike Nmap (which is more general-purpose), ZMap is designed specifically with Internet-wide scans as the intent. As a result, ZMap is far less customizable and relies on horizontal port scans for functionality, achieving fast scan times using techniques of probe randomization (randomizing the order in which probes are sent to hosts, minimizing network saturation) and asynchronous design (utilizing stateless operation to send and receive packets in separate processing threads). Masscan uses the same asynchronous operation model of ZMap, as well as probe randomization. In masscan however, a certain degree of statistical randomness is sacrificed to improve computation time for large scans (such as when scanning the entire IPv4 address space), using the BlackRock algorithm. This is a modified implementation of symmetric encryption algorithm DES, with fewer rounds and modulo operations in place of binary ones to allow for arbitrary ranges and achieve faster computation time for large data sets.

Received scan responses may be collected and processed through a plurality of data pipelines 155*a* to analyze the collected information. MDTSDB 120 and graph stack 145 may be used to produce a hybrid graph/time-series database using the analyzed data, forming a graph of Internet-accessible organization resources and their evolving state information over time. Customer-specific profiling and scanning information may be linked to CPG graphs (as described below in detail, referring to FIG. 11) for a particular customer, but this information may be further linked to the base-level graph of internet-accessible resources and information. Depending on customer authorizations and legal or regulatory restrictions and authorizations, techniques used may involve both passive, semi-passive and active scanning and reconnaissance.

Figure 2:
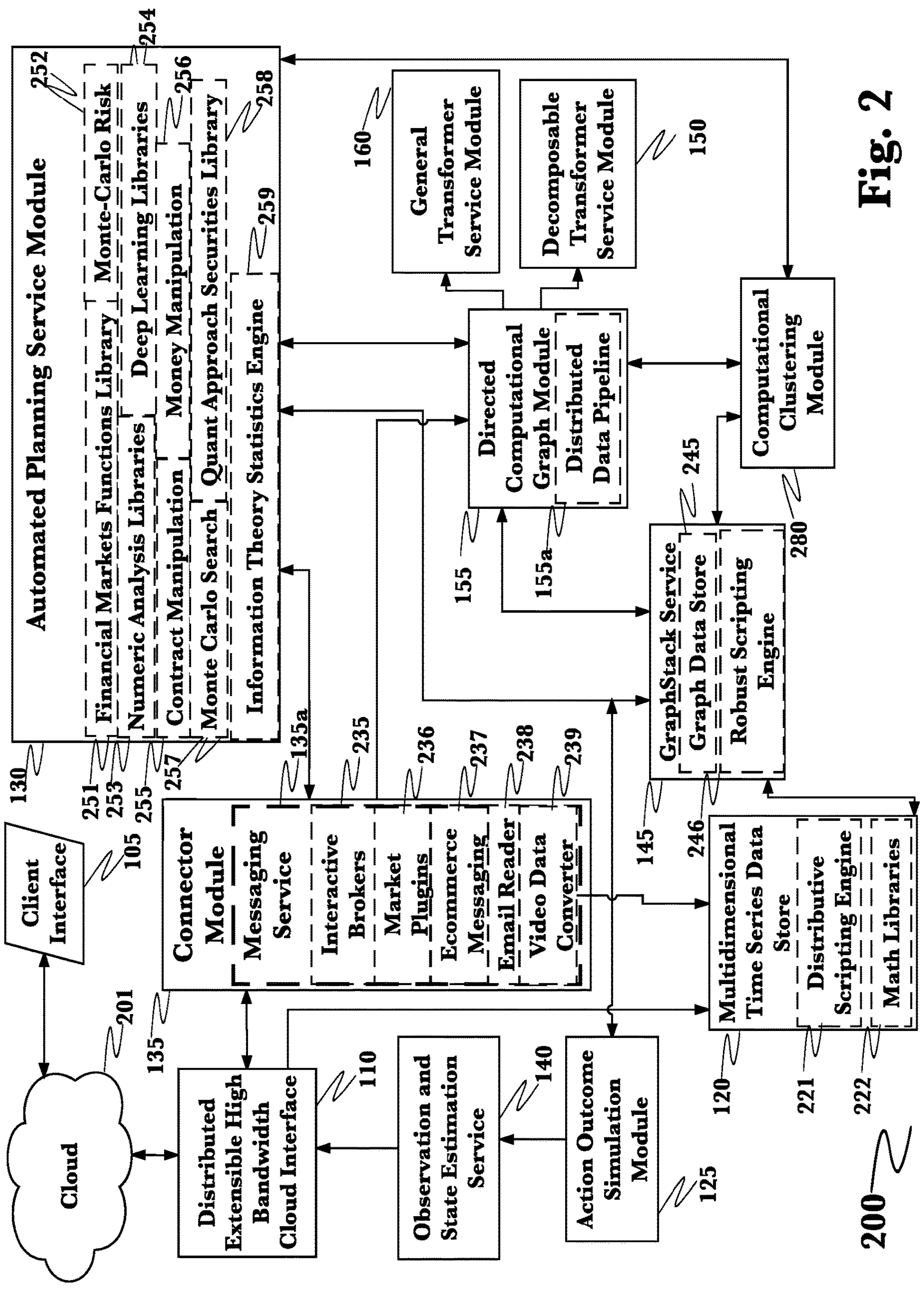
FIG. 2 is a block diagram of an advanced cyber decision platform in an exemplary configuration for use in investment vehicle management.

FIG. 2 is a block diagram of an advanced cyber decision platform in an exemplary configuration for use in investment vehicle management 200. The advanced cyber decision platform 100 previously disclosed in co-pending application Ser. No. 15/141,752 and applied in a role of cybersecurity in co-pending application Ser. No. 15/237,625, when programmed to operate as quantitative trading decision platform, is very well suited to perform advanced predictive analytics and predictive simulations 202 to produce investment predictions. Much of the trading specific programming functions are added to the automated planning service module 130 of the modified advanced cyber decision platform 100 to specialize it to perform trading analytics. Specialized purpose libraries may include but are not limited to financial markets functions libraries 251, Monte-Carlo risk routines 252, numeric analysis libraries 253, deep learning libraries 254, contract manipulation functions 255, money handling functions 256, Monte-Carlo search libraries 257, and quant approach securities routines 258. Pre-existing deep learning routines including information theory statistics engine 259 may also be used. The invention may also make use of other libraries and capabilities that are known to those skilled in the art as instrumental in the regulated trade of items of worth. Data from a plurality of sources used in trade analysis are retrieved, much of it from remote, cloud resident 201 servers through the system's distributed, extensible high bandwidth cloud interface 110 using the system's connector module 135 which is specifically designed to accept data from a number of information services both public and private through interfaces to those service's applications using its messaging service 135*a* routines, due to ease of programming, are augmented with interactive broker functions 235, market data source plugins 236, e-commerce messaging interpreters 237, business-practice aware email reader 238 and programming libraries to extract information from video data sources 239.

Other modules that make up the advanced cyber decision platform may also perform significant analytical transformations on trade related data. These may include the multidimensional time series data store 120 with its robust scripting features which may include a distributive friendly, fault-tolerant, real-time, continuous run prioritizing, programming platform such as, but not limited to Erlang/OTP 221 and a compatible but comprehensive and proven library of math functions of which the $C^{++}$ math libraries are an example 222, data formalization and ability to capture time series data including irregularly transmitted, burst data; the GraphStack service 145 which transforms data into graphical representations for relational analysis and may use packages for graph format data storage such as Titan 245 or the like and a highly interface accessible programming interface an example of which may be Akka/Spray, although other, similar, combinations may equally serve the same purpose in this role 246 to facilitate optimal data handling; the directed computational graph module 155 and its distributed data pipeline 155*a* supplying related general transformer service module 160 and decomposable transformer module 150 which may efficiently carry out linear, branched, and recursive transformation pipelines during trading data analysis may be programmed with multiple trade related functions involved in predictive analytics of the received trade data. Both possibly during and following predictive analyses carried out by the system, results must be presented to clients 105 in formats best suited to convey both important results for analysts to make highly informed decisions and, when needed, interim or final data in summary and potentially raw for direct human analysis. Simulations which may use data from a plurality of field spanning sources to predict future trade conditions these are accomplished within the action outcome simulation module 125. Data and simulation formatting may be completed or performed by the observation and state estimation service 140 using its ease of scripting and gaming engine to produce optimal presentation results.

In cases where there are both large amounts of data to be cleansed and formalized and then intricate transformations such as those that may be associated with deep machine learning, first disclosed in ¶067 of co-pending application Ser. No. 14/925,974, predictive analytics and predictive simulations, distribution of computer resources to a plurality of systems may be routinely required to accomplish these tasks due to the volume of data being handled and acted upon. The advanced cyber decision platform employs a distributed architecture that is highly extensible to meet these needs. A number of the tasks carried out by the system are extremely processor intensive and for these, the highly integrated process of hardware clustering of systems, possibly of a specific hardware architecture particularly suited to the calculations inherent in the task, is desirable, if not required for timely completion. The system includes a computational clustering module 280 to allow the configuration and management of such clusters during application of the advanced cyber decision platform. While the computational clustering module is drawn directly connected to specific co-modules of the advanced cyber decision platform these connections, while logical, are for ease of illustration and those skilled in the art will realize that the functions attributed to specific modules of an embodiment may require clustered computing under one use case and not under others. Similarly, the functions designated to a clustered configuration may be role, if not run, dictated. Further, not all use cases or data runs may use clustering.

Figure 2A:
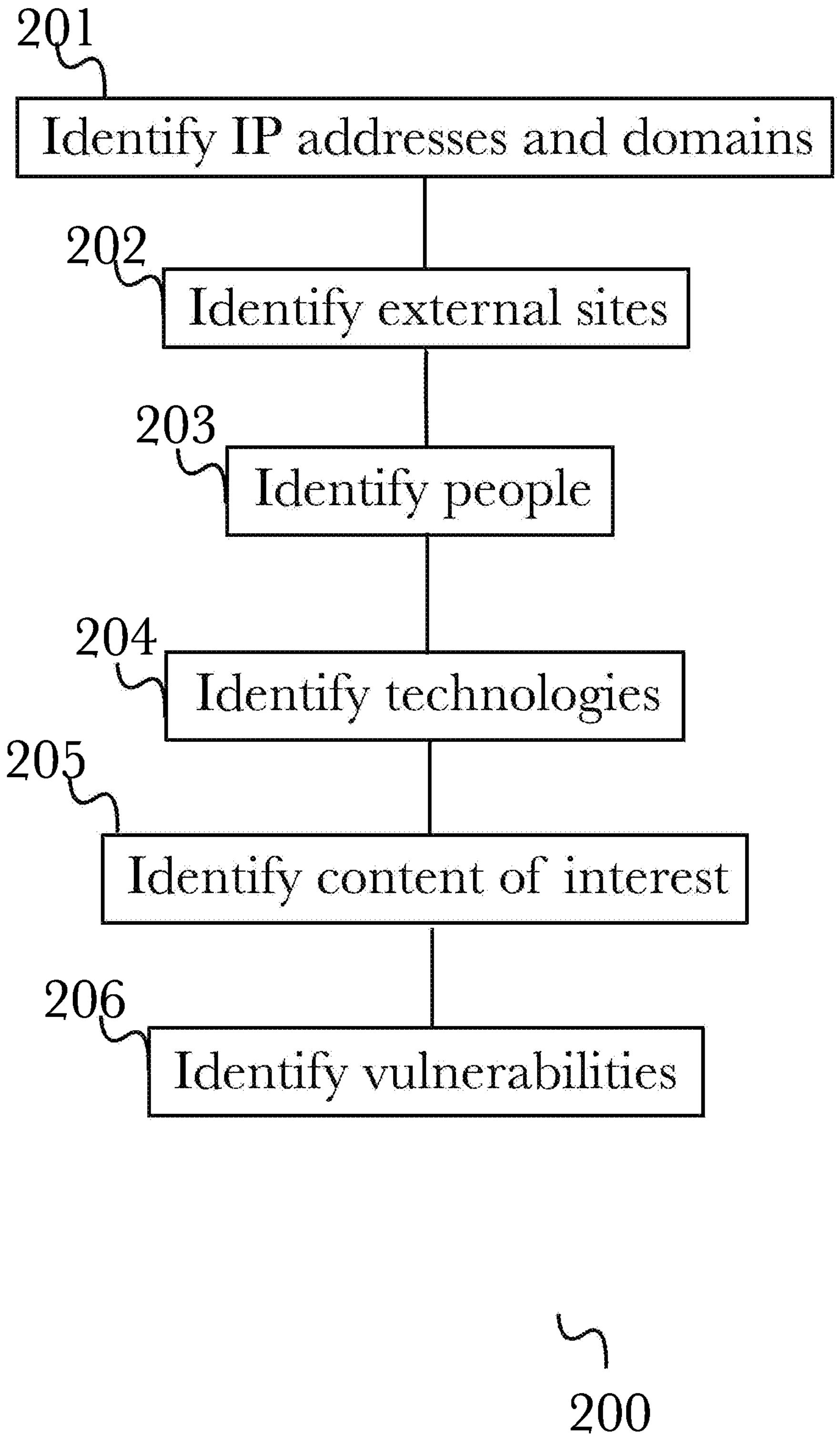
FIG. 2A is a block diagram showing general steps for performing passive network data collection.

FIG. 2A is a block diagram showing general steps 200 for performing passive network reconnaissance. It should be appreciated that the steps illustrated and described may be performed in any order, and that steps may be added or omitted as needed for any particular reconnaissance operation. In a step 201, network address ranges and domains or sub-domains associated with a plurality of targets may be identified, for example to collect information for defining the scope of further scanning operations. In another step 202, external sites may be identified to understand relationships between targets and other third-party content providers, such as trust relationships or authoritative domain name service (DNS) resolution records. In another step 203, individual people or groups may be identified using names, email addresses, phone numbers, or other identifying information that may be useful for a variety of social engineering activities. In another step 204, technologies used may be identified, such as types or versions of hardware or software used by an organization, and this may include collecting and extracting information from job descriptions (for example) to identify technologies in use by an organization (for example, a job description for an administrator familiar with specific database software indicates that the software is in use within the organization). In another step 205, content of interest may be identified, for example including web and email portals, log files, backup or archive files, and other forms of sensitive information that may be contained within HTML comments or client-side scripts, as may be useful for vulnerability discovery and penetration testing activities. In another step 206, publicly-available information may be used to identify vulnerabilities that may be exploited with further active penetration testing.

Figure 2B:
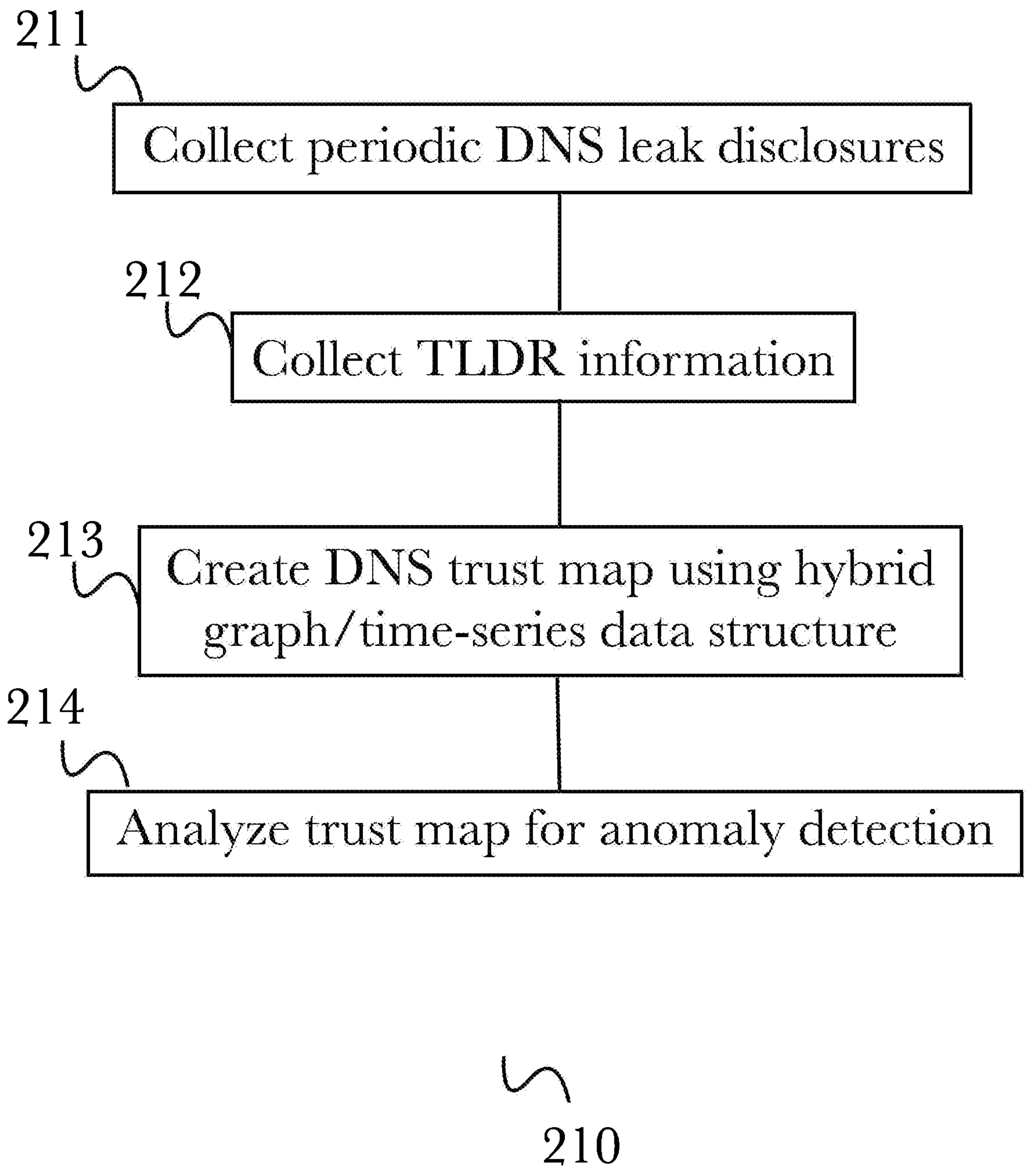
FIG. 2B is a process diagram showing a general flow of a process for performing active reconnaissance using DNS leak information collection.

FIG. 2B is a process diagram showing a general flow of a process 210 for performing active reconnaissance using DNS leak information collection. In an initial step 211, publicly-available DNS leak disclosure information may be collected to maintain current information regarding known leaks and vulnerabilities. In a next step 212, third-level domain (TLDR) information may be collected and used to report domain risk factors, such as domains that do not resolve properly (due to malformed DNS records, for example). In a next step 213, a DNS trust map may be created using a hybrid graph/time-series data structure, using a graph stack service 145 and MDTSDB 120. This trust map may be produced as the output of an extraction process performed by a DCG 155 through a plurality of data pipelines 155*a*, analyzing collected data and mapping data points to produce hybrid structured output representing each data point over time. In a final step 214, the trust map may then be analyzed to identify anomalies, for example using community detection algorithms that may discover when new references are being created, and this may be used to identify vulnerabilities that may arise as a byproduct of the referential nature of a DNS hierarchy. In this manner, DCG pipeline processing and time-series data graphing may be used to identify vulnerabilities that would otherwise be obscured within a large dataset.

Figure 2C:
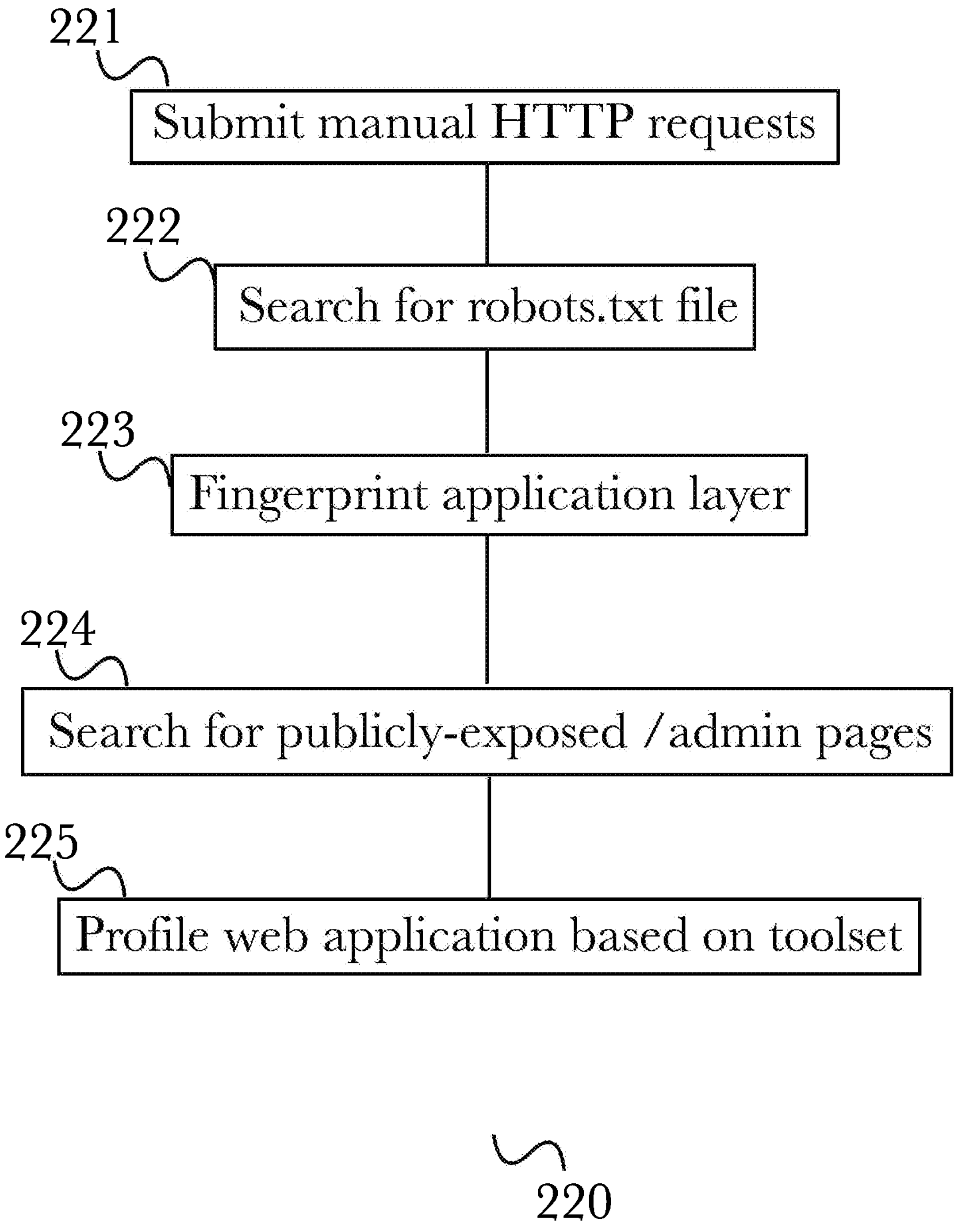
FIG. 2C is a process diagram showing a general flow of a process for performing active reconnaissance using web application and technology reconnaissance.

FIG. 2C is a process diagram showing a general flow of a process 220 for performing active reconnaissance using web application and technology reconnaissance. In an initial step 221, a plurality of manual HTTP requests may be transmitted to a host, for example to determine if a web server is announcing itself, or to obtain an application version number from an HTTP response message. In a next step 222, a robots.txt, used to identify and communicate with web crawlers and other automated "bots," may be searched for to identify portions of an application or site that robots are requested to ignore. In a next step 223, the host application layer may be fingerprinted, for example using file extensions and response message fields to identify characteristic patterns or markers that may be used to identify host or application details. In a next step 224, publicly-exposed /admin pages may be checked, to determine if any administrative portals are exposed and therefore potentially-vulnerable, as well as to potentially determine administration policies or capabilities based on exposed information. In a final step 225, an application may be profiled according to a particular toolset in use, such as WORDPRESS™ (for example) or other specific tools or plugins.

Figure 2D:
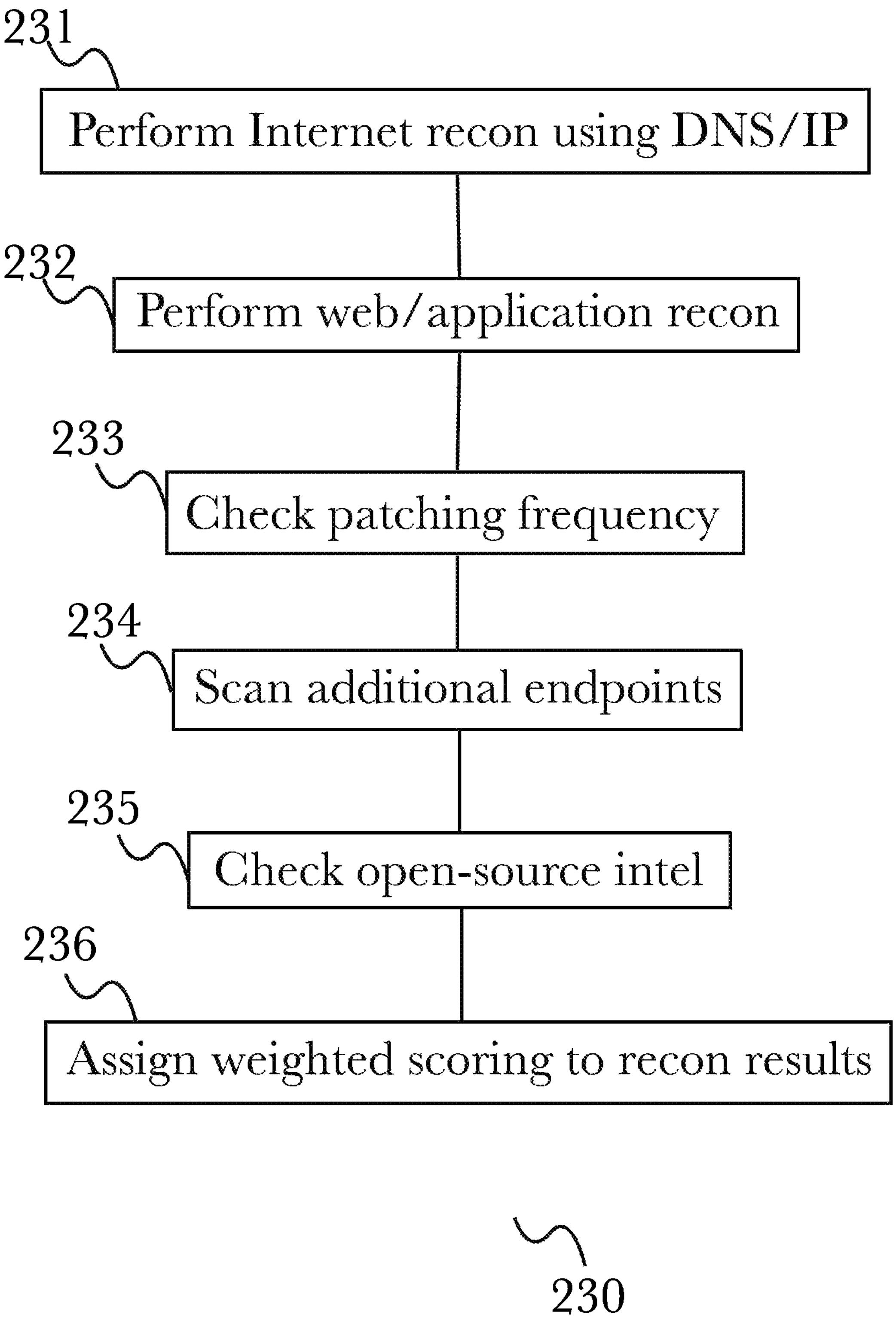
FIG. 2D is a process diagram showing a general flow of a process for producing a cybersecurity rating using reconnaissance data.

FIG. 2D is a process diagram showing a general flow of a process 230 for producing a cybersecurity rating using reconnaissance data. In an initial step 231, external reconnaissance may be performed using DNS and IP information as described above (referring to FIG. 2B), collecting information from DNS records, leak announcements, and publicly-available records to produce a DNS trust map from collected information and the DCG-driven analysis thereof. In a next step 232, web and application recon may be performed (as described in FIG. 2C), collecting information on applications, sites, and publicly-available records. In a next step 233, collected information over time may be analyzed for software version numbers, revealing the patching frequency of target hosts and their respective applications and services. Using a hybrid time-series graph, timestamps may be associated with ongoing changes to reveal these updates over time. In a next step 234, a plurality of additional endpoints may be scanned, such as (for example, including but not limited to) internet-of-things (IoT) devices that may be scanned and fingerprinted, end-user devices such as personal smartphones, tablets, or computers, or social network endpoints such as scraping content from user social media pages or feeds. User devices may be fingerprinted and analyzed similar to organization hosts, and social media content may be retrieved such as collecting sentiment from services like TWITTER™ or LINKEDIN™, or analyzing job description listings and other publicly-available information. In a next step 235, open-source intelligence feeds may be checked, such as company IP address blacklists, search domains, or information leaks (for example, posted to public records such as PASTEBIN™). In a final step 236, collected information from all sources may be scored according to a weighted system, producing an overall cybersecurity rating score based on the information collected and the analysis of that information to reveal additional insights, relationships, and vulnerabilities.

For example, in an exemplary scoring system similar to a credit rating, information from initial Internet recon operations may be assigned a score up to 400 points, along with up to 200 additional points for web/application recon results, 100 points for patch frequency, and 50 points each for additional endpoints and open-source intel results. This yields a weighted score incorporating all available information from all scanned sources, allowing a meaningful and readily-appreciable representation of an organization's overall cybersecurity strength. Additionally, as scanning may be performed repeatedly and results collected into a time-series hybrid data structure, this cybersecurity rating may evolve over time to continuously reflect the current state of the organization, reflecting any recent changes, newly-discovered or announced vulnerabilities, software or hardware updates, newly-added or removed devices or services, and any other changes that may occur.

Figure 3A:
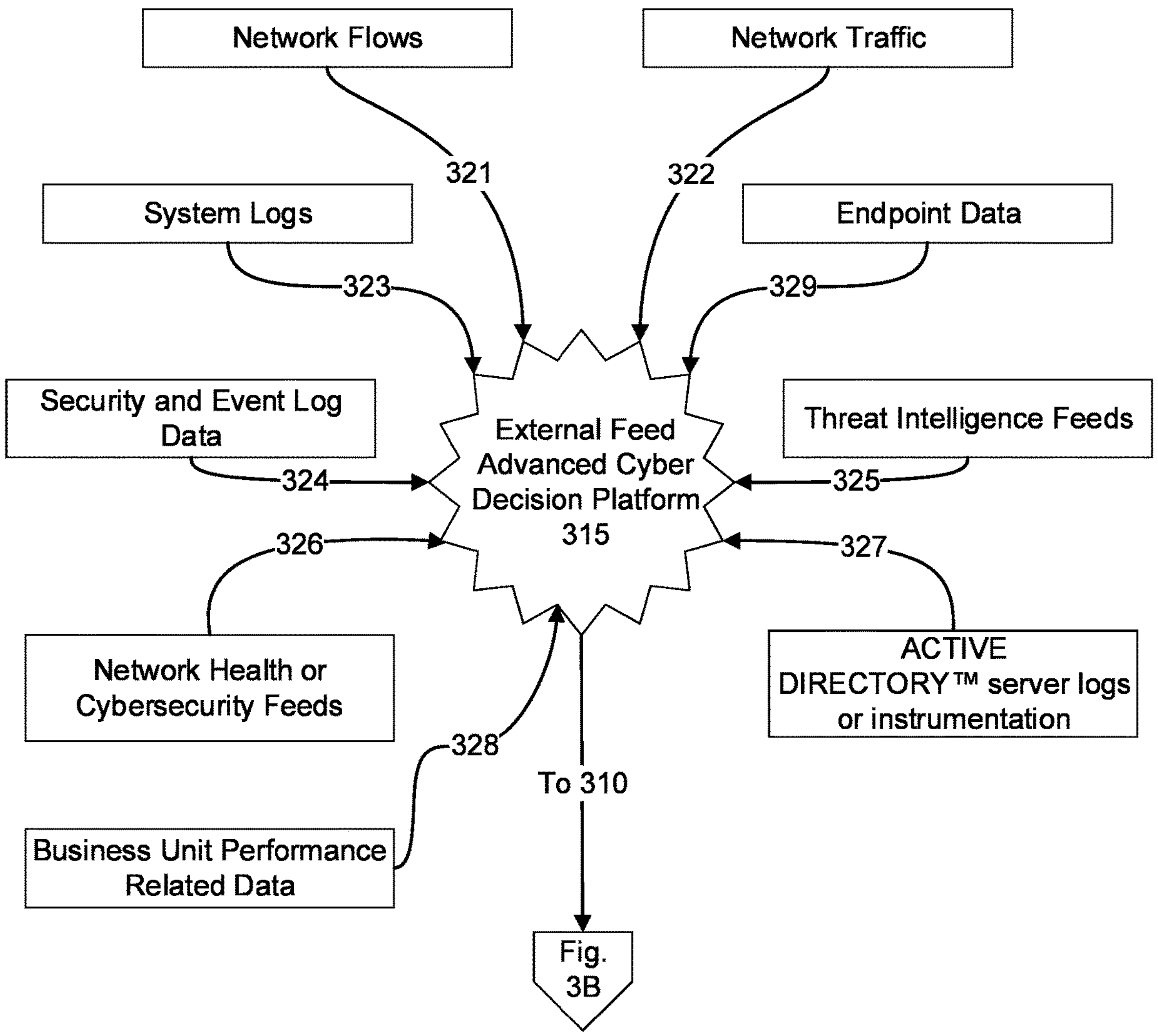
FIGS. 3A and 3B are process diagrams showing further detail regarding the operation of the advanced cyber decision platform.
Figure 3B:
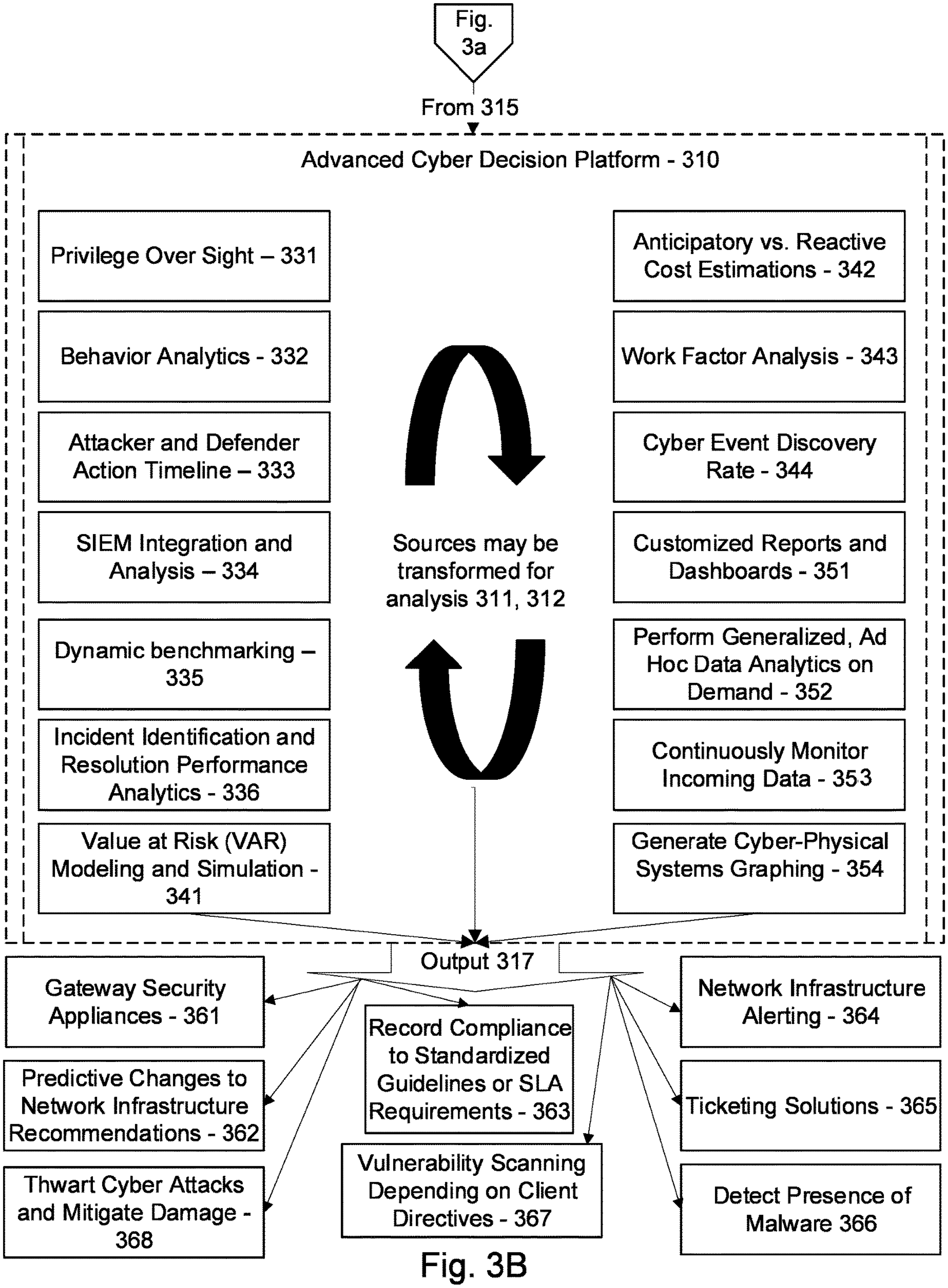

FIGS. 3A and 3B are process diagrams showing further detail regarding the operation of the advanced cyber decision platform. Input network data which may include network flow patterns 321, the origin and destination of each piece of measurable network traffic 322, system logs from servers and workstations on the network 323, endpoint data 329, any security event log data from servers or available security information and event (SIEM) systems 324, external threat intelligence feeds 324, identity or assessment context 325, external network health or cybersecurity feeds 326, Kerberos domain controller or ACTIVE DIRECTORY™ server logs or instrumentation 327, business unit performance related data 328, endpoint data 329, among many other possible data types for which the invention was designed to analyze and integrate, may pass into 315 the advanced cyber decision platform 310 for analysis as part of its cyber security function. These multiple types of data from a plurality of sources may be transformed for analysis 311, 312 using at least one of the specialized cybersecurity, risk assessment or common functions of the advanced cyber decision platform in the role of cybersecurity system, such as, but not limited to network and system user privilege oversight 331, network and system user behavior analytics 332, attacker and defender action timeline 333, SIEM integration and analysis 334, dynamic benchmarking 335, and incident identification and resolution performance analytics 336 among other possible cybersecurity functions; value at risk (VAR) modeling and simulation 341, anticipatory vs. reactive cost estimations of different types of data breaches to establish priorities 342, work factor analysis 343 and cyber event discovery rate 344 as part of the system's risk analytics capabilities; and the ability to format and deliver customized reports and dashboards 351, perform generalized, ad hoc data analytics on demand 352, continuously monitor, process and explore incoming data for subtle changes or diffuse informational threads 353 and generate cyber-physical systems graphing 354 as part of the advanced cyber decision platform's common capabilities. Output 317 can be used to configure network gateway security appliances 361, to assist in preventing network intrusion through predictive change to infrastructure recommendations 362, to alert an enterprise of ongoing cyberattack early in the attack cycle, possibly thwarting it but at least mitigating the damage 362, to record compliance to standardized guidelines or SLA requirements 363, to continuously probe existing network infrastructure and issue alerts to any changes which may make a breach more likely 364, suggest solutions to any domain controller ticketing weaknesses detected 365, detect presence of malware 366, perform one time or continuous vulnerability scanning depending on client directives 367, and thwart or mitigate damage from cyber-attacks 368. These examples are, of course, only a subset of the possible uses of the system, they are exemplary in nature and do not reflect any boundaries in the capabilities of the invention.

Figure 4:
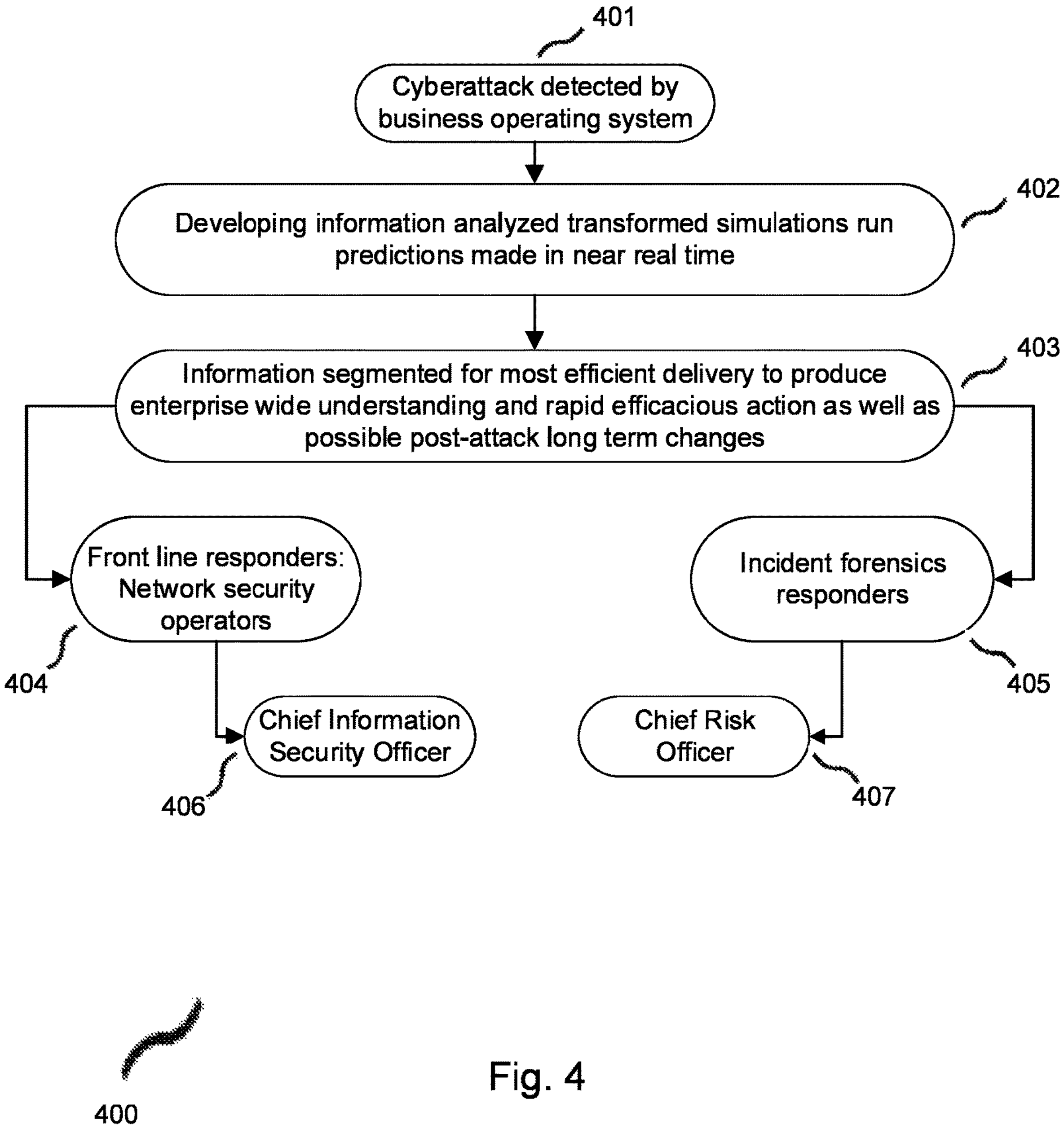
FIG. 4 is a process flow diagram of a method for segmenting cyberattack information to appropriate corporation parties.

FIG. 4 is a process flow diagram of a method for segmenting cyberattack information to appropriate corporation parties 400. As previously disclosed 200, 351, one of the strengths of the advanced cyber-decision platform is the ability to finely customize reports and dashboards to specific audiences, concurrently is appropriate. This customization is possible due to the devotion of a portion of the business operating system's programming specifically to outcome presentation by modules which include the observation and state estimation service 140 with its game engine 140*a* and script interpreter 140*b*. In the setting of cybersecurity, issuance of specialized alerts, updates and reports may significantly assist in getting the correct mitigating actions done in the most timely fashion while keeping all participants informed at predesignated, appropriate granularity. Upon the detection of a cyberattack by the system 401 all available information about the ongoing attack and existing cybersecurity knowledge are analyzed, including through predictive simulation in near real time 402 to develop both the most accurate appraisal of current events and actionable recommendations concerning where the attack may progress and how it may be mitigated. The information generated in totality is often more than any one group needs to perform their mitigation tasks. At this point, during a cyberattack, providing a single expansive and all-inclusive alert, dashboard image, or report may make identification and action upon the crucial information by each participant more difficult, therefore the cybersecurity focused arrangement may create multiple targeted information streams each concurrently designed to produce most rapid and efficacious action throughout the enterprise during the attack and issue follow-up reports with and recommendations or information that may lead to long term changes afterward 403. Examples of groups that may receive specialized information streams include but may not be limited to front line responders during the attack 404, incident forensics support both during and after the attack 405, chief information security officer 406 and chief risk officer 407 the information sent to the latter two focused to appraise overall damage and to implement both mitigating strategy and preventive changes after the attack. Front line responders may use the cyber-decision platform's analyzed, transformed and correlated information specifically sent to them 404 to probe the extent of the attack, isolate such things as: the predictive attacker's entry point onto the enterprise's network, the systems involved or the predictive ultimate targets of the attack and may use the simulation capabilities of the system to investigate alternate methods of successfully ending the attack and repelling the attackers in the most efficient manner, although many other queries known to those skilled in the art are also answerable by the invention. Simulations run may also include the predictive effects of any attack mitigating actions on normal and critical operation of the enterprise's IT systems and corporate users. Similarly, a chief information security officer may use the cyber-decision platform to predictively analyze 406 what corporate information has already been compromised, predictively simulate the ultimate information targets of the attack that may or may not have been compromised and the total impact of the attack what can be done now and in the near future to safeguard that information. Further, during retrospective forensic inspection of the attack, the forensic responder may use the cyber-decision platform 405 to clearly and completely map the extent of network infrastructure through predictive simulation and large volume data analysis. The forensic analyst may also use the platform's capabilities to perform a time series and infrastructural spatial analysis of the attack's progression with methods used to infiltrate the enterprise's subnets and servers. Again, the chief risk officer would perform analyses of what information 407 was stolen and predictive simulations on what the theft means to the enterprise as time progresses. Additionally, the system's predictive capabilities may be employed to assist in creation of a plan for changes of the IT infrastructure that should be made that are optimal for remediation of cybersecurity risk under possibly limited enterprise budgetary constraints in place at the company so as to maximize financial outcome.

Figure 5:
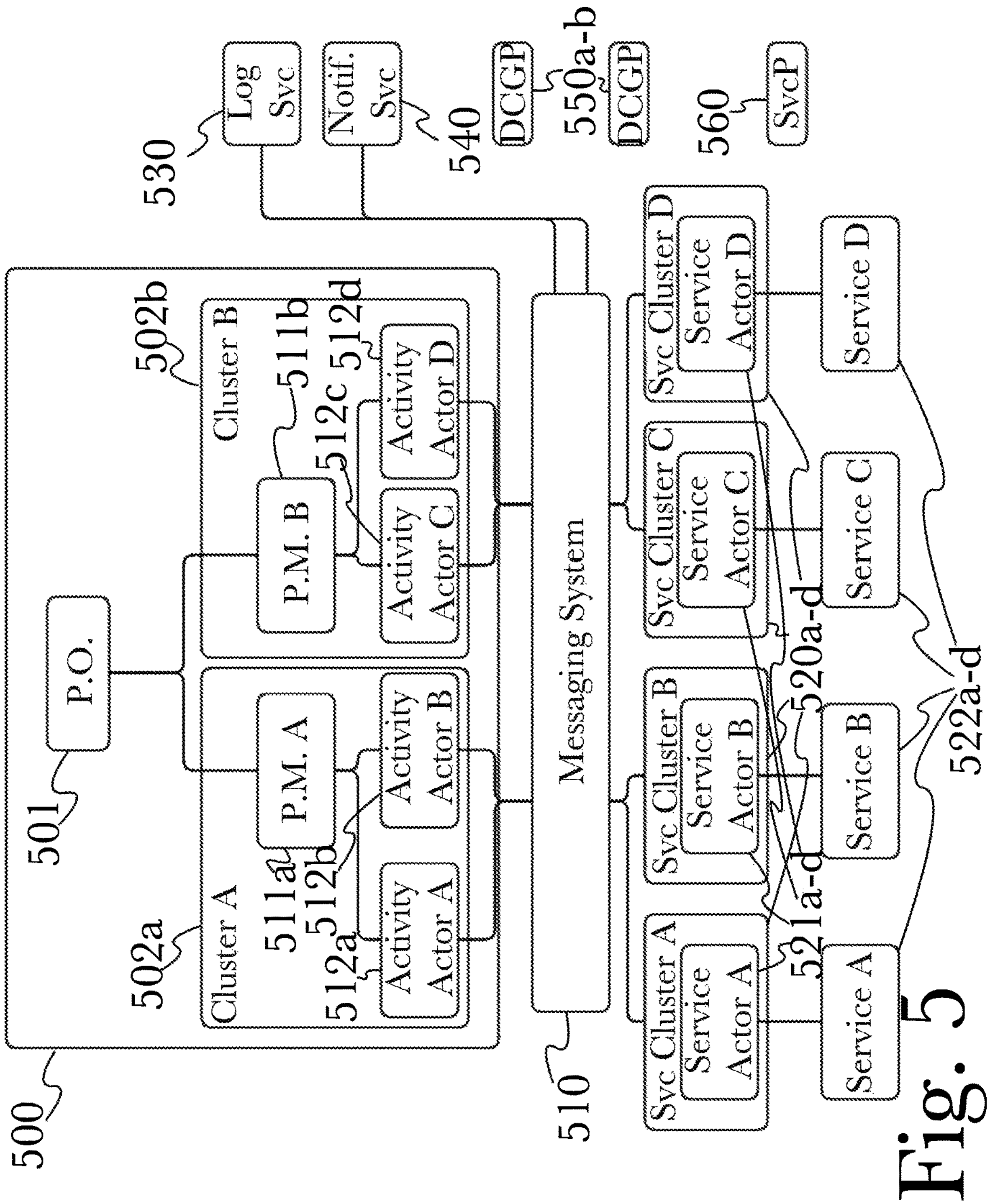
FIG. 5 is a diagram of an exemplary architecture for a system for rapid predictive analysis of very large data sets using an actor-driven distributed computational graph.

FIG. 5 is a diagram of an exemplary architecture for a system for rapid predictive analysis of very large data sets using an actor-driven distributed computational graph 500. According to the aspect, a DCG 500 may comprise a pipeline orchestrator 501 that may be used to perform a variety of data transformation functions on data within a processing pipeline, and may be used with a messaging system 510 that enables communication with any number of various services and protocols, relaying messages and translating them as needed into protocol-specific API system calls for interoperability with external systems (rather than requiring a particular protocol or service to be integrated into a DCG 500).

Pipeline orchestrator 501 may spawn a plurality of child pipeline clusters 502*a-b,* which may be used as dedicated workers for streamlining parallel processing. In some arrangements, an entire data processing pipeline may be passed to a child cluster 502*a* for handling, rather than individual processing tasks, enabling each child cluster 502*a-b* to handle an entire data pipeline in a dedicated fashion to maintain isolated processing of different pipelines using different cluster nodes 502*a-b.* Pipeline orchestrator 501 may provide a software API for starting, stopping, submitting, or saving pipelines. When a pipeline is started, pipeline orchestrator 501 may send the pipeline information to an available worker node 502*a-b,* for example using AKKA™ clustering. For each pipeline initialized by pipeline orchestrator 501, a reporting object with status information may be maintained. Streaming activities may report the last time an event was processed, and the number of events processed. Batch activities may report status messages as they occur. Pipeline orchestrator 501 may perform batch caching using, for example, an IGFS™ caching filesystem. This allows activities 512*a-d* within a pipeline 502*a-b* to pass data contexts to one another, with any necessary parameter configurations.

A pipeline manager 511*a-b* may be spawned for every new running pipeline, and may be used to send activity, status, lifecycle, and event count information to the pipeline orchestrator 501. Within a particular pipeline, a plurality of activity actors 512*a-d* may be created by a pipeline manager 511*a-b* to handle individual tasks, and provide output to data services 522*a-d.* Data models used in a given pipeline may be determined by the specific pipeline and activities, as directed by a pipeline manager 511*a-b.* Each pipeline manager 511*a-b* controls and directs the operation of any activity actors 512*a-d* spawned by it. A pipeline process may need to coordinate streaming data between tasks. For this, a pipeline manager 511*a-b* may spawn service connectors to dynamically create TCP connections between activity instances 512*a-d.* Data contexts may be maintained for each individual activity 512*a-d,* and may be cached for provision to other activities 512*a-d* as needed. A data context defines how an activity accesses information, and an activity 512*a-d* may process data or simply forward it to a next step. Forwarding data between pipeline steps may route data through a streaming context or batch context.

A client service cluster 530 may operate a plurality of service actors 521*a-d* to serve the requests of activity actors 512*a-d,* ideally maintaining enough service actors 521*a-d* to support each activity per the service type. These may also be arranged within service clusters 520*a-d,* in a manner similar to the logical organization of activity actors 512*a-d* within clusters 502*a-b* in a data pipeline. A logging service 530 may be used to log and sample DCG requests and messages during operation while notification service 540 may be used to receive alerts and other notifications during operation (for example to alert on errors, which may then be diagnosed by reviewing records from logging service 530), and by being connected externally to messaging system 510, logging and notification services can be added, removed, or modified during operation without impacting DCG 500. A plurality of DCG protocols 550*a-b* may be used to provide structured messaging between a DCG 500 and messaging system 510, or to enable messaging system 510 to distribute DCG messages across service clusters 520*a-d* as shown. A service protocol 560 may be used to define service interactions so that a DCG 500 may be modified without impacting service implementations. In this manner it can be appreciated that the overall structure of a system using an actor-driven DCG 500 operates in a modular fashion, enabling modification and substitution of various components without impacting other operations or requiring additional reconfiguration.

Figure 6:
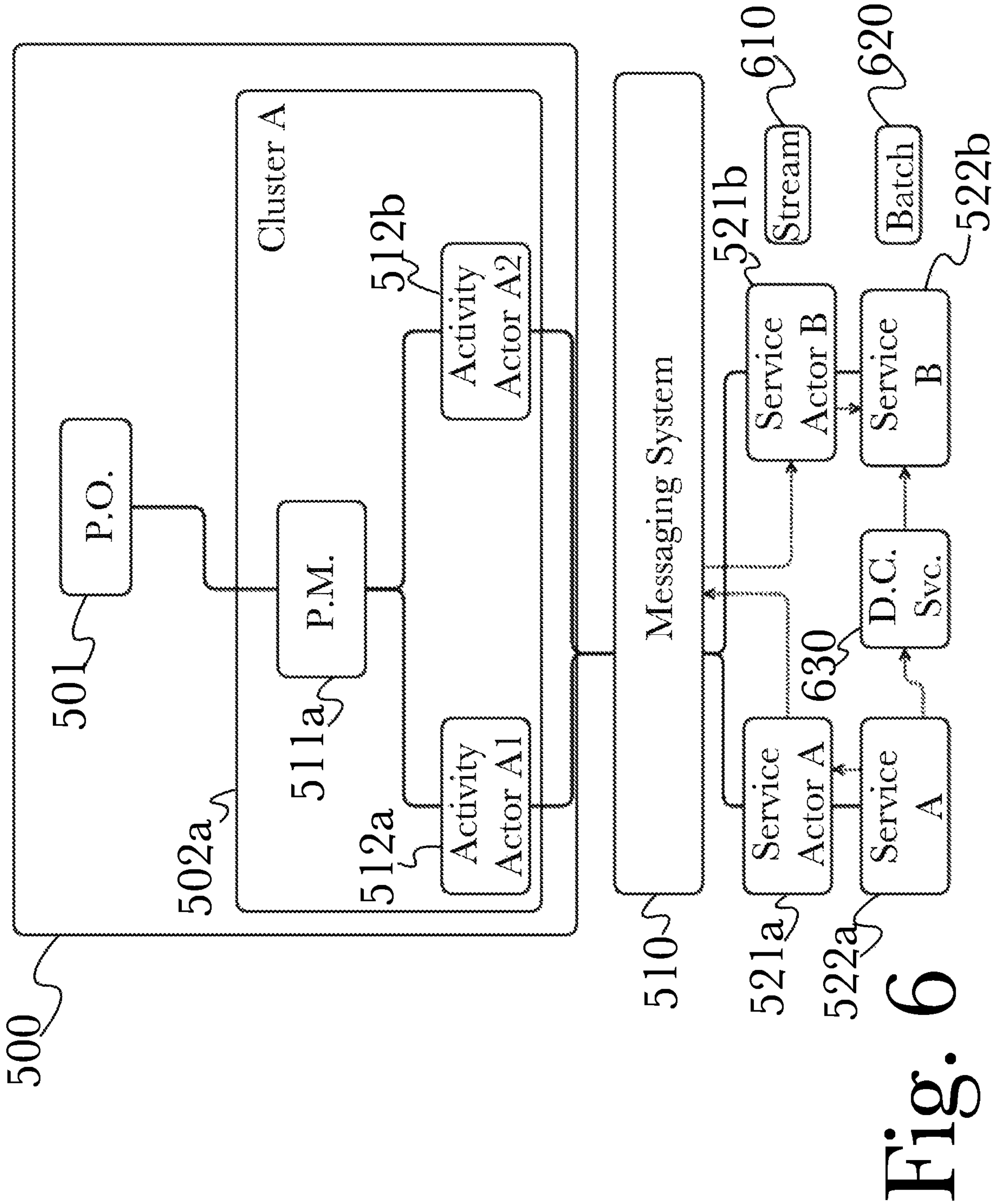
FIG. 6 is a diagram of an exemplary architecture for a system for rapid predictive analysis of very large data sets using an actor-driven distributed computational graph.

FIG. 6 is a diagram of an exemplary architecture for a system for rapid predictive analysis of very large data sets using an actor-driven distributed computational graph 500. According to the aspect, a variant messaging arrangement may utilize messaging system 510 as a messaging broker using a streaming protocol 610, transmitting and receiving messages immediately using messaging system 510 as a message broker to bridge communication between service actors 521*a-b* as needed. Alternately, individual services 522*a-b* may communicate directly in a batch context 620, using a data context service 630 as a broker to batch-process and relay messages between services 522*a-b*.

Figure 7:
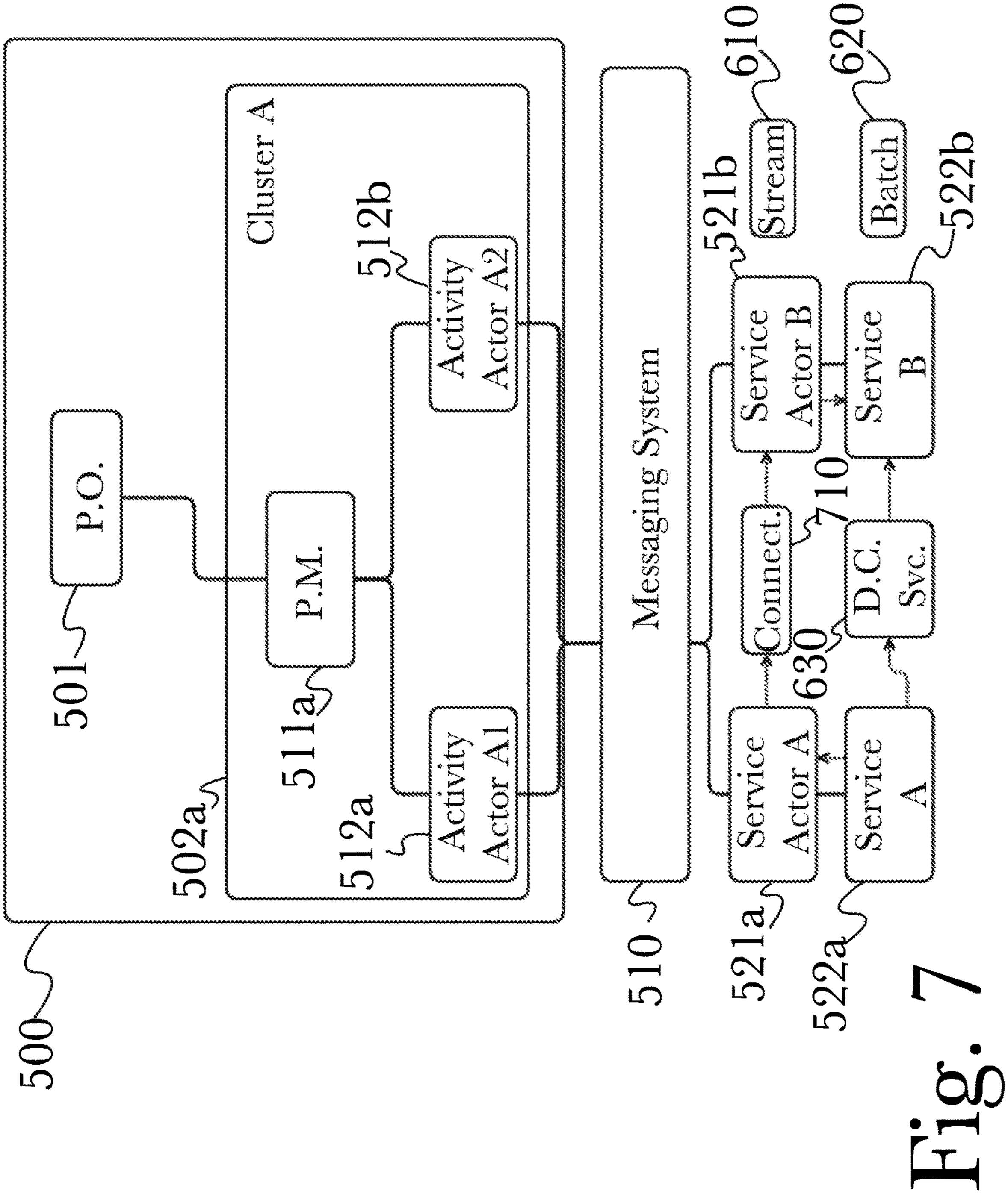
FIG. 7 is a diagram of an exemplary architecture for a system for rapid predictive analysis of very large data sets using an actor-driven distributed computational graph.

FIG. 7 is a diagram of an exemplary architecture for a system for rapid predictive analysis of very large data sets using an actor-driven distributed computational graph 500. According to the aspect, a variant messaging arrangement may utilize a service connector 710 as a central message broker between a plurality of service actors 521*a-b,* bridging messages in a streaming context 610 while a data context service 630 continues to provide direct peer-to-peer messaging between individual services 522*a-b* in a batch context 620.

It should be appreciated that various combinations and arrangements of the system variants described above (referring to FIGS. 1-7) may be possible, for example using one particular messaging arrangement for one data pipeline directed by a pipeline manager 511*a-b,* while another pipeline may utilize a different messaging arrangement (or may not utilize messaging at all). In this manner, a single DCG 500 and pipeline orchestrator 501 may operate individual pipelines in the manner that is most suited to their particular needs, with dynamic arrangements being made possible through design modularity as described above in FIG. 5.

Figure 19:
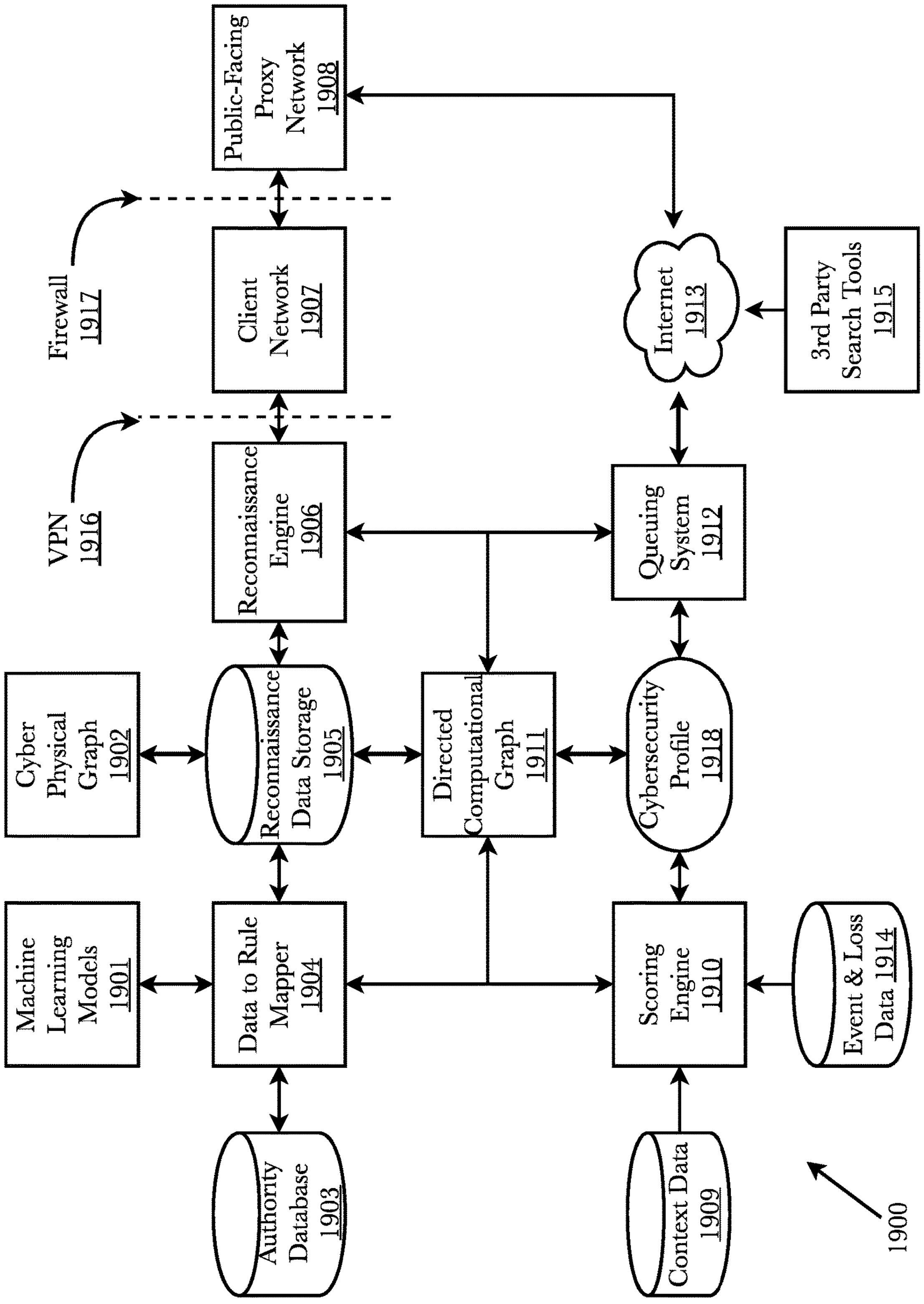
FIG. 19 is a block diagram showing an exemplary system architecture for a system for cybersecurity profiling and rating.

FIG. 19 is block diagram showing an exemplary system architecture 1900 for a system for cybersecurity profiling and rating. The system in this example contains a cyber-physical graph 1902 which is used to represent a complete picture of an organization's infrastructure and operations including, importantly, the organization's computer network infrastructure particularly around system configurations that influence cybersecurity protections and resiliency. The system further contains a directed computational graph 1911, which contains representations of complex processing pipelines and is used to control workflows through the system such as determining which 3rd party search tools 1915 to use, assigning search tasks, and analyzing the cyber-physical graph 1902 and comparing results of the analysis against reconnaissance data received from the reconnaissance engine 1906 and stored in the reconnaissance data storage 1905. In some embodiments, the determination of which 3rd party search tools 1915 to use and assignment of search tasks may be implemented by a reconnaissance engine 1906. The cyber-physical graph 1902 plus the analyses of data directed by the directed computational graph on the reconnaissance data received from the reconnaissance engine 1906 are combined to represent the cyber-security profile of the client organization whose network 1907 is being evaluated. A queuing system 1912 is used to organize and schedule the search tasks requested by the reconnaissance engine 1906. A data to rule mapper 1904 is used to retrieve laws, policies, and other rules from an authority database 1903 and compare reconnaissance data received from the reconnaissance engine 1906 and stored in the reconnaissance data storage 1905 against the rules in order to determine whether and to what extent the data received indicates a violation of the rules. Machine learning models 1901 may be used to identify patterns and trends in any aspect of the system, but in this case are being used to identify patterns and trends in the data which would help the data to rule mapper 1904 determine whether and to what extent certain data indicate a violation of certain rules. A scoring engine 1910 receives the data analyses performed by the directed computational graph 1911, the output of the data to rule mapper 1904, plus event and loss data 1914 and contextual data 1909 which defines a context in which the other data are to be scored and/or rated. A public-facing proxy network 1908 is established outside of a firewall 1917 around the client network 1907 both to control access to the client network from the Internet 1913, and to provide the ability to change the outward presentation of the client network 1907 to the Internet 1913, which may affect the data obtained by the reconnaissance engine 1906. In some embodiments, certain components of the system may operate outside the client network 1907 and may access the client network through a secure, encrypted virtual private network (VPN) 1916, as in a cloud-based or platform-as-a-service implementation, but in other embodiments some or all of these components may be installed and operated from within the client network 1907.

As a brief overview of operation, information is obtained about the client network 1907 and the client organization's operations, which is used to construct a cyber-physical graph 1902 representing the relationships between devices, users, resources, and processes in the organization, and contextualizing cybersecurity information with physical and logical relationships that represent the flow of data and access to data within the organization including, in particular, network security protocols and procedures. The directed computational graph 1911 containing workflows and analysis processes, selects one or more analyses to be performed on the cyber-physical graph 1902. Some analyses may be performed on the information contained in the cyber-physical graph, and some analyses may be performed on or against the cyber-physical graph using information obtained from the Internet 1913 from reconnaissance engine 1906. The workflows contained in the directed computational graph 1911 select one or more search tools to obtain information about the organization from the Internet 1915 and may comprise one or more third party search tools 1915 available on the Internet 1913. As data are collected, they are fed into a reconnaissance data storage 1905, from which they may be retrieved and further analyzed. Comparisons are made between the data obtained from the reconnaissance engine 1906, the cyber-physical graph 1902, the data to rule mapper, from which comparisons a cybersecurity profile of the organization is developed. The cybersecurity profile is sent to the scoring engine 1910 along with event and loss data 1914 and context data 1909 for the scoring engine 1910 to develop a score and/or rating for the organization that takes into consideration both the cybersecurity profile, context, and other information.

Figure 20:
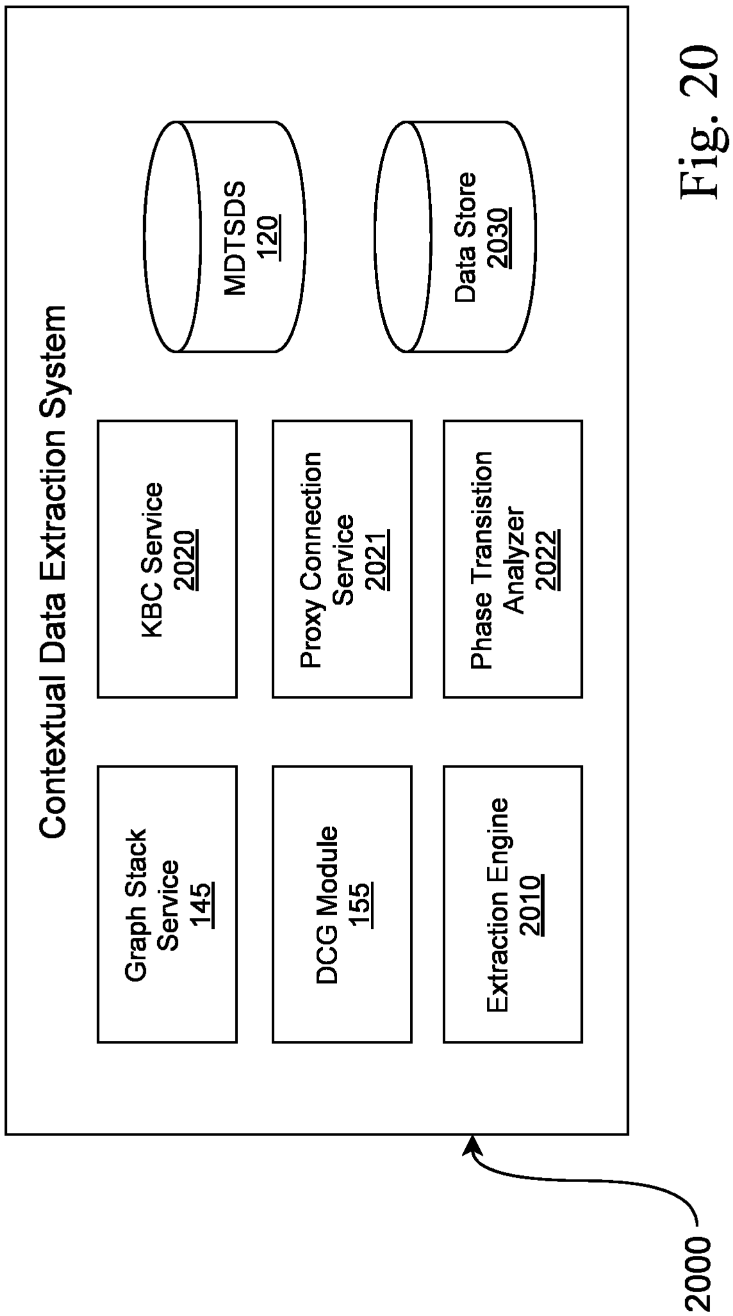
FIG. 20 is a block diagram of an exemplary system for contextual data collection and extraction according to various embodiments of the invention.

FIG. 20 is a block diagram of an exemplary system 2000 for contextual data collection and extraction according to various embodiments of the invention. Using the techniques for extracting unstructured and loosely structured data, richly formatted data may also be scraped. However, in order to successfully process the scraped data for useful information, requires additional components. System 2000 may comprise graph stack service 145, directed computational graph (DCG) module 155, an extraction engine 2010, knowledge base construction (KBC) service 2020, a proxy connection service 2021, a phase transition analyzer 2022, multidimensional time-series data store (MDTSDS) 120 for collecting and storing graph and time-series, and a data store 2030. It should be understood that the components in system 2000, although illustrated as enclosed in a single body, the components of system 2000 may be implemented in logical form, or the functions may be provided as a plurality of distributed microservices.

Extraction engine 2010 may be configured to use processes of advanced cyber decision platform 100, such as connector module 135, web crawler 115, and multidimensional time series data store 120 to connect to data sources to extract data, which may be richly formatted data, structured data, unstructured data, and the like. Extraction engine 2010 may be configured to not only work across different modalities of data and preserve context across the different modalities, but data extracted from the various modalities may be used to augment data from one modality to another. Extracted data from the same modality from different sources may also be able to augment one another. During the extraction process, extraction engine 2010 may take into consideration user-provided context. The context may then be used by extraction engine 2010 to refine the types of the data that is extracted. Once data has been extracted, the data may be subjected to external feedback as a means for quality assurance for the extracted data.

Another capability of extraction engine 2010 is tagging extracted data with relevant timestamp data and storing the data as time-series data. This may be useful for classifying data in phases so that transitions over time may be captured using graph edge analysis. This may be useful, for example, for tracking development in expert judgement in particular fields overtime, as well as let interested parties explore data from specific time periods.

Figure 21:
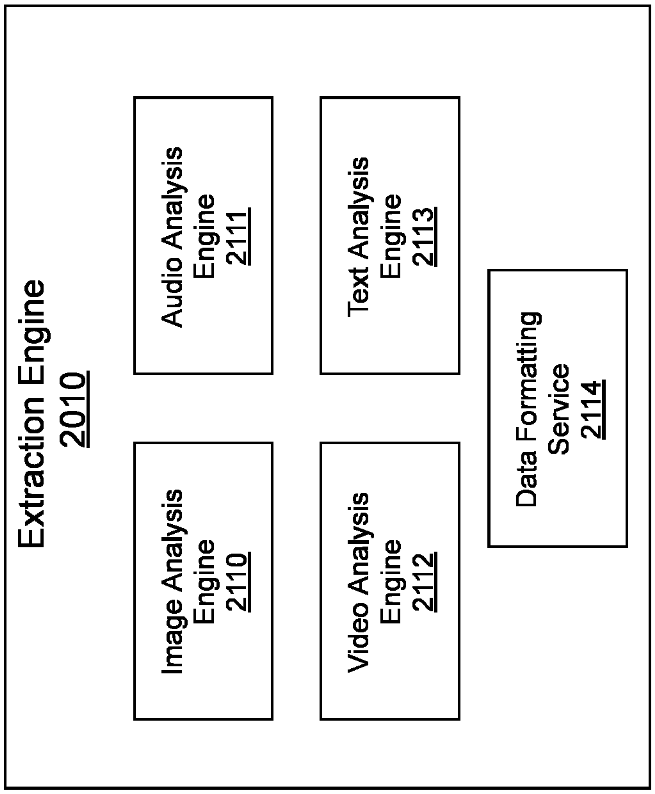
FIG. 21 is a block diagram of an exemplary extraction engine according to various embodiments of the invention.

Referring to FIG. 21, extraction engine 2010 may comprise an image analysis engine 2110, an audio analysis engine 2111, a video analysis engine 2112, a text analysis engine 2113, and data formatting service 2114. Image analysis engine 2110 may be configured to analyze images using image recognition models. Images may include, but are not limited to, pictures, charts and graphs, tables, and the like. Data from images may be extracted and may then processed by data formatting service 2114, so that the data may conform to any preset standards for usage in a knowledge base.

Audio analysis engine 2111 may be configured to use audio analysis models to process audio data, for example, performing general speech-to-text operations or to analyze tonal cues in voice recordings. This may provide additional insight by cross referencing the tones and inflections with presented facts, for example, it may reveal whether or not certain statements can be considered truthful or not. Data extracted from audio may then be processed by data formatting service 2114, so that the data may conform to any preset standards for usage in a knowledge base.

Video analysis engine 2112 may be configured to use video analysis models to process videos, and capture information from videos. For example, analyzing body language to glean concealed information or perform lip-reading analysis as a means to increase accuracy of speech dictation.

Text analysis engine 2113 may be configured to use natural language processing (NLP) models to analyze text-based data, which may include, system logs, news articles, blog posts, tabular data, and the like. Text analysis engine 2113 may contain an extensible collection of parsers that may be utilized to parse text data in a known format.

Data formatting service 2114 may be configured to use graph stack service 145 to clean and formalize data gathered by other processes of extraction engine 2010 and convert the data into a graph representation to ensure that the data conforms to any preset standards for compatibility with knowledge bases that are in use by system 2000.

Knowledge base construction service 2020 may be configured to assemble and maintain extracted and processed data. Knowledge bases may be divided in context collections provided by a user, for example, a knowledge base may be based on a particular company, a technical field of interest, financial data, and the like. As new data is extracted and processed, KBC service 2020 may update existing knowledge bases with the newly extracted data, or create a new knowledge base if a suitable knowledge base doesn't exist. Knowledge bases may be stored in system 2000 in data store 2030. In some embodiments, knowledge bases may also be actively monitored and evaluated, for example, by using DCG module 155 with the associated transformer modules 150, 160 and observation and state estimation service 140, to locate information originating from multiple sources that, when evaluated collectively, are valuable. For example, using forward analysis on a particular knowledge base, the detection of data exfiltration may be unearthed. Personally Identifiable Information (PII) encodings, such as name, phone number, and address collectively may constitute a Data Loss Prevention breach under some jurisdictions, and a Universal Unique Identifier (UUID) associated with each of these three pieces of info are sent separately to the same recipient, this approach will identify that all three were sent based upon enrichment and ongoing analysis of the knowledge base.

Based on some competitor positioning, one very important use case is the idea of enabling a distributed Data Loss Prevention (DLP) capability. Effectively, using forward analysis (aggregating data together in a unified data model like a knowledge graph), our extraction capability can detect unwanted data exfiltration through analytics. For example, consider Personally Identifiable Information (PII) encodings where name/phone number/address all together constitute a DLP breach (the US gov and others think in these terms about PII violations in terms of such specific correlations) and a UUID paired with each of these three pieces of info are sent separately to the same source, this approach will identify that all three were sent based upon enrichment of the knowledge graph.

Proxy connection service 2021 may be configured to automatically connect to a proxy network to facilitate anonymous connections to data sources or, for example, to appear from a specific region (e.g., a residential IP address). This may be useful in cases, for instance, in which a particular data source aggressively blocks web crawlers from accessing pages, when bypassing a firewall is required, to conceal one's true identity, and the like. Proxy connection service 2021 may automatically determine when a proxy connection is required and may automatically determine optimal proxy networks to use.

Phase transition analyzer 2022 may be configured to use DCG module 155 along with the associated transformer modules 155 to analyze graph and time-series data for shifts and changes in data over time, for example, changes in lingo in a particular field or development that changes understanding of a subject overtime. This may provide useful, for instance, when considering data sources from particular time periods, especially if the field of interest has undergone significant change over time.

Figure 22:
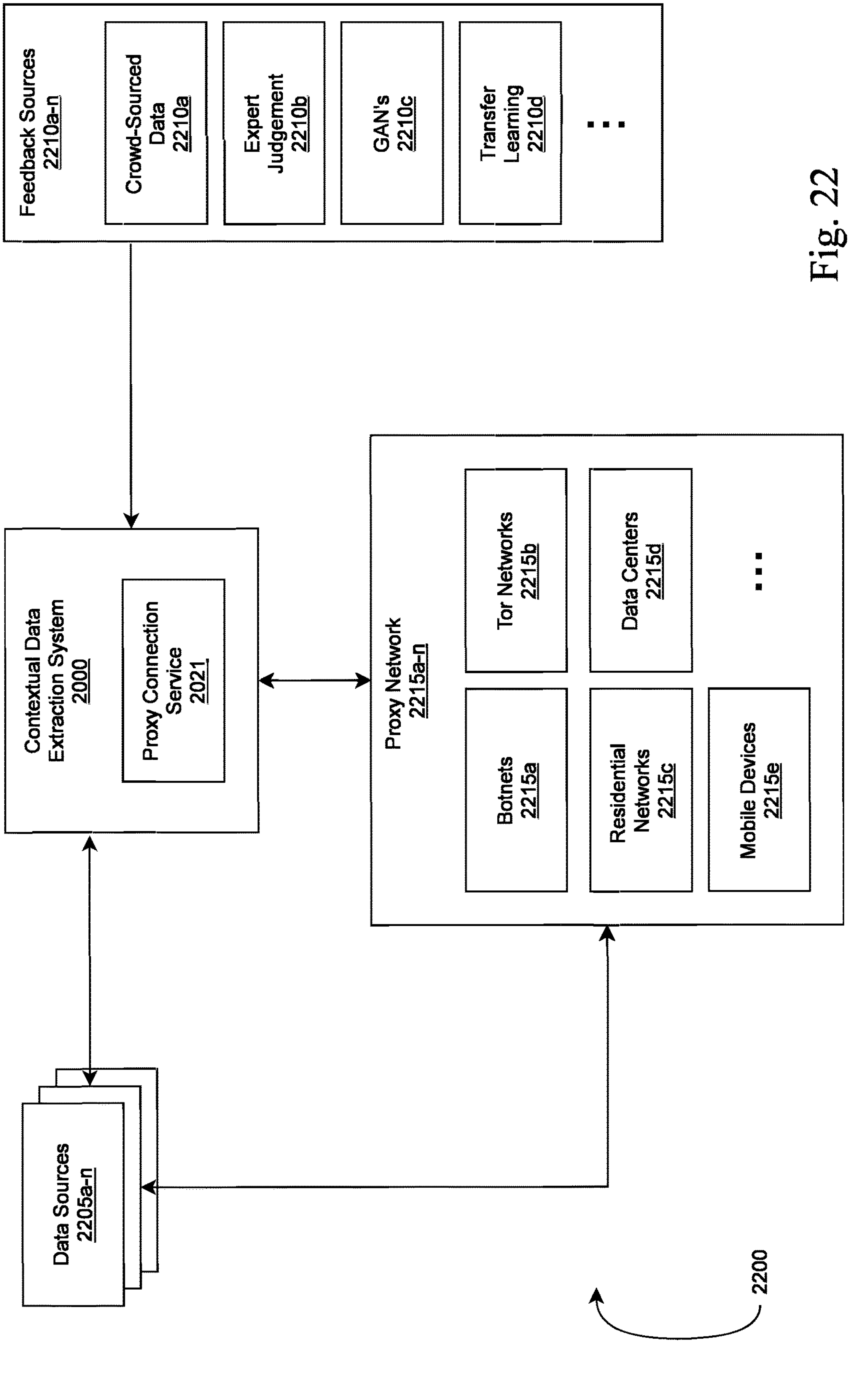
FIG. 22 is a block diagram of an exemplary system employing a system for contextual data extraction according to various embodiments of the invention.

FIG. 22 is a block diagram of an exemplary system 2200 employing a system for contextual data extraction 2000 according to various embodiments of the invention. System 2000 may connect to a plurality of data sources 2205*a-n,* which may comprise richly formatted data sources, structured data sources, unstructured data sources, system logs, repositories, and the like. In some instances, data sources 2205*a-n* may require connection via one or more proxy networks 2215*a-n,* which may comprise botnets 2215*a,* TOR networks 2215*b,* residential networks 2215*c,* data centers 2215*d,* and mobile devices 2215*e.* System 2000 may also take into consideration feedback from a plurality of feedback sources 2210*a-n,* which may include, crowd-sourced data 2210*a,* expert judgement 2210*b,* generative adversarial networks (GAN's) 2210*c,* transfer learning 2210*d,* and the like as a means for quality assurance for extracted data.

Figure 24:
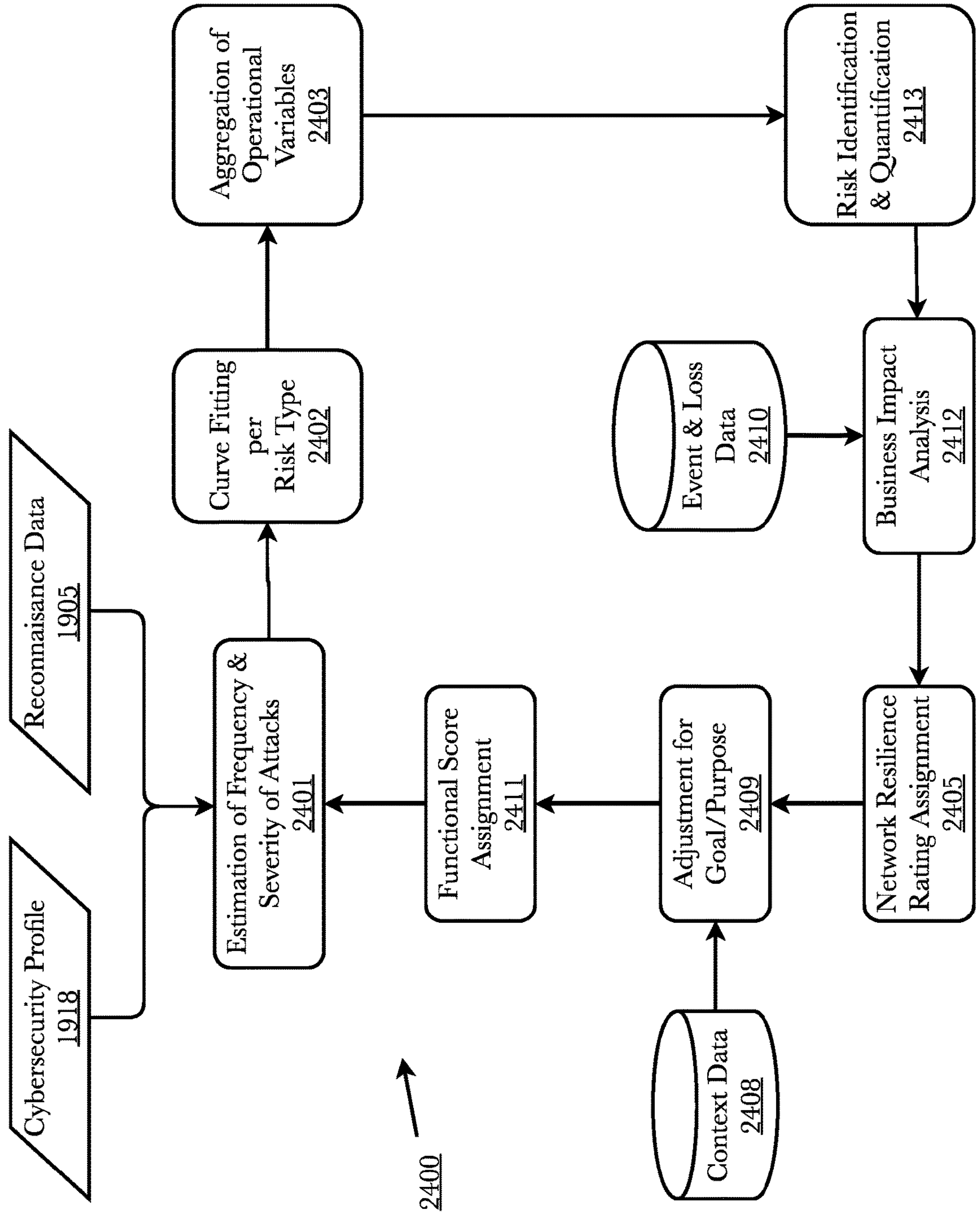
FIG. 24 is a block diagram showing an exemplary architecture diagram for a scoring engine.

FIG. 24 is a block diagram showing an exemplary architecture 2400 for a scoring engine. Data fed into the scoring engine comprise the cybersecurity profile 1918 and reconnaissance data 1905 developed at earlier stages of system operation. Based on these data, a frequency and severity of attack is estimated 2408. For each risk type, curve fitting 2402 may be performed on the data points to assign a "best fit" function along the range of data points, which captures trends in the data and allows for predictions of how similar data will behave in the future. Aggregations of operational variables 2403 may be applied to identify maxima, minima, counts, sums, and standard deviations of the data. Risk identification and quantification is then performed 2413, and a business impact analysis is performed 2412 based on a totality of the predicted risks, their severity, business dependencies reflected in the cyber-physical graph, and prior event and loss data 2410, among other variables. From this analysis of business impact 2412, a network resilience rating is assigned 2405, representing a weighted and adjusted total of relative exposure the organization has to various types of risks, each of which may be assigned a sub-rating. The network resilience rating 2405 may be a single score for all factors, a combination of scores, or a score for a particular risk or area of concern. The network resilience rating 2411 may then be adjusted or filtered depending on the context in which it is to be used 2409. For example, context data received 2408 may indicate that the scores are to be used for compliance with internal theft policies, but the factors associated with the network resilience rating indicate that the highest risks are associated with cyber-attacks from external systems, which may cause the adjustment for goal/purpose 2409 to filter out the factors of the network resilience rating associated with risks from external cyber-attacks or reduce their contribution to a functional score. Finally, a functional cybersecurity score 2411 is assigned which takes into account the adjusted factors of the network resilience score and the context in which the functional score is to be applied. The process may be iterative, in that the network resilience rating 2405 from previous analyses may be fed back into the start of the process at estimation of frequency and severity of attacks 2401.

Figure 25:
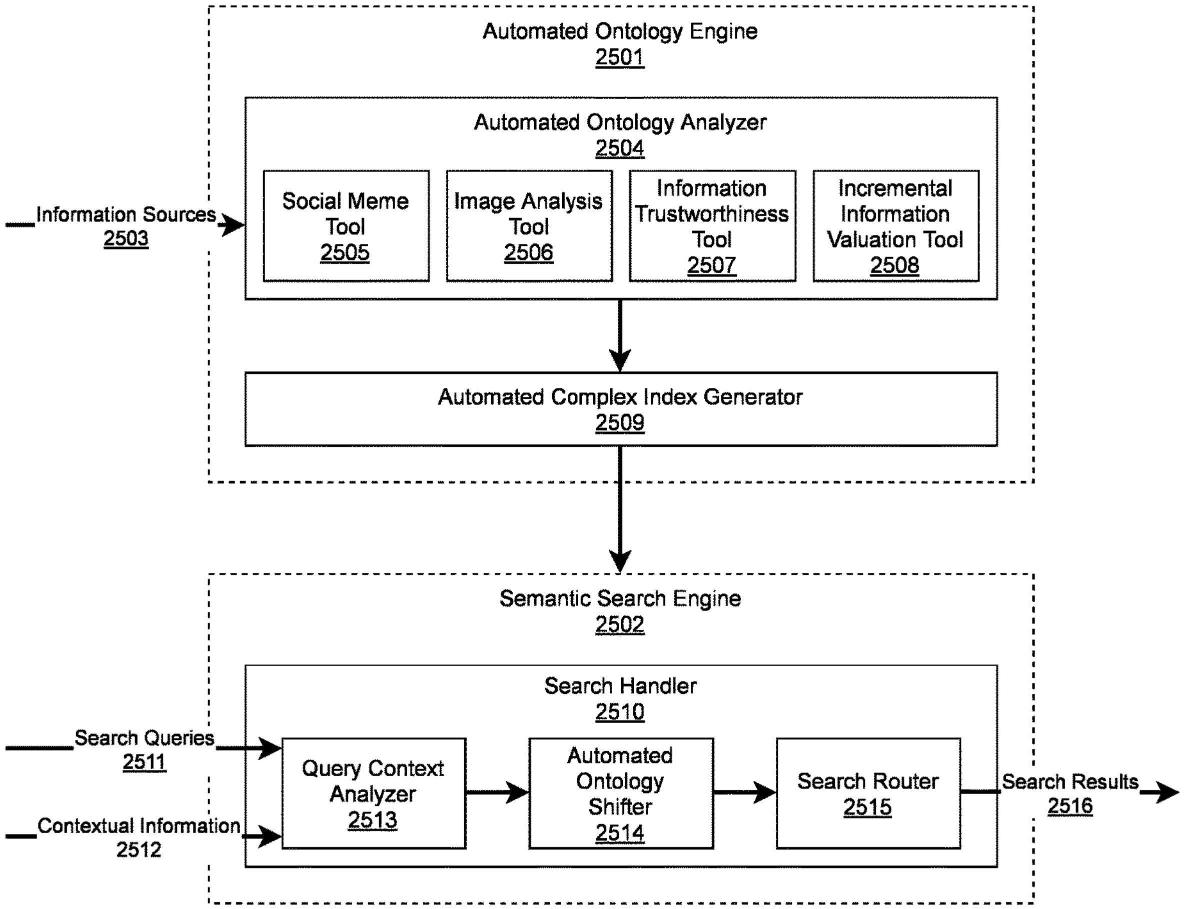
FIG. 25 is a block diagram showing an embodiment in which ontologies are used to provide semantic search capabilities through a semantic search engine.

FIG. 25 is a block diagram showing an embodiment 2501 in which ontologies are generated by the automated ontology engine 2501 and used to provide semantic search capabilities through a semantic search engine 102. In this embodiment, the automated ontology generator 2502 receives information 2503 from a variety of public and private sources. This information may either be gathered by another aspect by crawling the web for publicly available information, or the information may be provided from public or private databases. Ideally, the information received would include not just information about things, but also information about their relationships from existing hierarchies, taxonomies, ontologies, dictionaries, thesauruses, website page ranks, website relational content, and similar relational structures. As information is received, the automated ontology engine 2504 runs the information through a variety of tools which perform a multi-variate analysis on the information. For example, a social meme tool 2505 would evaluate the information for classification based on the breadth and persistence of certain memes (cultural ideas which are distributed by members of a group and which have an impact on the thinking of that group). An image analysis tool 2506 (see prior disclosures) would be used to perform complex image analysis and classification beyond the useful, but simplistic, image collections available on the internet today such as ImageNet. A trustworthiness tool 2507 would be used in conjunction with the social meme tool to determine the veracity of information by capturing a range of human understandings of information that current search engines are unable to distinguish, such as sentiment, intent, emotions, satire, underlying motivations, and the like. Based in part on information from other tools, an information valuation tool 2508 would be able to price the incremental value of changes and updates to information. Other tools could be added to increase the functionality of the system. As the automated ontology generator completes its analysis, the newly-generated ontologies are passed on to the automated complex index generator 2509 for creation of a network of indices relating the information to ontologies, hierarchies, taxonomies, trustworthiness rankings, valuations, and other classifications and groupings. These indices are then made available to the search handler 2510 for use in performing semantic searches. As search queries 2511 are received into the query context analyzer 2513, contextual information is gathered about the search query itself and about the user making the query 2512. A contextual analysis is performed which comprises analysis of the query itself in conjunction with detailed information about the context in which the query is occurring, and contextual information about the user. For example, the query itself is analyzed for syntax, the language or dialect or the search, lists of common language ambiguities, search history and selections of users with similar characteristics, dictionary and thesaurus entries, natural language search engines outputs, etc. The contextual analysis might also include such things as the user's age, sex, height, weight, location, food preferences, prior search history, etc. The results of the query context analyzer would be sent to the automated ontology shifter 2514, which would compare the query analysis with the complex index database to determine the user's intent, even where such intent is unstated. The ontology shifter would shift the focus of the search to the appropriate ontology, and provide the results to the search router 2515, which would provide search results 2516 to the user most closely matching the user's predicted intent.

Figure 26:
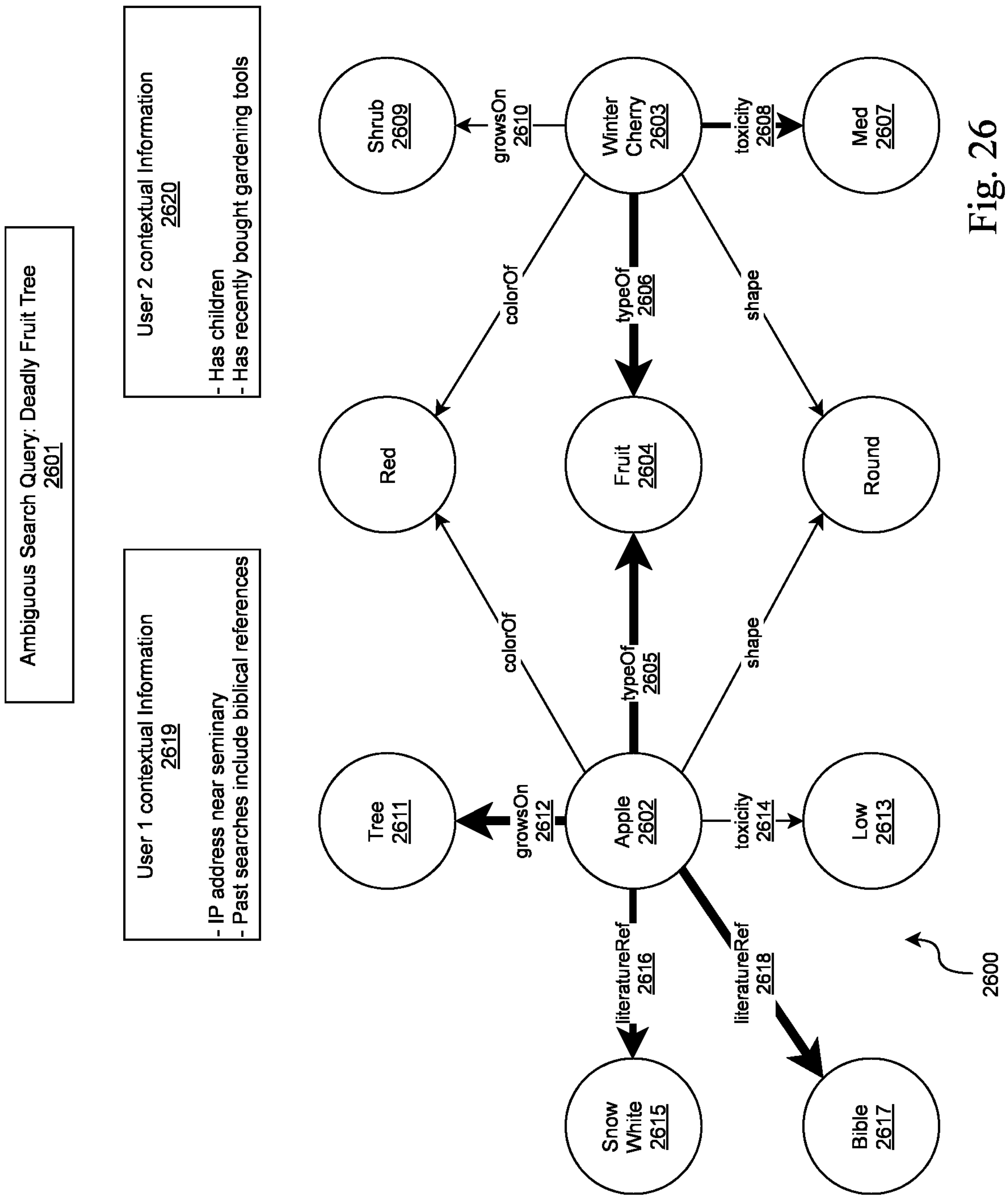
FIG. 26 is an example of how an aspect of an embodiment might predict the user's intent in response to an ambiguous search query.

FIG. 26 is an example of how an aspect of an embodiment 2600 might predict the user's intent in response to an ambiguous search query. In this example, a knowledge graph is used by the previously disclosed query context analyzer 2513 and automated ontology shifter 2514 to determine the intent of two different users from the same ambiguous search query, even where that intent is unstated. In this example, elements in the knowledge graph are represented by circular shapes called "nodes", and the relationships between them are represented by lines called "edges". The nodes represent things, and the edges represent relationships between the things. The lines are weighted to indicate how closely they match certain elements of the search query. In this simplified example, both users have entered the ambiguous search query "deadly fruit tree" 2601. Initially, performing an analysis of the query only, two possible meanings could be an apple 2602 or a mildly poisonous fruit called a winter cherry 2603. Both the apple and winter cherry are of the type fruit 2604, so the apple/fruit edge 2605 and the winter cherry/fruit edge 2606 are heavily weighted, indicating that they closely match elements of the search query. The winter cherry is mildly poisonous 2607, so the winter cherry/toxic edge 2608 is moderately weighted. The apple is non-toxic 2613, so the apple/non-toxic edge 2614 is lightly weighted. Considering just these two variables, it would appear that the user intended to find the winter cherry. However, the winter cherry grows on a shrub 2609, so the winter cherry/shrub edge 2610 is lightly weighted. The apple, on the other hand, grows on a tree 2611, which is one of the search terms, and so the apple/tree edge 2612 is heavily weighted. On balance, choosing only between these two items, it appears that the user intended to find references to an apple. However, the apple itself is not toxic, and references to toxic apples appear primarily in literature. In this simplified example, the remaining possibilities are the fairy tale Snow White & the Seven Dwarves 2615, wherein the main character is given a poisoned apple, and the biblical reference 2617 to the story of Genesis, wherein an apple grows on a tree and "poisons" the minds of Adam and Eve. Since the Snow White story does not contain references to apples growing on trees, but the biblical story does, the apple/Snow White edge 2616 is moderately weighted, and the apple/Bible edge 2618 is heavily weighted. At the completion of the analysis of the query only, the weighting of the knowledge graph suggests that the query is related to the biblical story of Genesis. Now, however, contextual information about the users may be included in the analysis to better predict the user's unstated intent. The contextual information about User 1 2619 includes the fact that the user's IP address is located near a theological seminary and that the user has previously searched for biblical quotations. This context strengthens the idea that the intent of the user in searching for "deadly fruit tree" was to find the biblical reference to the "fruit of the poisonous tree". The contextual information about User 2 2620, on the other hand, includes information available from public records that the user has children, and has recently bought a shovel, wheelbarrow, and other landscaping tools. Considering this additional context, it is considerably less likely that the literature references are what the user intended, and more likely that the user is interested in the toxicity of certain fruits. This leads the system to predict that the user is, in fact, interested in obtaining information on winter cherries instead of apples, despite the fact that winter cherries grow on shrubs and the search query itself includes the word "tree".

Figure 27:
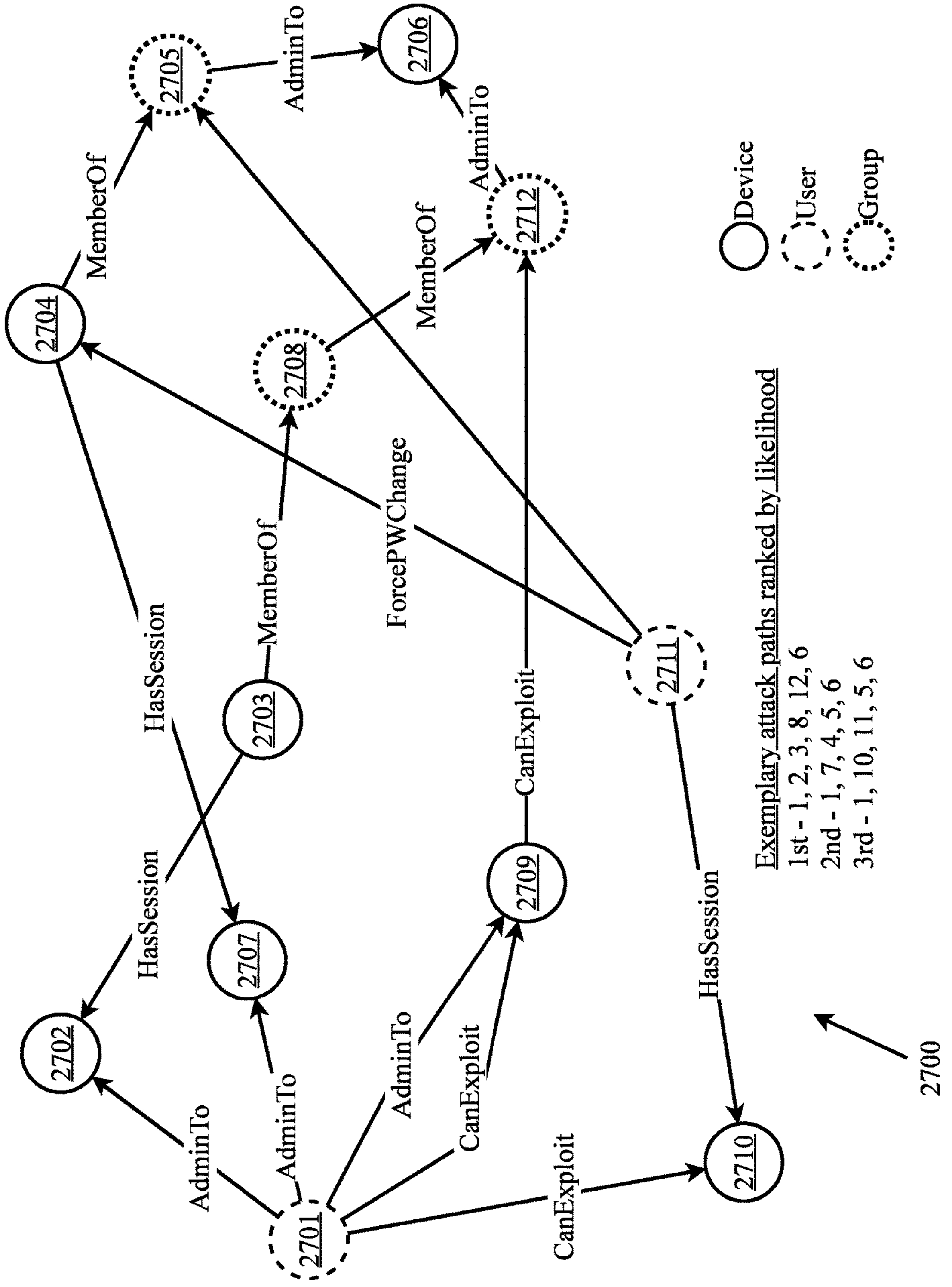
FIG. 27 is a directed graph diagram showing an exemplary cyber-physical graph and its possible use in analyzing cybersecurity threats.

FIG. 27 is a directed graph diagram showing an exemplary knowledge graph 2700 and its possible use in creating cybersecurity profiles and ratings. A cyber-physical knowledge graph 2700 represents the relationships between entities associated with an organization, for example, devices, users, resources, groups, and computing services, the relationships between the entities defining relationships and processes in an organization's infrastructure, thereby contextualizing security information with physical and logical relationships that represent the flow of data and access to data within the organization including, in particular, network security protocols and procedures. A cyber-physical graph, in its most basic form, represents the network devices comprising an organization's network infrastructure as nodes (also called vertices) in the graph and the physical or logical connections between them as edges between the nodes. The cyber-physical graph may be expanded to include network information and processes such as data flow, security protocols and procedures, and software versions and patch information. Further, human users and their access privileges to devices and assets may be included. A cyber-security graph may be further expanded to include internal process information such as business processes, loss information, and legal requirements and documents; external information such as domain and IP information, data breach information; and generated information such as open port information from external network scans, and vulnerabilities and avenues of attack. Thus, a cyber-physical graph may be used to represent a complete picture of an organization's infrastructure and operations.

In this example, which is necessarily simplified for clarity, the cyber-physical graph 2700 contains 12 nodes (vertices) comprising: seven computers and devices designated by solid circles 2702, 2703, 2704, 2706, 2707, 2709, 2710, two users designated by dashed-line circles 2701, 2711, and three functional groups designated by dotted-line circles 2705, 2708, and 2712. The edges (lines) between the nodes indicate relationships between the nodes, and have a direction and relationship indicator such as "AdminTo," "MemberOf," etc. While not shown here, the edges may also be assigned numerical weights or probabilities, indicating, for example, the likelihood of a successful attack gaining access from one node to another. Possible attack paths may be analyzed using the cyber-physical graph by running graph analysis algorithms such as shortest path algorithms, minimum cost/maximum flow algorithms, strongly connected node algorithms, A*, Dijkstra's, Random Walk, etc. In this example, several exemplary attack paths are ranked by likelihood. In the most likely attack path, user 2701 is an administrator to device 2702 to which device 2703 has connected. Device 2703 is a member of functional group 2708, which has a member of group 2712. Functional group 2712 is an administrator to the target 2706. In a second most likely attack path, user 2701 is an administrator to device 2707 to which device 2704 has connected. Device 2704 is a member of functional group 2705, which is an administrator to the target device 2706. In a third most likely attack path, a flaw in the security protocols allow the credentials of user 2701 to be used to gain access to device 2710. User 2711 who is working on device 2710 may be tricked into providing access to functional group 2705, which is an administrator to the target device 2706.

Figure 28:
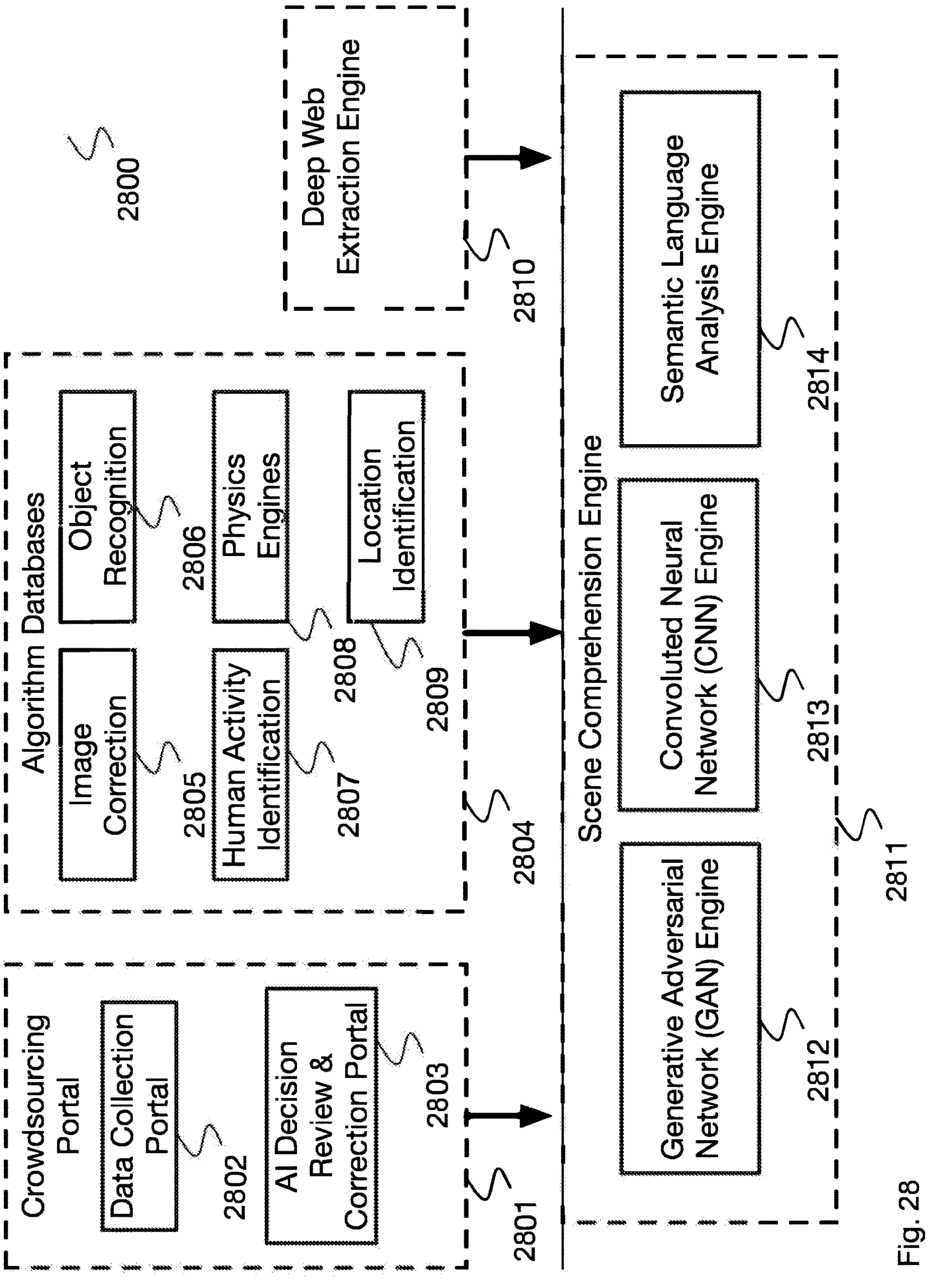
FIG. 28 is a block diagram showing an exemplary representation of a system for recognizing, classifying, and processing the context and meaning of images and video in a manner similar to human intuitive understanding of such context and meaning.

FIG. 28 is a block diagram showing an exemplary representation 2800 of a system for recognizing, classifying, and processing the context and meaning of images and video in a manner similar to human intuitive understanding of such context and meaning. The system is comprised of a crowdsourcing portal 2801, an algorithm database 2804, and a deep web extraction engine 2810, which provide inputs to a scene comprehension engine 2811. Images and video for analysis would come from a multiplicity of sources, including at least the crowdsourcing portal 2801. Through the crowdsourcing portal 2801, individuals and groups would be enabled to submit the images and video they generate from a multiplicity of devices through a data collection portal 2802 for analysis. The crowdsourcing portal 2801 would allow for inputs from a variety of mobile and fixed devices such as smartphones, vehicle mounted cameras, drones, robots, stationary cameras, etc. It would also allow for human review and correction of the context and meaning generated by the system through an AI decision review and correction portal 2803. Contributions could be either compensated monetarily or through non-monetary incentives, depending on the structure of the platform. The algorithm database 2804 would comprise specialized algorithms for image and video processing, including, but not limited to, image correction 2805, object recognition and identification 2806 (buildings, vehicles, plants/animals, people, etc.), human activity and role recognition and identification 2807 (sports, commuting, occupations, etc.), physics engines 2808, location recognition and identification 2809, and the like. The deep web extraction engine 2810 would gather real world information from the internet that is relevant to analyzing context and meaning. The scene comprehension engine 2811 would be comprised of a variety of machine learning algorithms (for example, generative adversarial networks (GANs) 2812, convoluted neural networks (CNNs) 2813, and semantic language analysis engines 2814) that would analyze the images and video obtained through the crowdsourcing engine 2811, using the algorithms contained in the algorithm database 2804 and the real world information provided by the deep web extraction engine 2810. The result would be a computer generated classification of the context and meaning of the images and video similar to the manner in which humans would understand such context and meaning, and would be usable for a wide variety of applications not currently possible with existing technology.

Figure 29:
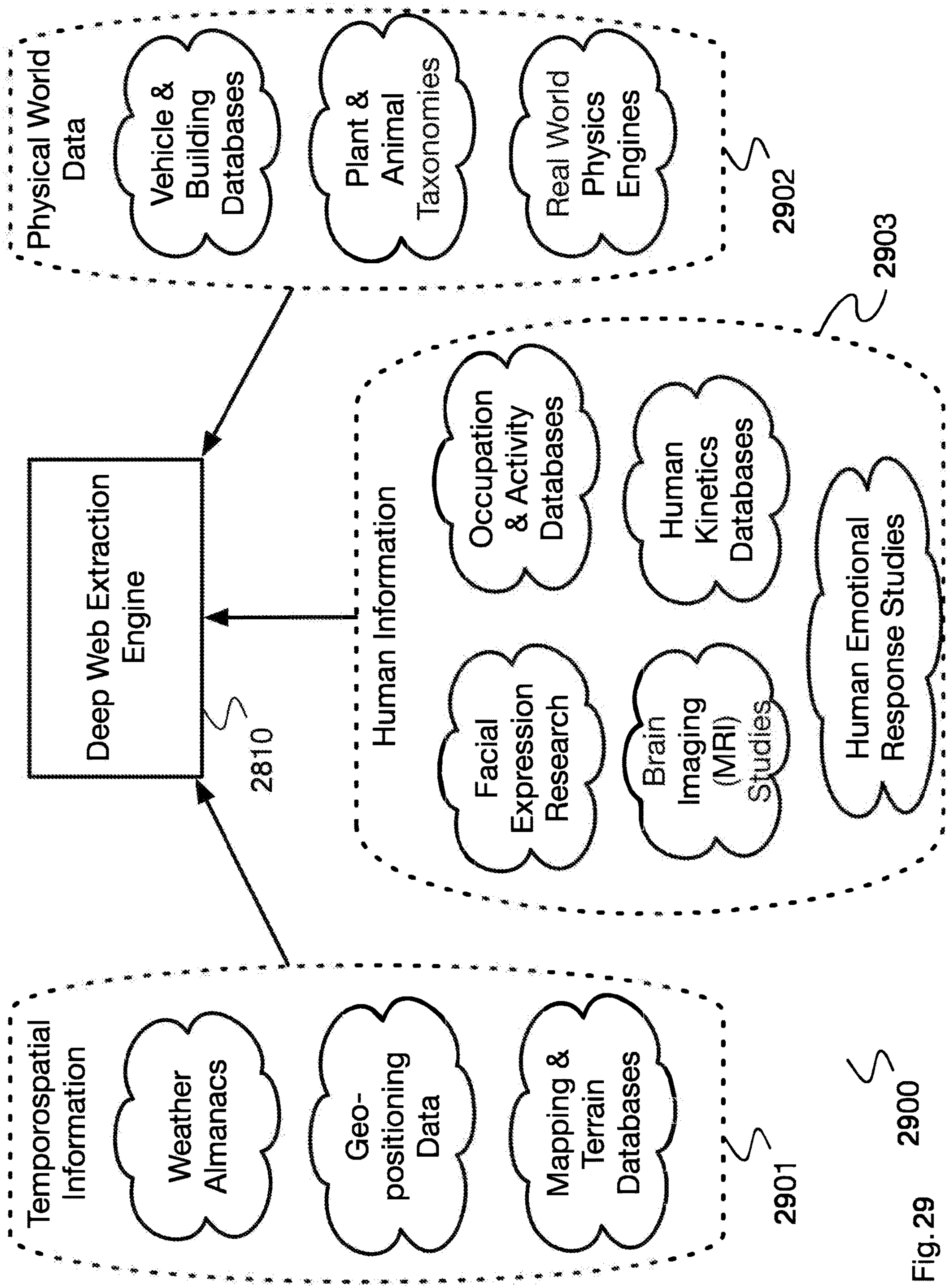
FIG. 29 is a conceptual diagram showing further detail regarding an aspect of the system, the deep web extraction engine and examples of the type of relevant contextual information that may be gathered by the deep web extraction engine for purposes of image and video analysis.

FIG. 29 is a diagram showing further detail regarding an aspect 2900 of the system, the previously disclosed deep web extraction engine 2810 and examples of the type of relevant contextual information that may be gathered by the deep web extraction engine 2810 for purposes of image and video analysis. The deep web extraction engine 2810 would gather real world information from the internet that is relevant to analyzing context and meaning, such as temporospatial information 2901 (weather, geopositioning, maps and terrain, etc.), physical world data 2902 (vehicle and building information, plant and animal taxonomies, physics models, etc.), and human information 2903 (facial expression information, occupation and activity information, brain imaging studies, human kinetics studies, and human emotional response studies, etc.). This gathered information would be fed into a comprehension engine 3112.

Figure 31:
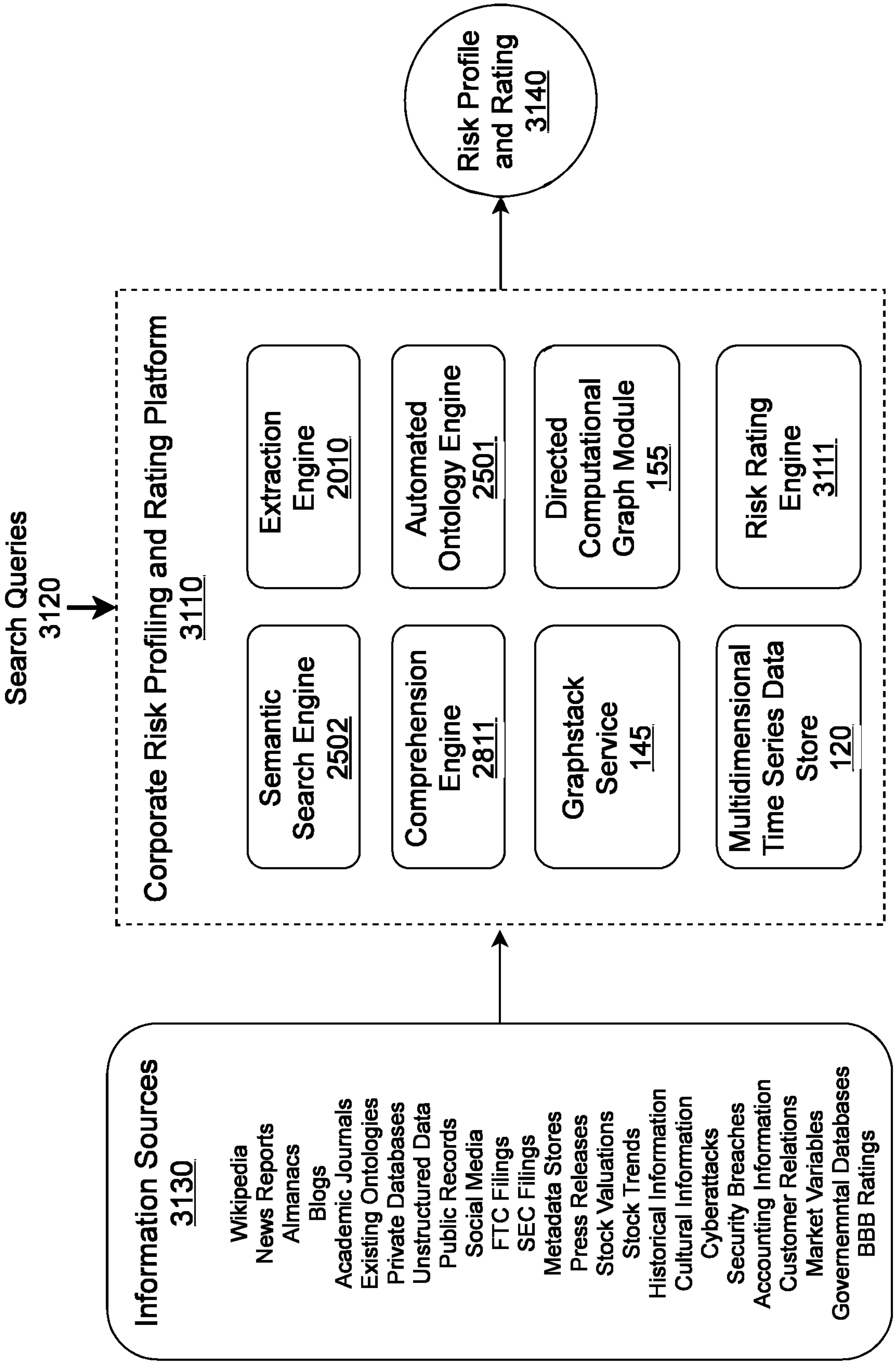
FIG. 31 is a block diagram showing an exemplary system architecture of a corporate risk profiling and rating platform.

FIG. 31 is a block diagram showing an exemplary system architecture of a corporate risk profiling and rating system 3110. The system 3110 includes the components: a semantic search engine 2502, an extraction engine 2010, a comprehension engine 2811, an automated ontology engine 2501, a GraphStack service 145, a directed computational graph module 155, a multidimensional time series data store 120, and a risk rating engine 3111. A user inputs a search query into the system 3110 that is analyzed by a semantic search engine 2502. This semantic search engine 2502 employs natural language processing (NLP) and machine learning (e.g., In2sql, NLSQL, and Quepy) to understand the intent of the search. Once the semantic search engine 2502 has determined the intended search 2511 parameters, being an individual or corporate entity in this case, a function call is made to an extraction engine 2010 that begins to coalesce data from all available private, public, and proprietary data sources 3130 using web-scrapers and data-extraction tools.

The data then flows to a comprehension engine 2811 which using the same semantic computing techniques (e.g., Amazon Comprehend, SpaCy, IBM Watson Tone Analyzer) parses through the information determining relational attributes to the search query 3120. This process appends data with temporal, geospatial (geoJSON formatted), information reliability, and contextual metadata as determined by the system's 3110 machine learning algorithms and ontological axioms configuration. As an example of system operation to construct an ontology, the comprehension engine 2811 runs in parallel with the automated ontology engine 2501 to store processed data, using web ontology language (OWL) and property graph extensions rooted in financial industry business ontology (FIBO) into the system's time-series data store 120.

After the ontological databases have been created and/or updated, a directed computational graph module 155 utilizing the ontologies generates a knowledge graph. A GraphStack service 145 identifies subgraphs of interest (from the knowledge graph), returns the subgraphs of interest, and bulk loads the data about the edges and vertices based on their swimlanes from the time-series data store into Spark. Spark then creates graphframes and performs comparative analysis of individual time slices which provide temporospatial information to the risk rating engine 3111. This information is used by the risk rating engine's 3111 semantic computing and machine learning algorithms to determine the risk impact likelihood to the entity. Furthermore, the risk rating engine 3111 uses spectral graph theory (adjacency matrices) to perform additional comparative temporospatial analysis in parallel with Spark's graphframe analysis to provide deeper comparative analysis thus providing more reliable results of the risk profile and rating 3140. More specifically, the risk rating engine 3111 using the comparative analysis results, parses each result through a semantic computing (NLP) and machine learning algorithm which identifies, categorizes, and scores each relation with a risk score. The risk rating engine 315 then sums all scores and produces a risk rating profile 340 to the client comprising the knowledge graph and numerical risk score.

As an example of temporospatial comparative analysis, assume that lead paint had never been banned in the United States and is a current topic of discussion. If a query were initiated on a paint manufacturing company that produced lead paint, the knowledge graph generated would include vertices and edges derived from public/legal discourse as well as proposed governmental legislation that a potential ban on lead paint may be imminent. This would be understood by comparative analysis on temporospatial slices in the form of graphframes and adjacency matrices where the risk rating engine 3111 would assign a higher risk score based on the analysis. Expand upon this idea to understand why temporospatial attributes are critical to understanding risk in today's volatile market. More detail on the knowledge graph and risk rating engine 3111 follows in FIG. 32 and FIG. 33.

Figure 32:
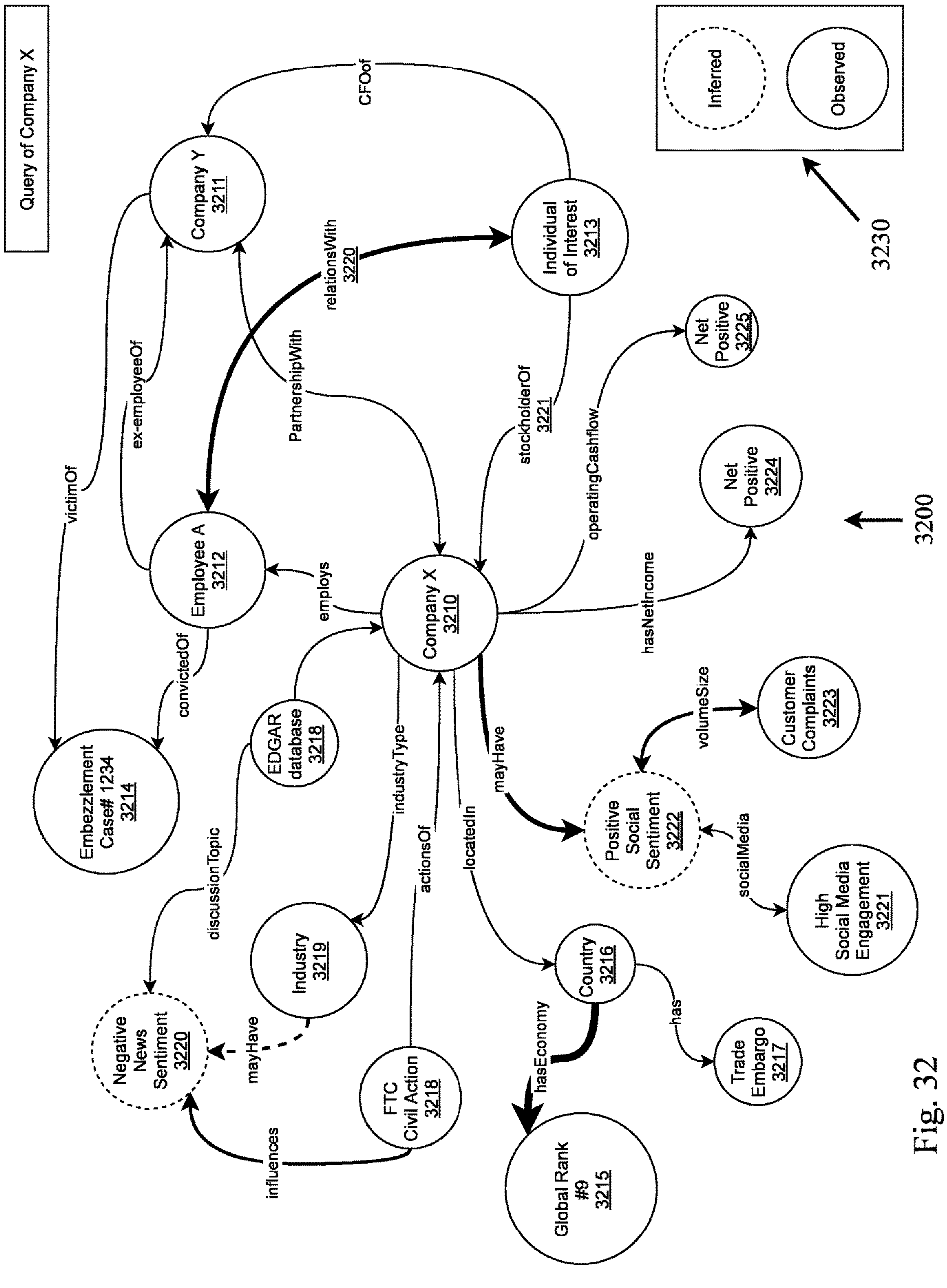
FIG. 32 is a weighted and directed graph diagram showing an exemplary advanced temporospatial knowledge graph and its use for counterparty risk analysis.

FIG. 32 is a weighted and directed graph diagram showing an exemplary advanced temporospatial knowledge graph and its possible use in counterparty risk mitigation and analysis. Once a query is presented to the corporate risk profiling and rating platform 3110, an advanced temporospatial knowledge graph (ATKG) 3200 is generated. The ATKG 3200 in this example has been generated by an interested party with regards to Company X 3210. Interested parties may comprise investors, potential clients or business partners, investigators, etc.

Looking at this simplified example, one might initially notice that Company X 3210 has business dealings with Company Y 3211. The user may then query Company Y 3211 through a new request or by interacting with the node. However, the ATKGE 3110 has already identified useful and meaningful relations to other entities and generated those within the original query of Company X 3210. For example, it may be determined, through social media, personnel databases, or government records that Company X 3210 and Company Y 3211 have employed or are currently employing the same individual 3212. Furthermore, it may be of interest that the individual, Employee A 3212, has been convicted of embezzlement 3214 in Company Y 3211 and was found to have relations to another individual of interest 3213. The significance of some relations is left up to the user however, the system may be configured to provide additional insights such as potential risk or evidentiary proof.

As an example, the system may be configured to show the amount of observed and reliable data points and to manifest as the weight of the edges, as in relations With 3220. Where the weight of the edge relations With 3220 is heavier due to both individuals 3212/3213 connected on multiple social media platforms or forums as opposed to only one data point to show that the individual of interest 3213 is a stockholder of 3221 Company X 3210.

As another example, the system may be configured to show the inferred risk as differing diameters of vertices. According to the query by the user, the system may have determined that considering temporal and public sentiment that the global rank 3215 of the country 3216 in which Company X 3210 operates in, is more significant to the query parameters than is a trade embargo 3217. A plethora of configurable options are available and more may be added with relative ease. The knowledge graph 3200 also provides context into whether vertices and edges are formed from inferred algorithms or observed 3230 through reliable data points.

Detailing more aspects of the system and method, we might consider the relations of governmental databases 3218, legislative actions 3218, or news reports 3220 which may affect the company 3210 itself or simply the industry 3219. Again, other aspects of the system and method include ingesting unstructured data such as websites, blogs, and social media 3221 as well as proprietary data such as customer relations data 3223 and balance sheets 3224/3225 in order to understand sentiment 3222 and potential risk factors of said company 3210.

The graph exemplified here does not include all advanced temporospatial knowledge graph engine 3210 features, present or future, and is intended as a simplified version of an advanced temporospatial knowledge graph 3200.

Detailed Description of Exemplary Aspects

Figure 8:
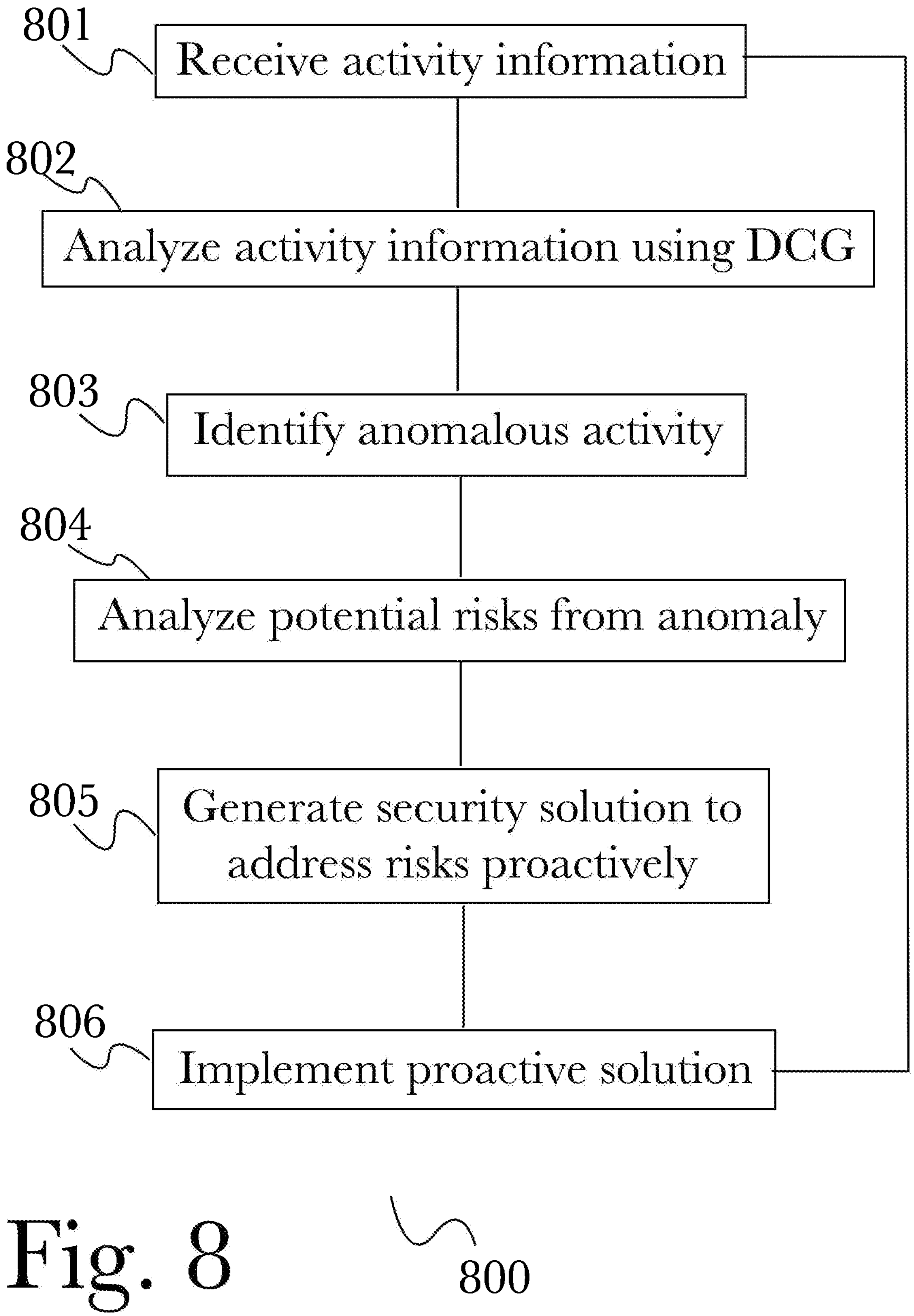
FIG. 8 is a flow diagram of an exemplary method for cybersecurity behavioral analytics.

FIG. 8 is a flow diagram of an exemplary method 800 for cybersecurity behavioral analytics. According to the aspect, behavior analytics may utilize passive information feeds from a plurality of existing endpoints (for example, including but not limited to user activity on a network, network performance, or device behavior) to generate security solutions. In an initial step 801, a web crawler 115 may passively collect activity information, which may then be processed 802 using a DCG 155 to analyze behavior patterns. Based on this initial analysis, anomalous behavior may be recognized 803 (for example, based on a threshold of variance from an established pattern or trend) such as high-risk users or malicious software operators such as bots. These anomalous behaviors may then be used 804 to analyze potential angles of attack and then produce 805 security suggestions based on this second-level analysis and predictions generated by an action outcome simulation module 125 to determine the likely effects of the change. The suggested behaviors may then be automatically implemented 806 as needed. Passive monitoring 801 then continues, collecting information after new security solutions are implemented 806, enabling machine learning to improve operation over time as the relationship between security changes and observed behaviors and threats are observed and analyzed.

This method 800 for behavioral analytics enables proactive and high-speed reactive defense capabilities against a variety of cyberattack threats, including anomalous human behaviors as well as nonhuman "bad actors" such as automated software bots that may probe for, and then exploit, existing vulnerabilities. Using automated behavioral learning in this manner provides a much more responsive solution than manual intervention, enabling rapid response to threats to mitigate any potential impact. Utilizing machine learning behavior further enhances this approach, providing additional proactive behavior that is not possible in simple automated approaches that merely react to threats as they occur.

Figure 9:
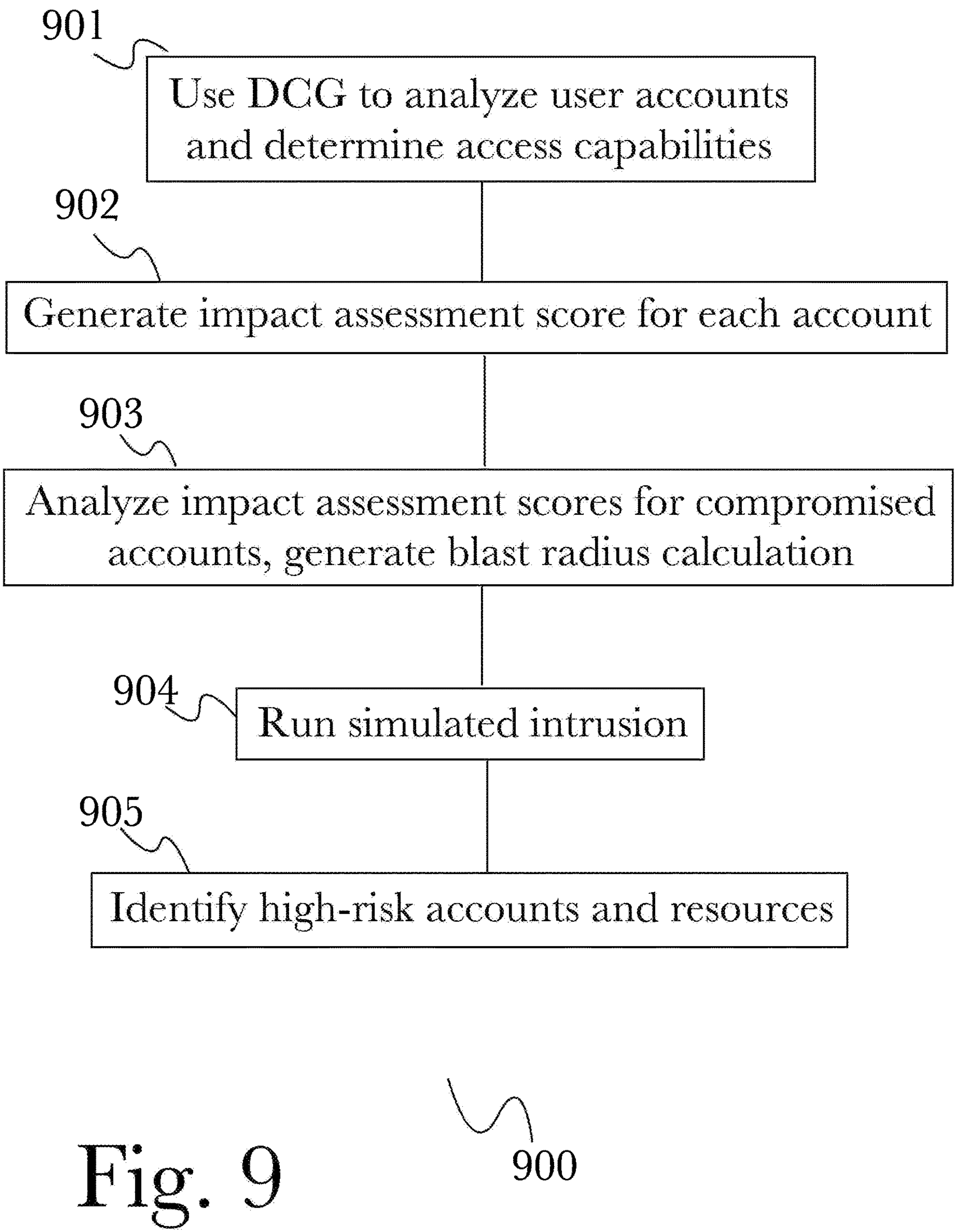
FIG. 9 is a flow diagram of an exemplary method for measuring the effects of cybersecurity attacks.

FIG. 9 is a flow diagram of an exemplary method 900 for measuring the effects of cybersecurity attacks. According to the aspect, impact assessment of an attack may be measured using a DCG 155 to analyze a user account and identify its access capabilities 901 (for example, what files, directories, devices or domains an account may have access to). This may then be used to generate 902 an impact assessment score for the account, representing the potential risk should that account be compromised. In the event of an incident, the impact assessment score for any compromised accounts may be used to produce a "blast radius" calculation 903, identifying exactly what resources are at risk as a result of the intrusion and where security personnel should focus their attention. To provide proactive security recommendations through a simulation module 125, simulated intrusions may be run 904 to identify potential blast radius calculations for a variety of attacks and to determine 905 high risk accounts or resources so that security may be improved in those key areas rather than focusing on reactive solutions.

Figure 10:
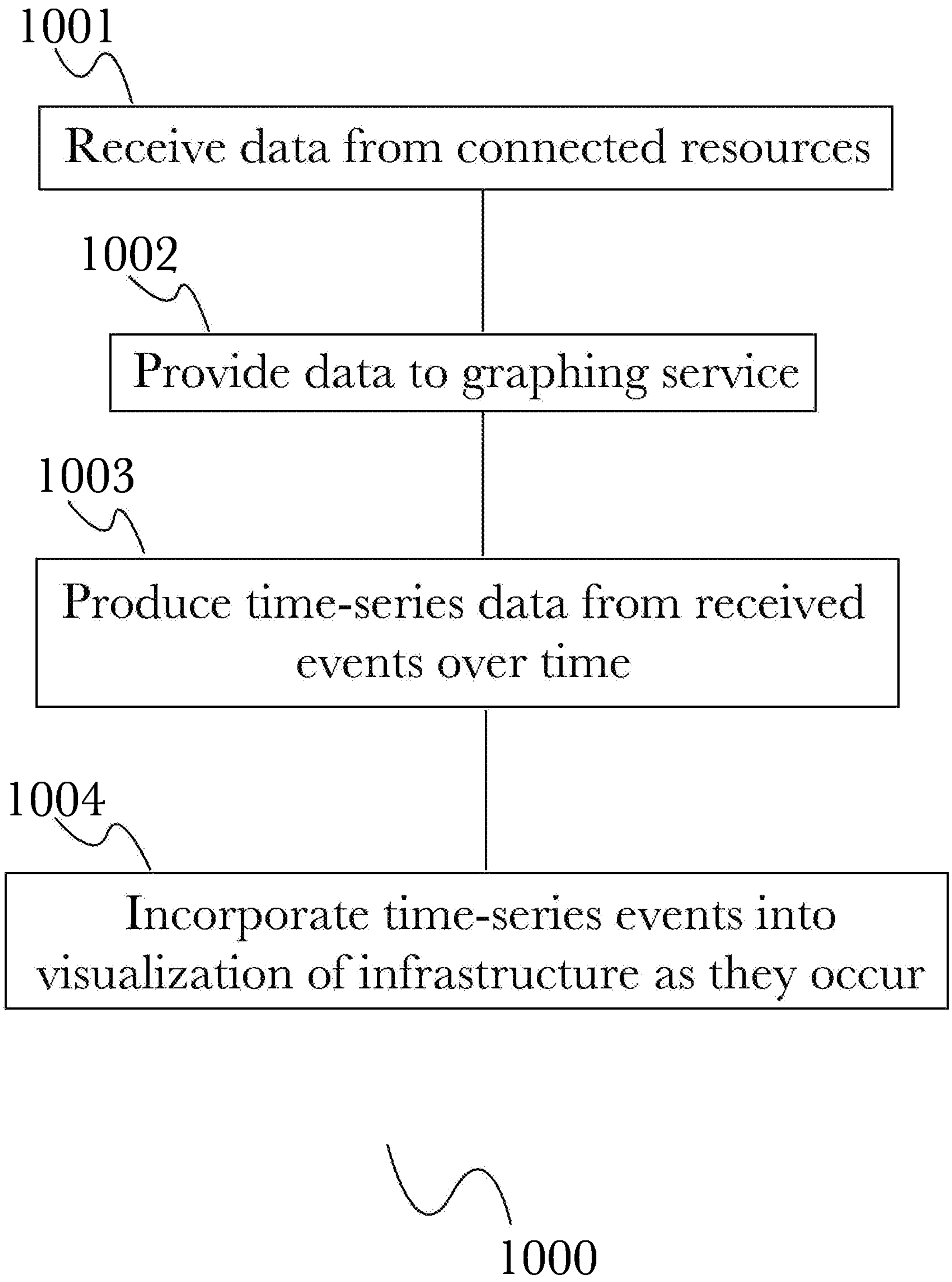
FIG. 10 is a flow diagram of an exemplary method for continuous cybersecurity monitoring and exploration.

FIG. 10 is a flow diagram of an exemplary method 1000 for continuous cybersecurity monitoring and exploration.

According to the aspect, a state observation service 140 may receive data from a variety of connected systems 1001 such as (for example, including but not limited to) servers, domains, databases, or user directories. This information may be received continuously, passively collecting events and monitoring activity over time while feeding 1002 collected information into a graphing service 145 for use in producing time-series graphs 1003 of states and changes over time. This collated time-series data may then be used to produce a visualization 1004 of changes over time, quantifying collected data into a meaningful and understandable format. As new events are recorded, such as changing user roles or permissions, modifying servers or data structures, or other changes within a security infrastructure, these events are automatically incorporated into the time-series data and visualizations are updated accordingly, providing live monitoring of a wealth of information in a way that highlights meaningful data without losing detail due to the quantity of data points under examination.

Figure 11:
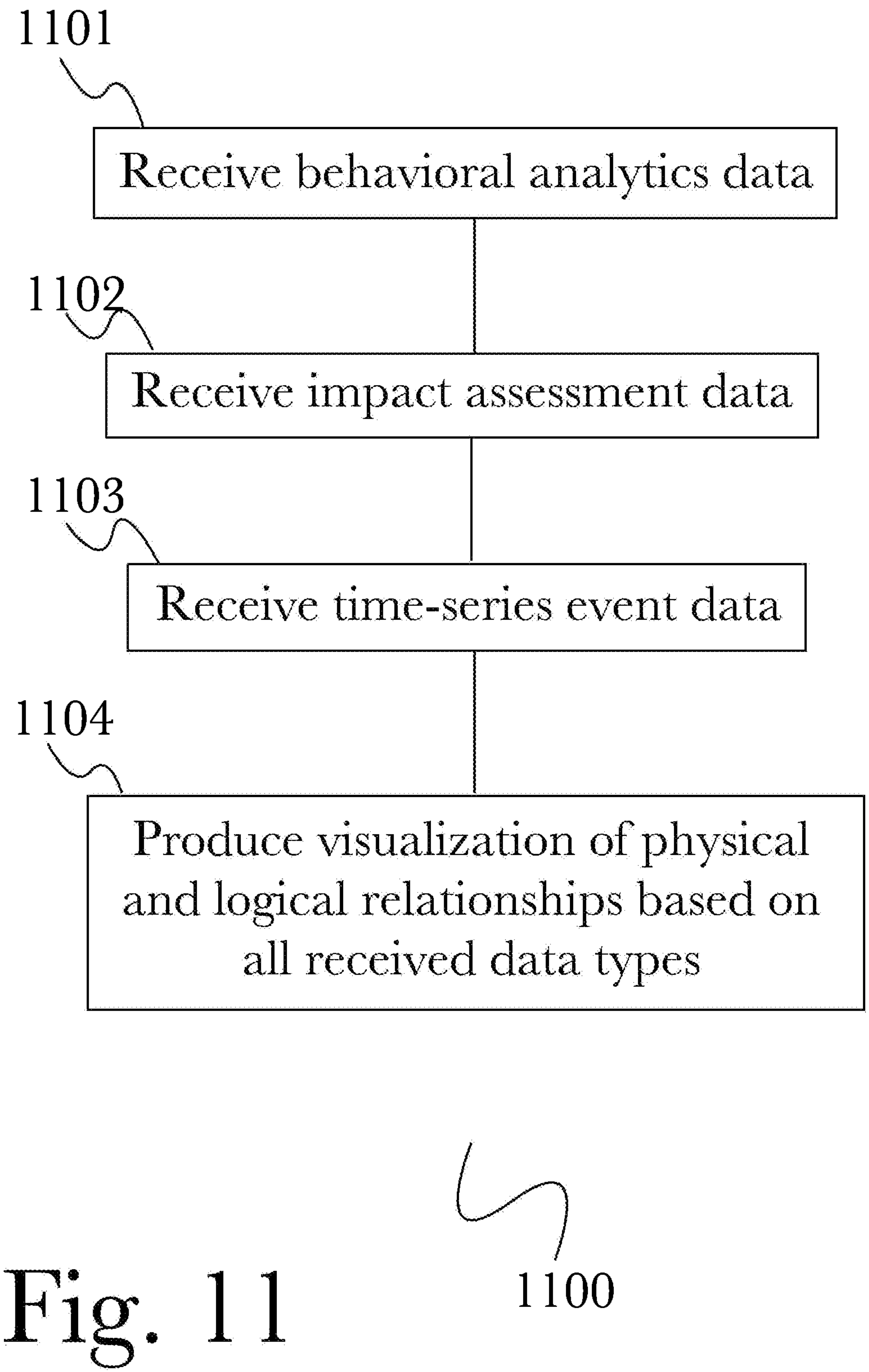
FIG. 11 is a flow diagram of an exemplary method for mapping a cyber-physical system graph.

FIG. 11 is a flow diagram of an exemplary method 1100 for mapping a cyber-physical system graph (CPG). According to the aspect, a cyber-physical system graph may comprise a visualization of hierarchies and relationships between devices and resources in a security infrastructure, contextualizing security information with physical device relationships that are easily understandable for security personnel, and users. In an initial step 1101, behavior analytics information (as described previously, referring to FIG. 8) may be received at a graphing service 145 for inclusion in a CPG. In a next step 1102, impact assessment scores (as described previously, referring to FIG. 9) may be received and incorporated in the CPG information, adding risk assessment context to the behavior information. In a next step 1103, time-series information (as described previously, referring to FIG. 10) may be received and incorporated, updating CPG information as changes occur and events are logged. This information may then be used to produce 1104 a graph visualization of users, servers, devices, and other resources correlating physical relationships (such as a user's personal computer or smartphone, or physical connections between servers) with logical relationships (such as access privileges or database connections), to produce a meaningful and contextualized visualization of a security infrastructure that reflects the current state of the internal relationships present in the infrastructure.

Figure 12:
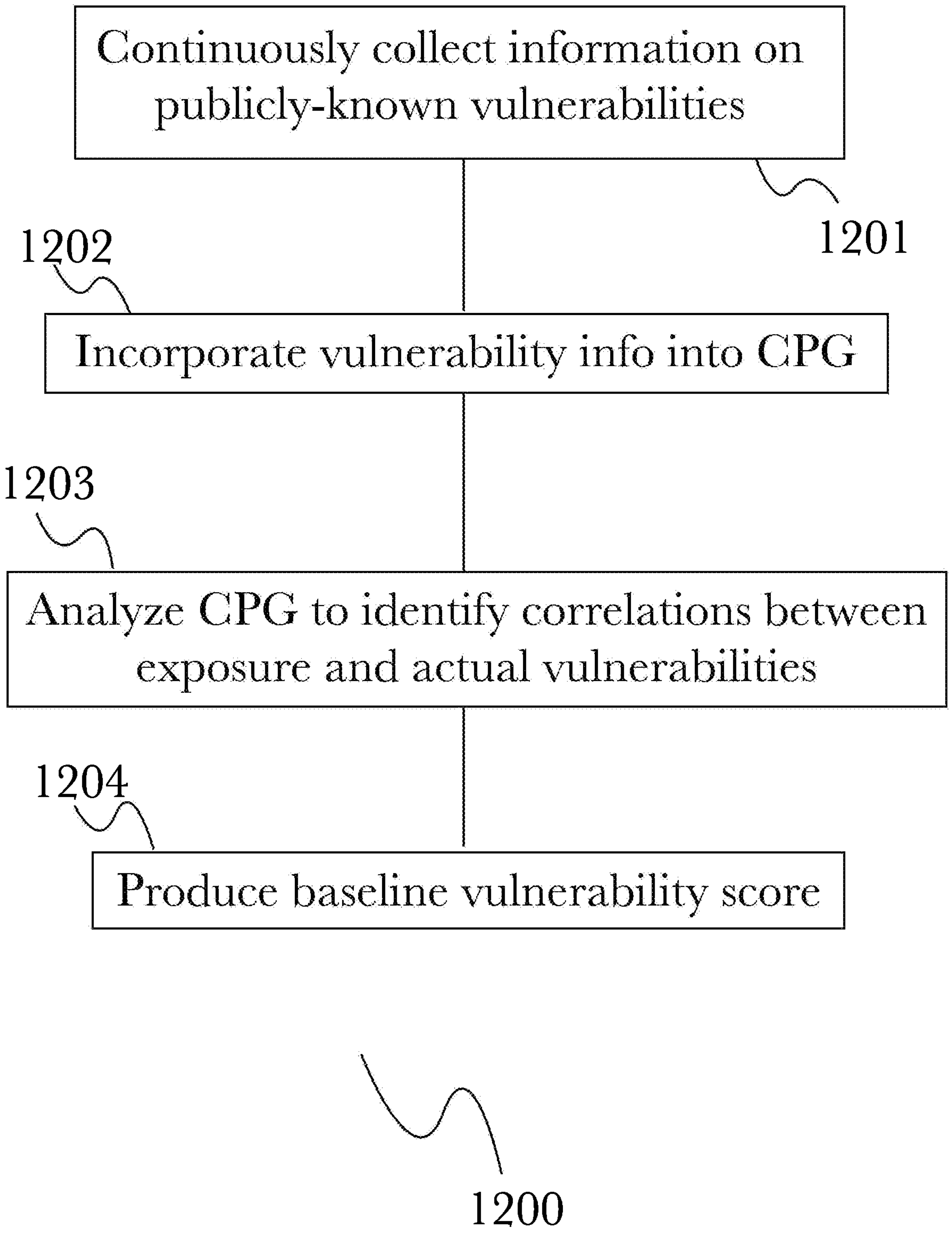
FIG. 12 is a flow diagram of an exemplary method for continuous network resilience rating.

FIG. 12 is a flow diagram of an exemplary method 1200 for continuous network resilience rating. According to the aspect, a baseline score can be used to measure an overall level of risk for a network infrastructure, and may be compiled by first collecting 1201 information on publicly-disclosed vulnerabilities, such as (for example) using the Internet or common vulnerabilities and exploits (CVE) process. This information may then 1202 be incorporated into a CPG as described previously in FIG. 11, and the combined data of the CPG and the known vulnerabilities may then be analyzed 1203 to identify the relationships between known vulnerabilities and risks exposed by components of the infrastructure. This produces a combined CPG 1204 that incorporates both the internal risk level of network resources, user accounts, and devices as well as the actual risk level based on the analysis of known vulnerabilities and security risks.

Figure 13:
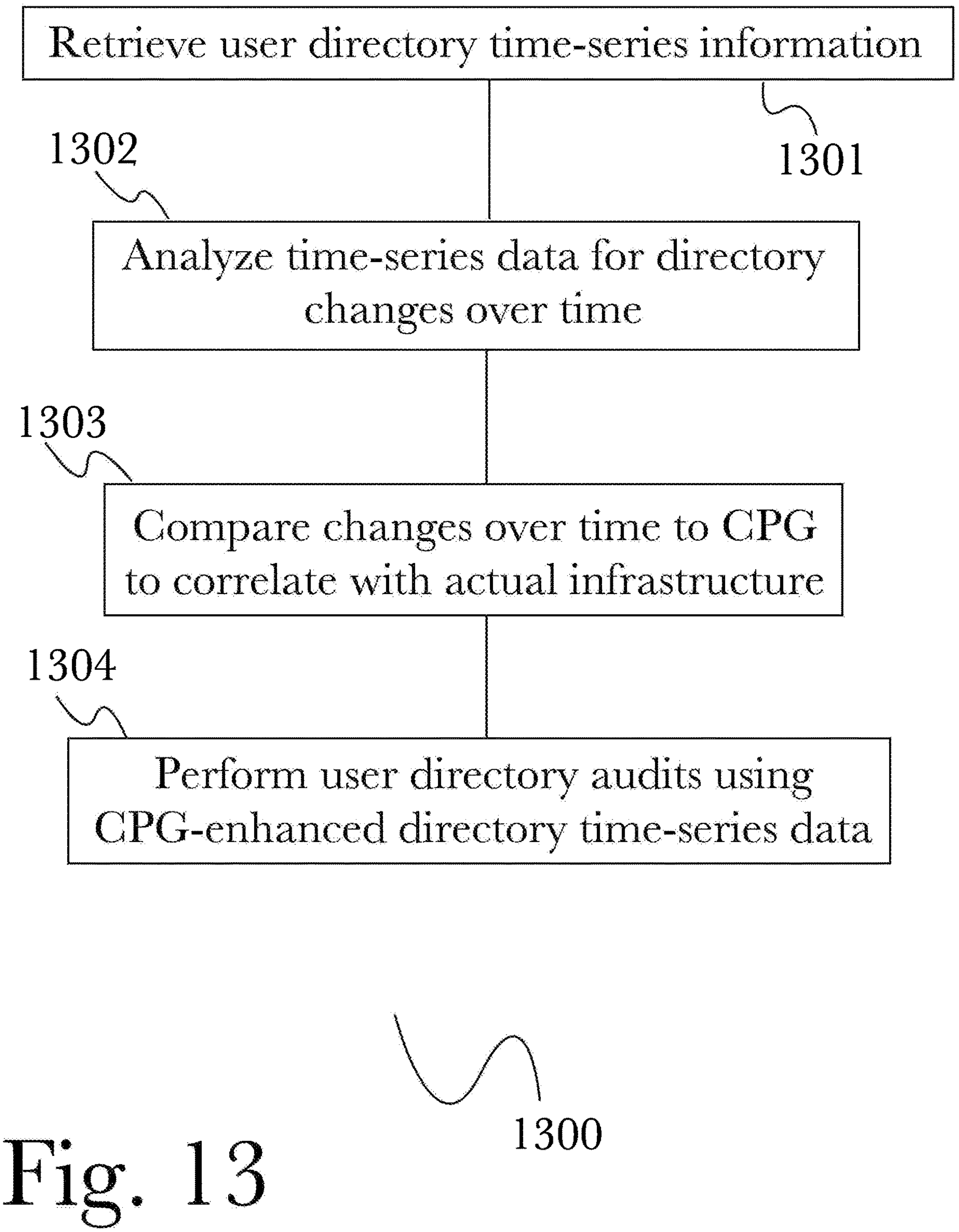
FIG. 13 is a flow diagram of an exemplary method for cybersecurity privilege oversight.

FIG. 13 is a flow diagram of an exemplary method 1300 for cybersecurity privilege oversight. According to the aspect, time-series data (as described above, referring to FIG. 10) may be collected 1301 for user accounts, credentials, directories, and other user-based privilege and access information. This data may then 1302 be analyzed to identify changes over time that may affect security, such as modifying user access privileges or adding new users. The results of analysis may be checked 1303 against a CPG (as described previously in FIG. 11), to compare and correlate user directory changes with the actual infrastructure state. This comparison may be used to perform accurate and context-enhanced user directory audits 1304 that identify not only current user credentials and other user-specific information, but changes to this information over time and how the user information relates to the actual infrastructure (for example, credentials that grant access to devices and may therefore implicitly grant additional access due to device relationships that were not immediately apparent from the user directory alone).

Figure 14:
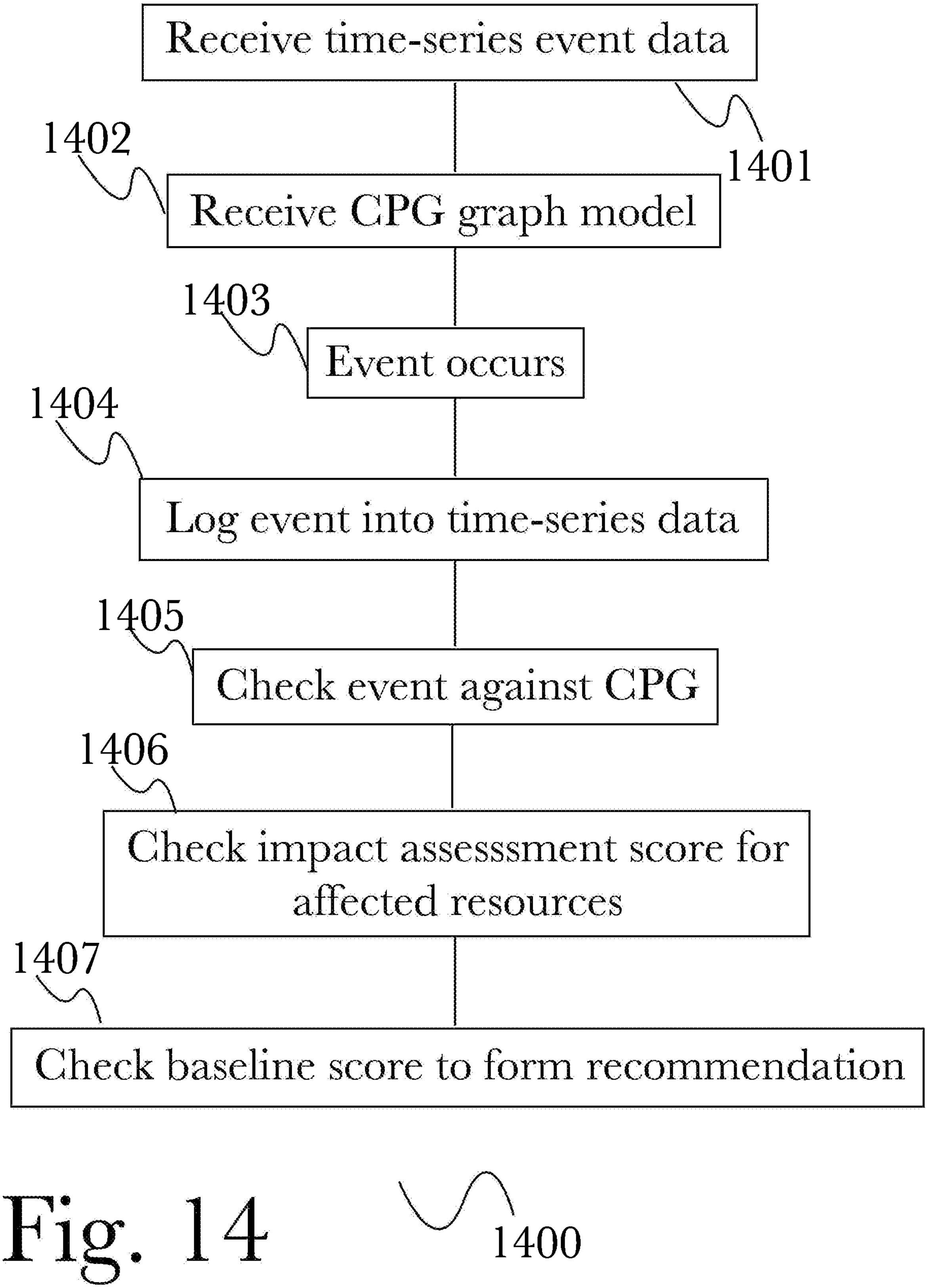
FIG. 14 is a flow diagram of an exemplary method for cybersecurity risk management.

FIG. 14 is a flow diagram of an exemplary method 1400 for cybersecurity risk management. According to the aspect, multiple methods described previously may be combined to provide live assessment of attacks as they occur, by first receiving 1401 time-series data for an infrastructure (as described previously, in FIG. 10) to provide live monitoring of network events. This data is then enhanced 1402 with a CPG (as described above in FIG. 11) to correlate events with actual infrastructure elements, such as servers or accounts. When an event (for example, an attempted attack against a vulnerable system or resource) occurs 1403, the event is logged in the time-series data 1404, and compared against the CPG 1405 to determine the impact. This is enhanced with the inclusion of impact assessment information 1406 for any affected resources, and the attack is then checked against a baseline score 1407 to determine the full extent of the impact of the attack and any necessary modifications to the infrastructure or policies.

Figure 15:
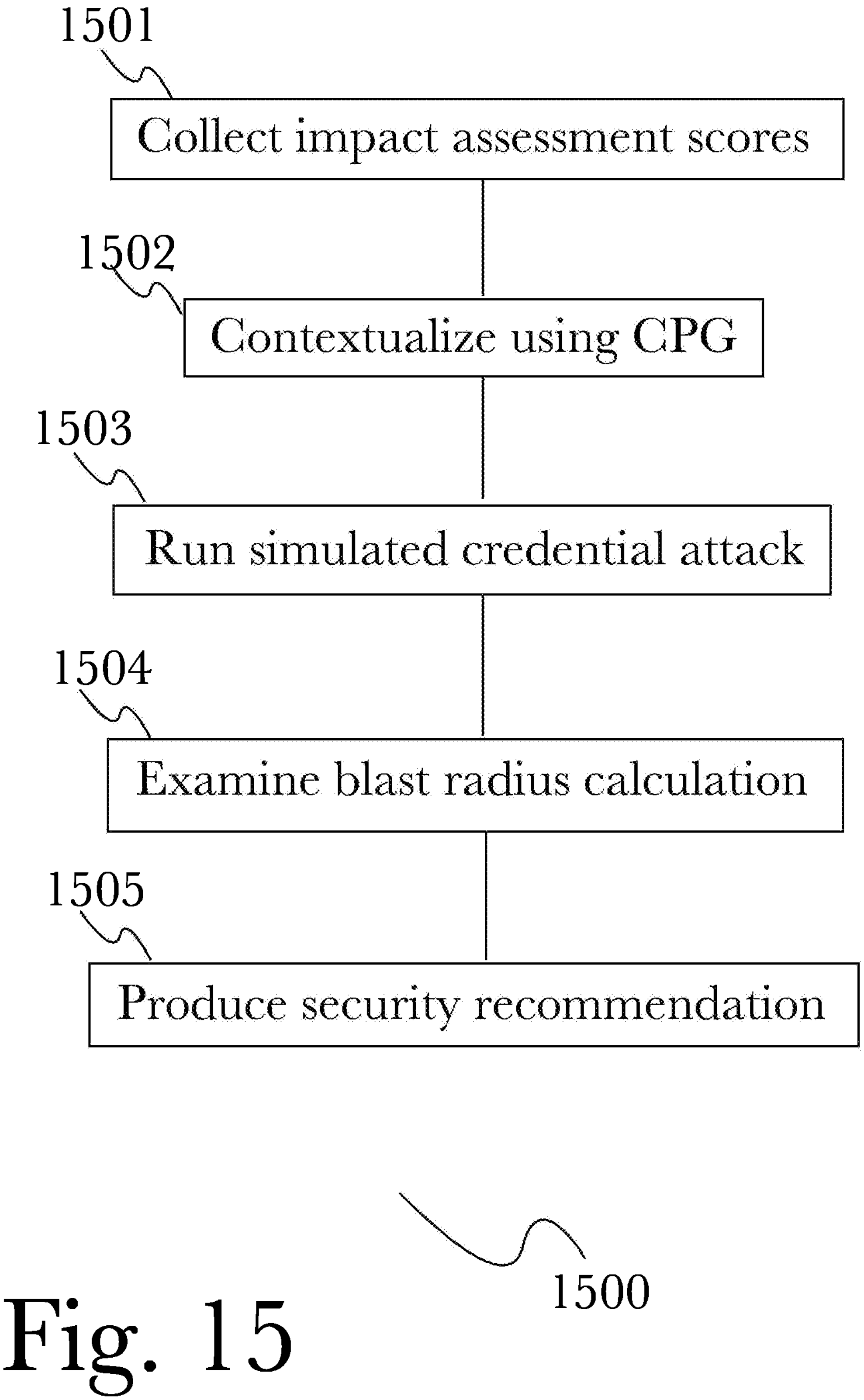
FIG. 15 is a flow diagram of an exemplary method for mitigating compromised credential threats.

FIG. 15 is a flow diagram of an exemplary method 1500 for mitigating compromised credential threats. According to the aspect, impact assessment scores (as described previously, referring to FIG. 9) may be collected 1501 for user accounts in a directory, so that the potential impact of any given credential attack is known in advance of an actual attack event. This information may be combined with a CPG 1502 as described previously in FIG. 11, to contextualize impact assessment scores within the infrastructure (for example, so that it may be predicted what systems or resources might be at risk for any given credential attack). A simulated attack may then be performed 1503 to use machine learning to improve security without waiting for actual attacks to trigger a reactive response. A blast radius assessment (as described above in FIG. 9) may be used in response 1504 to determine the effects of the simulated attack and identify points of weakness, and produce a recommendation report 1505 for improving and hardening the infrastructure against future attacks.

Figure 16:
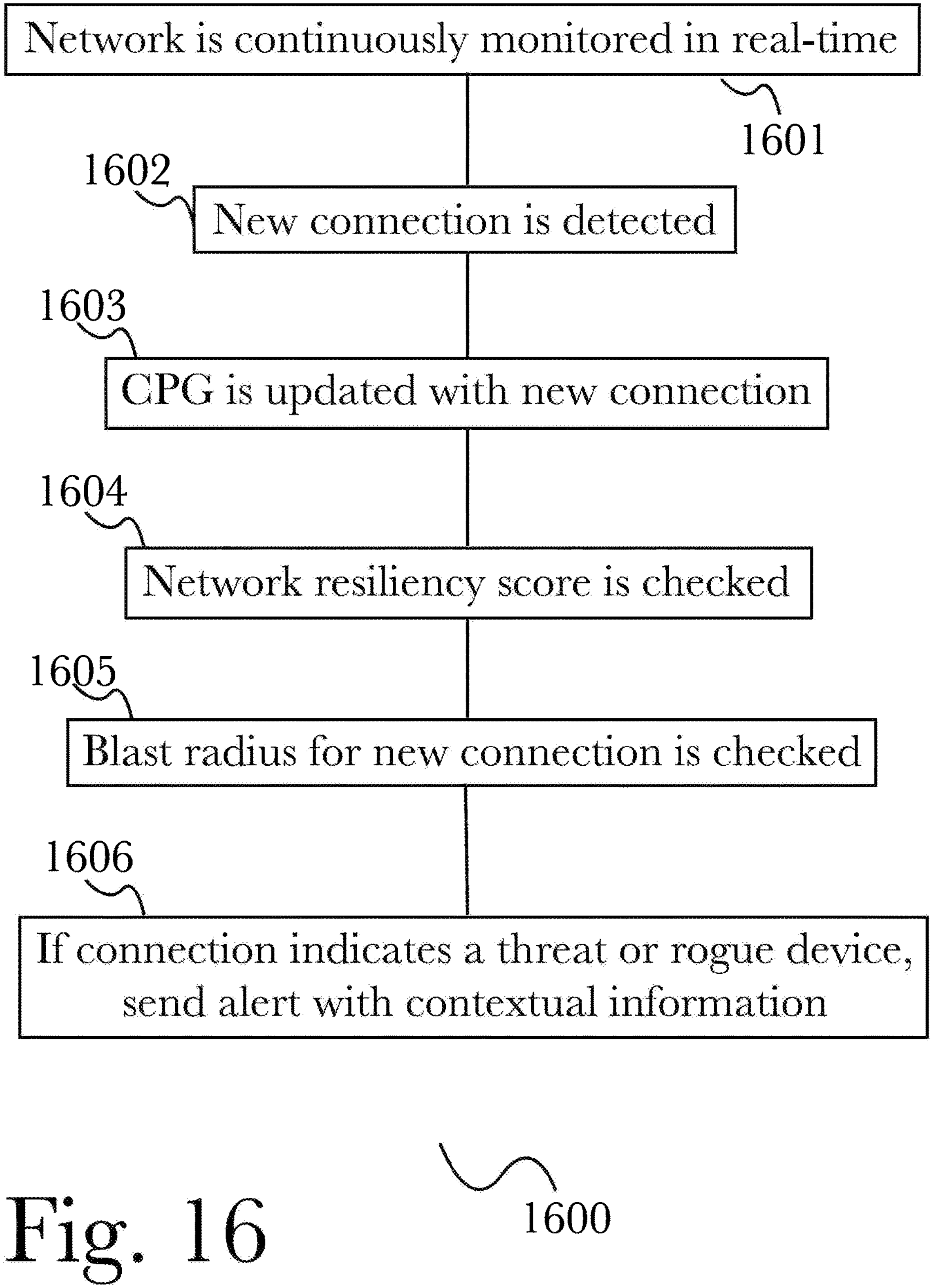
FIG. 16 is a flow diagram of an exemplary method for dynamic network and rogue device discovery.

FIG. 16 is a flow diagram of an exemplary method 1600 for dynamic network and rogue device discovery. According to the aspect, an advanced cyber decision platform may continuously monitor a network in real-time 1601, detecting any changes as they occur. When a new connection is detected 1602, a CPG may be updated 1603 with the new connection information, which may then be compared against the network's resiliency score 1604 to examine for potential risk. The blast radius metric for any other devices involved in the connection may also be checked 1605, to examine the context of the connection for risk potential (for example, an unknown connection to an internal data server with sensitive information may be considered a much higher risk than an unknown connection to an externally-facing web server). If the connection is a risk, an alert may be sent to an administrator 1606 with the contextual information for the connection to provide a concise notification of relevant details for quick handling.

Figure 17:
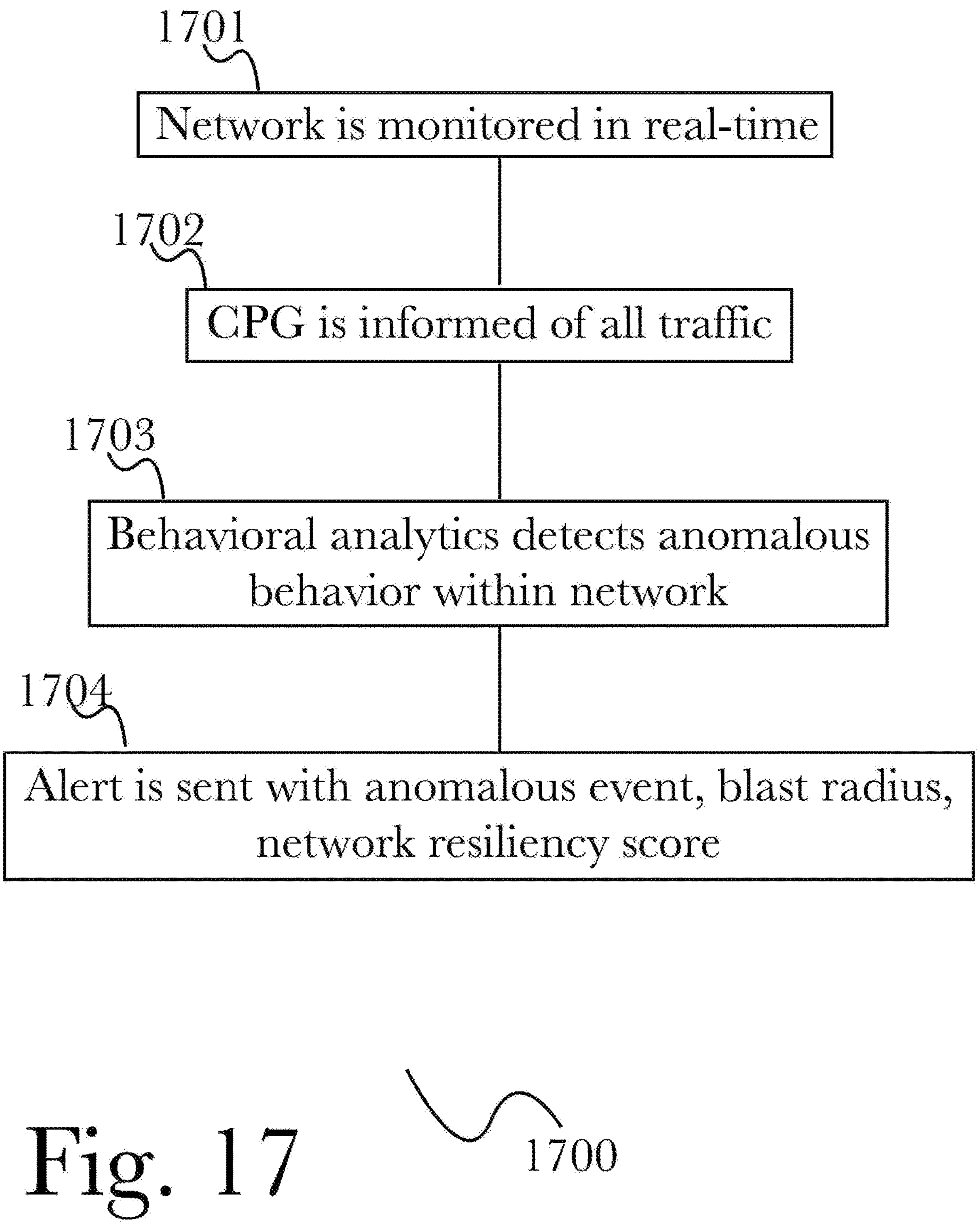
FIG. 17 is a flow diagram of an exemplary method for Kerberos "golden ticket" attack detection.

FIG. 17 is a flow diagram of an exemplary method 1700 for Kerberos "golden ticket" attack detection. Kerberos is a network authentication protocol employed across many enterprise networks to enable single sign-on and authentication for enterprise services. This makes it an attractive target for attacks, which can result in persistent, undetected access to services within a network in what is known as a "golden ticket" attack. To detect this form of attack, behavioral analytics may be employed to detect forged authentication tickets resulting from an attack. According to the aspect, an advanced cyber decision platform may continuously monitor a network 1701, informing a CPG in real-time of all traffic associated with entities in an organization, for example, people, places, devices, or services 1702. Machine learning algorithms detect behavioral anomalies as they occur in real-time 1703, notifying administrators with an assessment of the anomalous event 1704 as well as a blast radius score for the particular event and a network resiliency score to advise of the overall health of the network. By automatically detecting unusual behavior and informing an administrator of the anomaly along with contextual information for the event and network, a compromised ticket is immediately detected when a new authentication connection is made.

Figure 18:
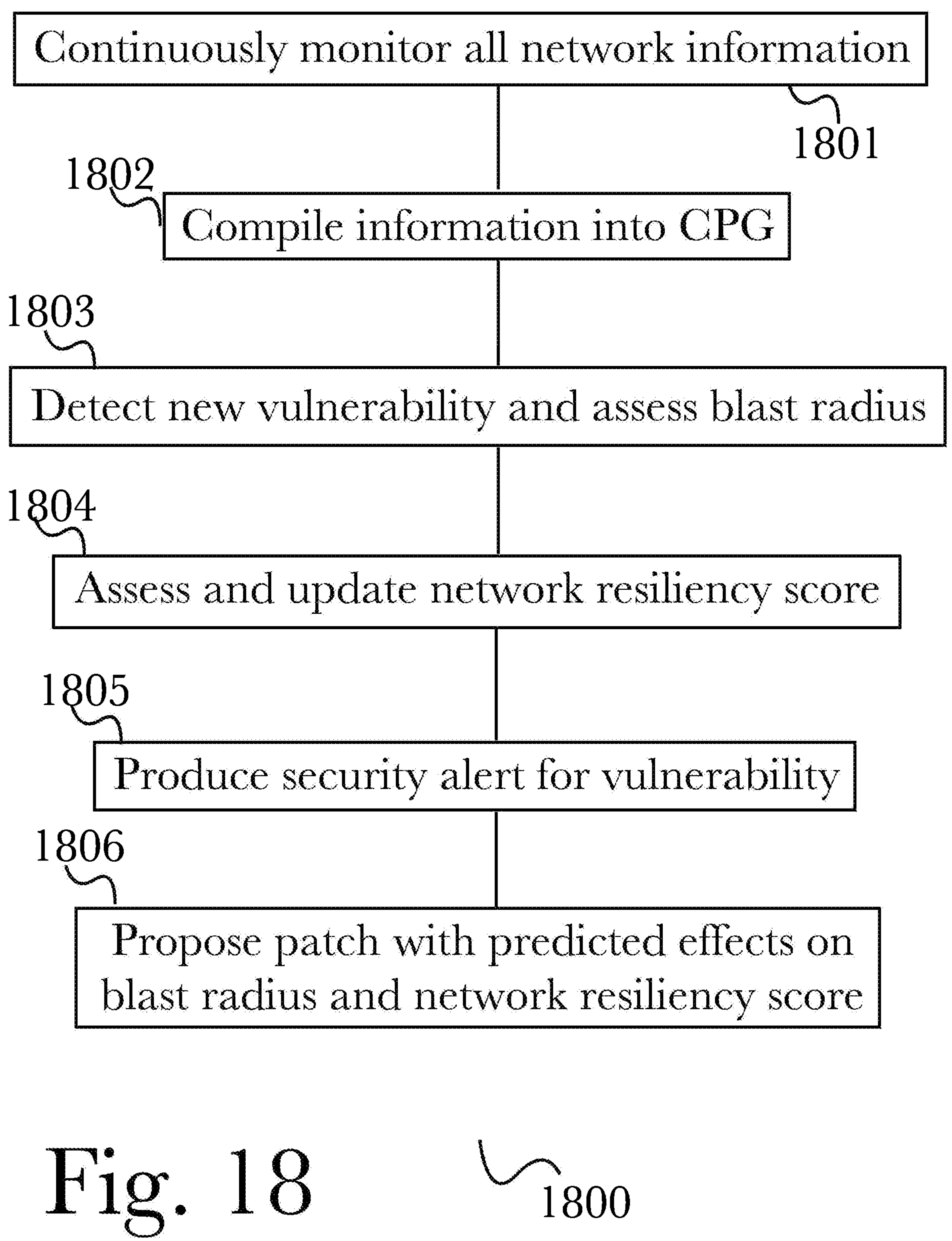
FIG. 18 is a flow diagram of an exemplary method for risk-based vulnerability and patch management.

FIG. 18 is a flow diagram of an exemplary method 1800 for risk-based vulnerability and patch management. According to the aspect, an advanced cyber decision platform may monitor all information about a network 1801, including (but not limited to) device telemetry data, log files, connections and network events, deployed software versions, or contextual user activity information. This information is incorporated into a CPG 1802 to maintain an up-to-date model of the network in real-time. When a new vulnerability is discovered, a blast radius score may be assessed 1803 and the network's resiliency score may be updated 1804 as needed. A security alert may then be produced 1805 to notify an administrator of the vulnerability and its impact, and a proposed patch may be presented 1806 along with the predicted effects of the patch on the vulnerability's blast radius and the overall network resiliency score. This determines both the total impact risk of any particular vulnerability, as well as the overall effect of each vulnerability on the network as a whole. This continuous network assessment may be used to collect information about new vulnerabilities and exploits to provide proactive solutions with clear result predictions before attacks occur.

Figure 23:
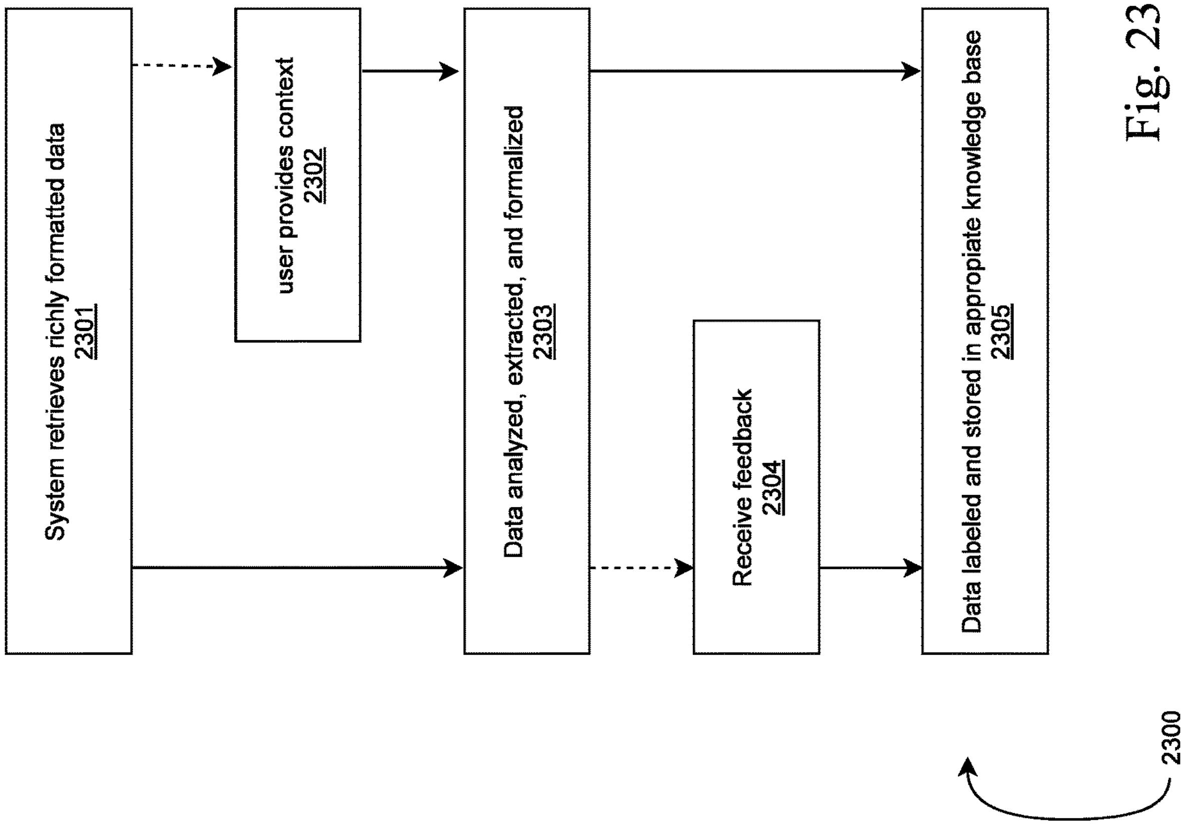
FIG. 23 is a flow diagram illustrating a method for knowledge base construction according to various embodiments of the invention.

FIG. 23 is a flow diagram illustrating a method 2300 for knowledge base construction according to various embodiments of the invention. At an initial step 2301, system 2000 retrieves richly formatted data from a plurality of sources, which may include, local storage, cloud storage, web pages, and the like. At an optional step 2302, a user may provide the system with context to refine types of data that are extracted, for instance, financial data for a particular company. At step 2303, the system analyzes the richly formatted data using the various functions of extraction engine 2010, extracts the relevant information, and formalizes the data. At another optional step 2304, the system may receive feedback regarding the data from a variety of sources, a few of which are disclosed above in FIG. 22. At step 2305, the data is labeled, and stored in an appropriate knowledge base. If no knowledge base exists, the system may create a new knowledge base to store the data.

Figure 30:
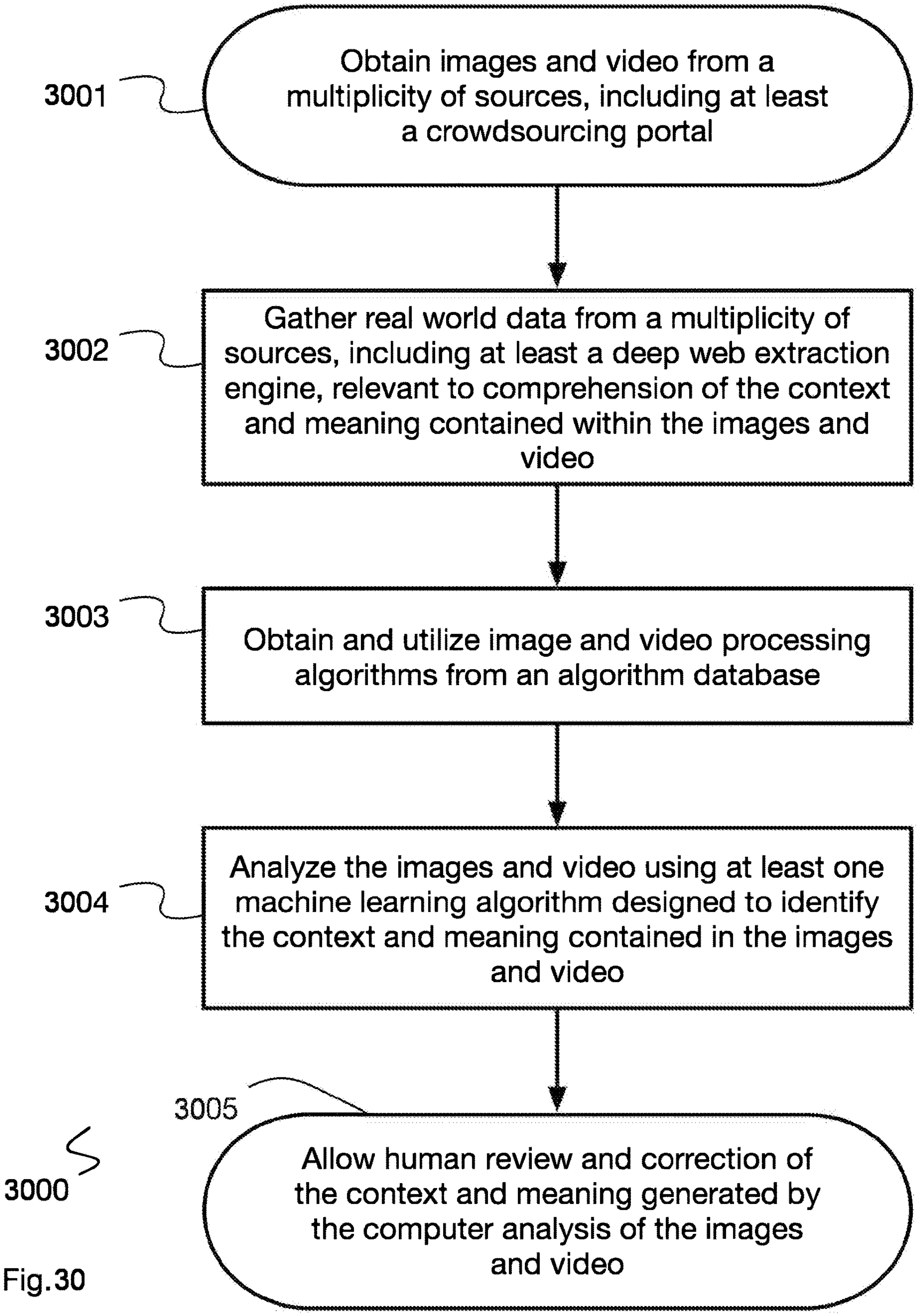
FIG. 30 is a process flow diagram illustrating a method for recognizing, classifying, and processing the context and meaning of images and video in a manner similar to human intuitive understanding of such context and meaning.

FIG. 30 is a process flow diagram illustrating a method 3000 for recognizing, classifying, and processing the context and meaning of images and video in a manner similar to human intuitive understanding of such context and meaning. Images and video would be obtained from a multiplicity of sources, including at least a crowdsourcing portal 3001. Real world data would be gathered from a multiplicity of sources, including at least a deep web extraction engine, relevant to comprehension of the context and meaning contained within the images and video 3002. Image and video processing algorithms would be obtained from an algorithm database 3003. Using the algorithms and real world data, the images and video would be analyzed using at least one machine learning algorithm designed to identify the context and meaning contained in the images and video 3004. Finally, the computer-generated analysis would be subject to human review and correction 3005, improving the machine learning algorithm's accuracy in future analyses.

Figure 33:
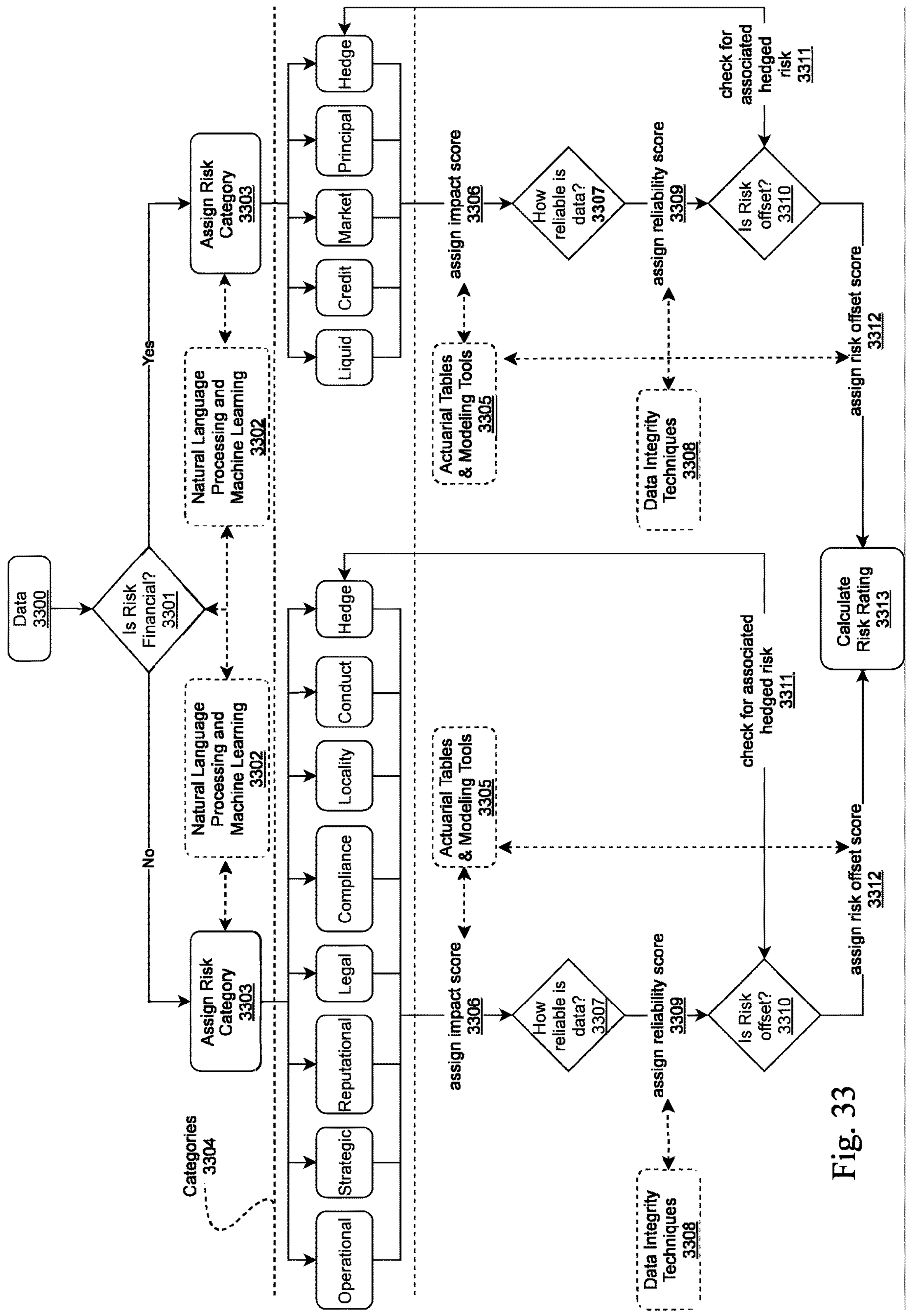
FIG. 33 is a flow diagram illustrating an exemplary method for a corporate risk profiling and rating platform algorithm.

FIG. 33 is a flow diagram illustrating an exemplary algorithm for a corporate risk profiling and rating platform. Each data point 3300 enters the risk rating engine 3111 and is processed using natural language processing and machine learning 3302 to determine if the relation is risk adverse and to what degree and category. The system first determines whether the data relating to the entity in question (from the search query 3120) is financial in nature 3301. The next step in the process is to assign a risk category 3303. This is critical as each category 3304 is weighted based on the impact the type of risk would have on the entity. This may be calculated several ways such as using actuarial tables and other modeling tools 3305. The category 3304 and score 3306, being stored in respective data structures, are held until completion of every iteration of the algorithm.

The next step 3307 is to adjust the impact score 3306 by assigning a reliability score 3309 based on data integrity techniques 3308. The more data points, verified sources, and observational relations 3308 the higher the score; alternatively, less points, unverified data, or inferred relations 3308 lessen the numerical value of the score 3309. Next, every data point 3300 is offset 3310 by previously identified and associated hedged risks 3311 and further assigned 3312 a numerical value based off modeling tools 3305. Any future identified hedged risk associated with an already calculated non-hedged risk is recalculated. Finally, the scores are summed 3313 and a score is generated.

As an example of the application of the algorithm, imagine the system to be configured to output a score within a scale from negative fifty (−50) to positive fifty (+50) where −50 is the greatest level of risk and +50 being the least amount of risk. Consider further, the algorithm determined from historical Internet data that a manufacturing plant, a main asset of the company in question, is in a location stricken with hurricanes. Where hurricanes are statistically more likely to occur within 50 miles of the plant every 2.5 years. This information would enter the system and likely be determined to be a non-financial risk and categorized as a locality risk.

Next, the impact of the hurricane risk, determined by actuarial tables and probabilistic historical models, is assigned negative thirty (−30), because of the probable burden the risk would have for the future of the company. Next, since the historical data is accurate, the reliability of it is high; although weather predictions being what they are, the future reliability is negative. So, the system determines the reliability score to be negative five (−5), near neutral. This decreases the score to negative thirty-five (−35). The score decreased because negatively impacting data was found to be mostly reliable. If the data point were a hedged risk or asset, the reliability score would be a positive number. Upon reaching the next stage, the system previously processed proprietary data which shows the company has successfully traded hurricane options on the Chicago Mercantile Exchange Hurricane Index (CMEHI) and avoided any financial or market loss over the past 15 years (comparative analysis via temporospatial graphframes). The system would then assign a risk offset score of positive twenty (+20) bringing the present locality risk category to a total of negative fifteen (−15).

This algorithm may iterate over every data point and sum the total risk ratings from all categories into a single score presented to the user. Advanced insight and further details into the risks and relations can be seen by the associated knowledge graph also generated by the system 3110.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 34:
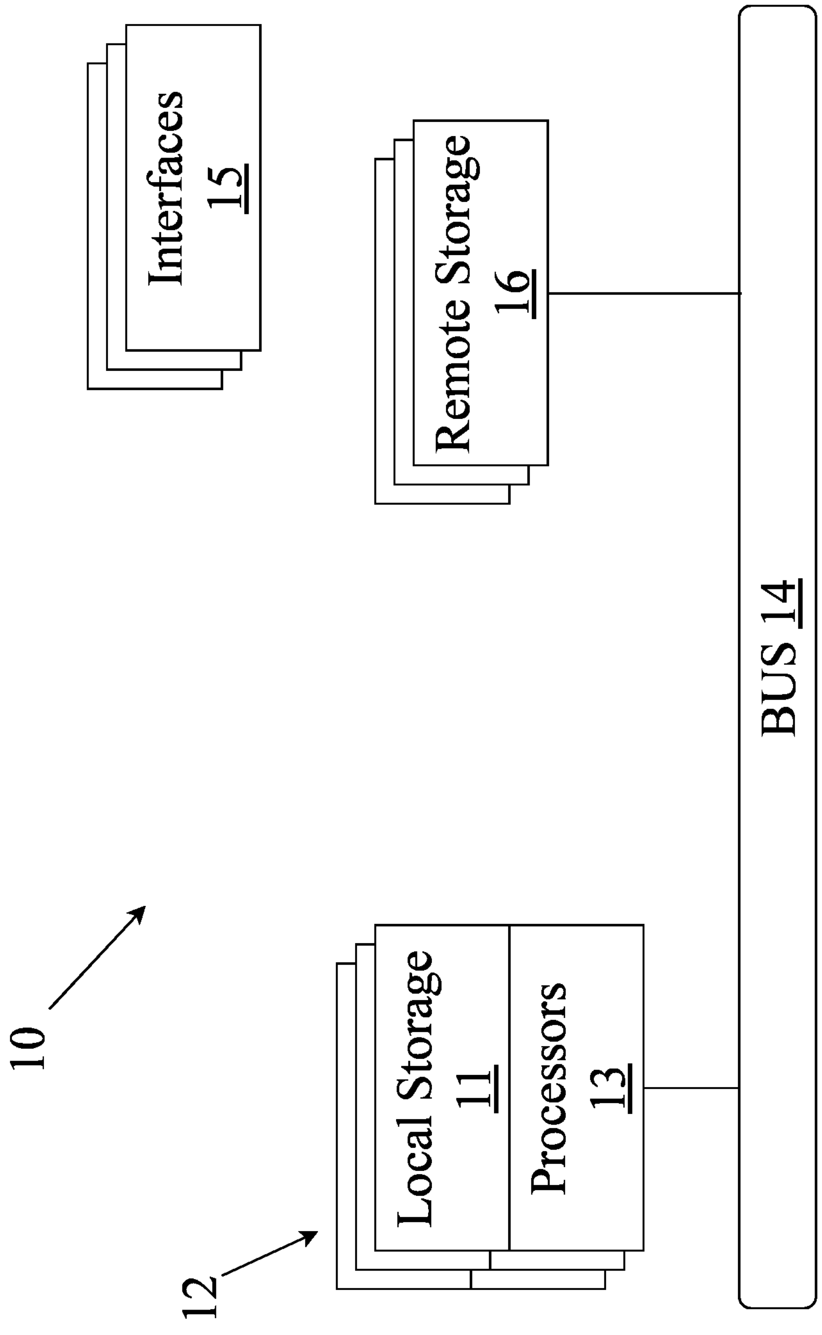
FIG. 34 is a block diagram illustrating an exemplary hardware architecture of a computing device.

Referring now to FIG. 34, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software-or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (Wi-Fi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 34 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and “hybrid SSD” storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as “thumb drives” or other removable media designed for rapidly exchanging physical storage devices), “hot-swappable” hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 35:
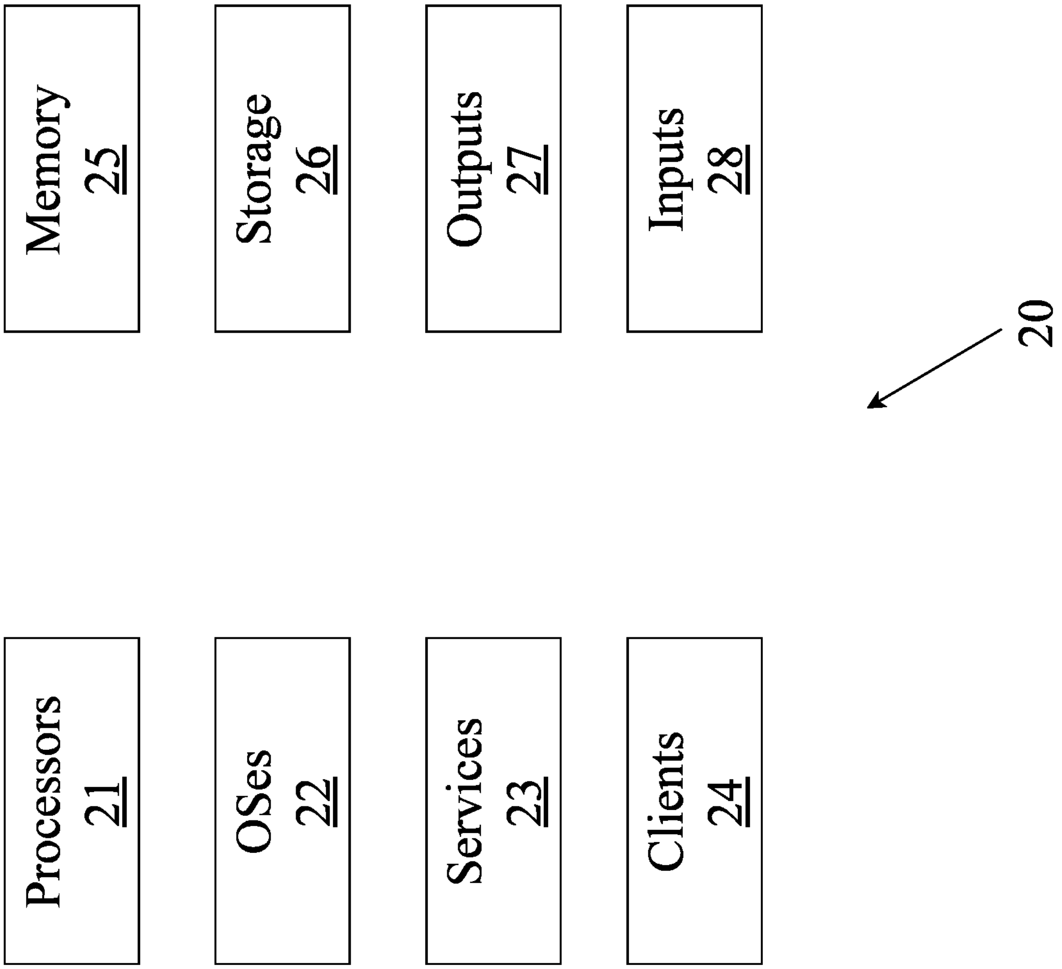
FIG. 35 is a block diagram illustrating an exemplary logical architecture for a client device.

In some aspects, systems may be implemented on a standalone computing system. Referring now to FIG. 35, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20 and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 34). Examples of storage devices 26 include flash memory, magnetic hard drive, CD-ROM, and/or the like.

Figure 36:
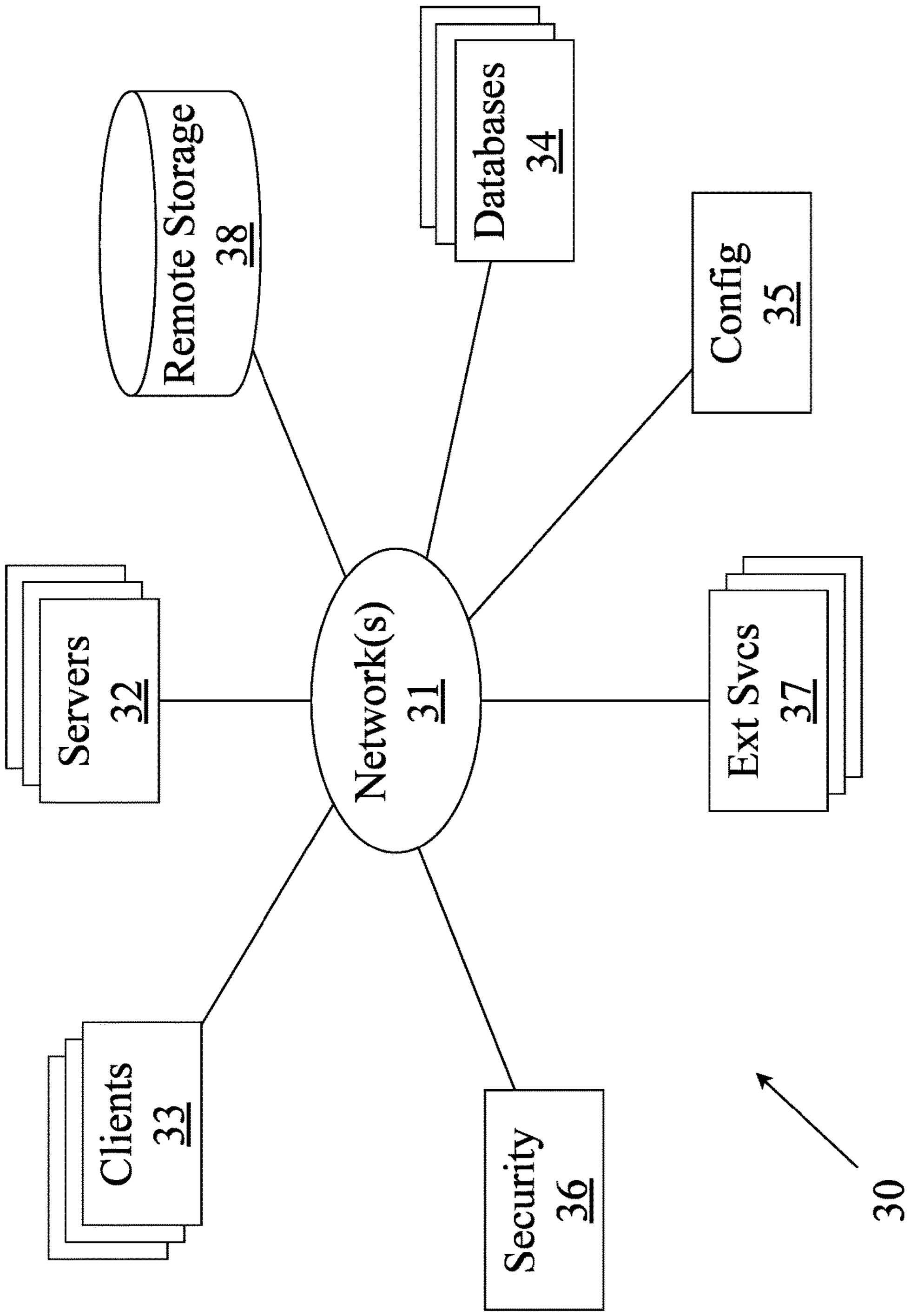
FIG. 36 is a block diagram illustrating an exemplary architectural arrangement of clients, servers, and external services.

In some aspects, systems may be implemented on a distributed computing network, such as one having any number of clients and/or servers. Referring now to FIG. 36, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 35. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as Wi-Fi, WiMAX, LTE, and so forth), or a local area network (or indeed any network topology known in the art; the aspect does not prefer any one network topology over any other).

Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and using a wide variety of data access and manipulation means. For example, in various aspects one or more databases in storage 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database," it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 37:
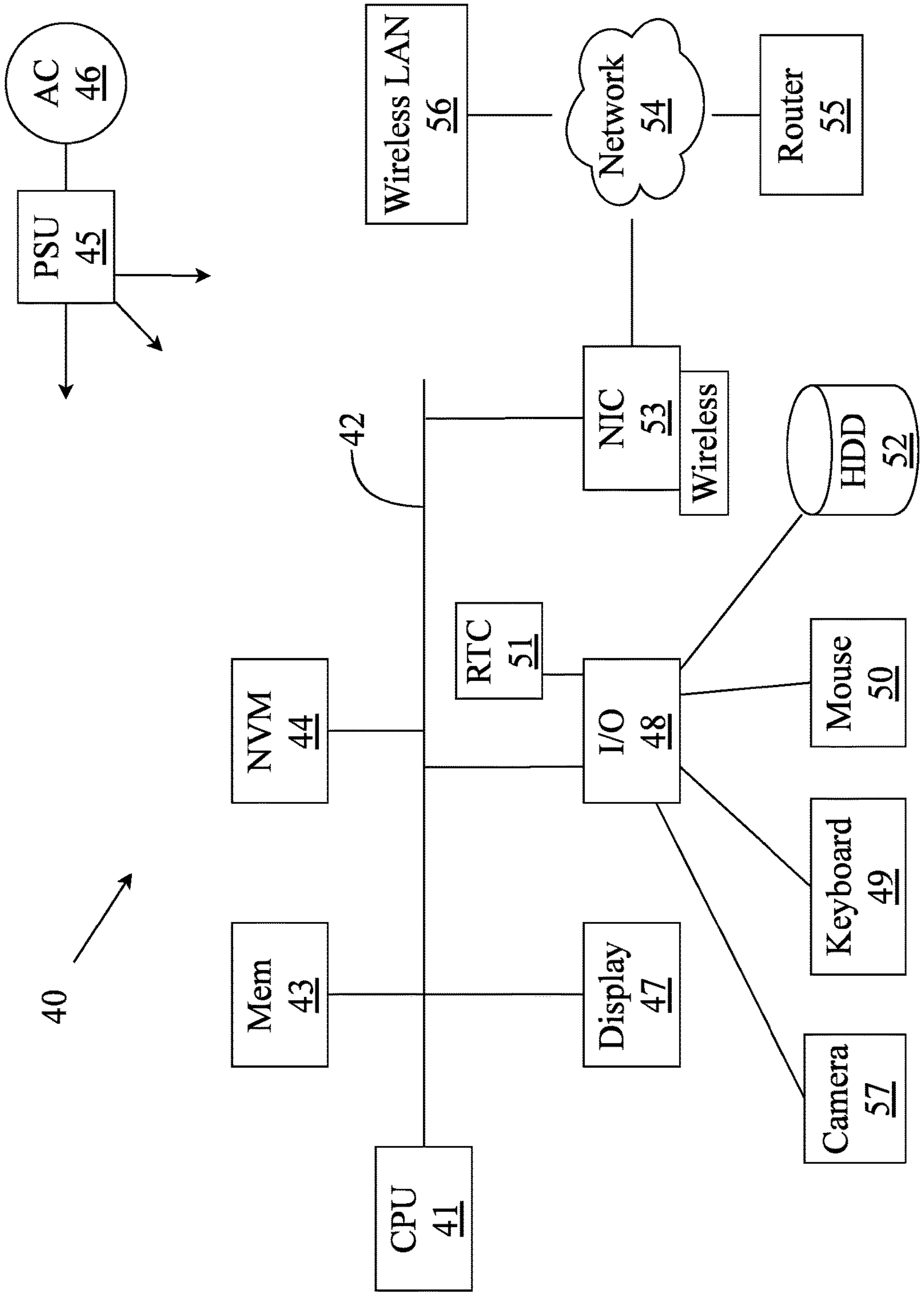
FIG. 37 is another block diagram illustrating an exemplary hardware architecture of a computing device.

FIG. 37 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A computing system for risk profiling and rating of extended relationships using ontological databases employing a cyber decision platform, the computing system comprising:

one or more hardware processors configured for:

processing a natural language query through natural language processing or machine learning to extract a context of the natural language query;

determining whether to construct a new ontological database or utilize an existing ontological database by performing semantic similarity analysis between the extracted context and existing database schemas;

conducting an Internet search for information related to the query and the context using a web scraper tool employing distributed data pipelines with real-time processing capabilities to obtain internet search results, the internet search results comprising spatiotemporal information;

receiving heterogeneous data from third party sources and searching the received heterogeneous data for information related to the query and the context, the result of the search comprising spatiotemporal information;

appending data from the search results with temporal, geospatial, or information-reliability related metadata, wherein the metadata is determined via machine learning;

generating an ontological database or utilizing an existing ontological database of relationships from the search results, the relationships comprising a spatiotemporal dimension generated from the spatiotemporal information;

analyzing the ontological database for query-related information using semantic computing techniques, the query-related information comprising entities, locations, and topics associated with a subject domain;

wherein the ontological database may be of any subject domain or ontological framework;

creating a weighted and directed knowledge graph using graph-based information storage, the weighted and directed knowledge graph comprising nodes representing the entities, locations, and topics associated with the subject domain and edges representing the relationships to the nodes in relation to the subject domain or the associated nodes, wherein:

each node is assigned a risk value based on relationships in the ontological database, the risk value being based in part on a spatiotemporal comparative analysis of the spatiotemporal dimension of the ontological database, wherein the spatiotemporal comparative analysis comprises analyzing temporal data patterns across multiple time periods and correlating geospatial or entity specific risk factors with spatiotemporal or event proximity risk evolution; and each edge is assigned a probability of influence between the nodes to which it is connected using machine learning algorithms;

applying a graph analysis algorithm to identify a plurality of paths within the weighted and directed knowledge graph;

iterating over the nodes and edges in each identified path to determine a probability of occurrence and risk impact associated with that path; and assigning a risk rating to each path identified, based on the probability of occurrence and risk impact associated with that path, wherein the risk rating comprises a numerical score on a customizable scale.

2. The computing system of claim 1, wherein the heterogenous data comprises information obtained from governmental databases, legislative actions, and news reports.

3. The computing system of claim 2, wherein the risk rating is associated with a third-party risk or a fourth-party risk.

4. The computing system of claim 2, wherein the risk rating is associated with an industry-specific risk.

5. A computer-implemented method executed on a cyber decision platform for risk profiling and rating of extended relationships using ontological databases, the computer-implemented method comprising:

processing a natural language query through natural language processing or machine learning to extract a context of the natural language query;

determining whether to construct a new ontological database or utilize an existing ontological database by performing semantic similarity analysis between the extracted context and existing database schemas;

conducting an Internet search for information related to the query and the context using a web scraper tool employing distributed data pipelines with real-time processing capabilities to obtain internet search results, the internet search results comprising spatiotemporal information;

receiving heterogeneous data from third party sources and searching the received heterogenous data for information related to the query and the context, the result of the search comprising spatiotemporal information;

appending data from the search results with temporal, geospatial, or information-reliability related metadata, wherein the metadata is determined via machine learning;

generating an ontological database or utilizing an existing ontological database of relationships from the search results, the relationships comprising a spatiotemporal dimension generated from the spatiotemporal information;

analyzing the ontological database for query-related information using semantic computing techniques, the query-related information comprising entities, locations, and topics associated with a subject domain;

wherein the ontological database may be of any subject domain or ontological framework;

creating a weighted and directed knowledge graph using graph-based information storage, the weighted and directed knowledge graph comprising nodes representing the entities, locations, and topics associated with the subject domain and edges representing the relationships to the nodes in relation to the subject domain or the associated nodes, wherein:

each node is assigned a risk value based on relationships in the ontological database, the risk value being based in part on a spatiotemporal comparative analysis of the spatiotemporal dimension of the ontological database, wherein the spatiotemporal comparative analysis comprises analyzing temporal data patterns across multiple time periods and correlating geospatial or entity specific risk factors with spatiotemporal or event proximity risk evolution; and each edge is assigned a probability of influence between the nodes to which it is connected using machine learning algorithms;

applying a graph analysis algorithm to identify a plurality of paths within the weighted and directed knowledge graph;

iterating over the nodes and edges in each identified path to determine a probability of occurrence and risk impact associated with that path; and assigning a risk rating to each path identified, based on the probability of occurrence and risk impact associated with that path, wherein the risk rating comprises at least a numerical score on a customizable scale.

6. The computer-implemented method of claim 5, wherein the heterogenous data comprises information obtained from governmental databases, legislative actions, and news reports.

7. The computer-implemented method of claim 6, wherein the risk rating is associated with a third-party risk or a fourth-party risk.

8. The computer-implemented method of claim 6, wherein the risk rating is associated with an industry-specific risk.

9. A system for risk profiling and rating of extended relationships using ontological databases employing a cyber decision platform, comprising one or more computers with executable instructions that, when executed, cause the system to:

process a natural language query through natural language processing or machine learning to extract a context of the natural language query;

determine whether to construct a new ontological database or utilize an existing ontological database by performing semantic similarity analysis between the extracted context and existing database schemas;

conduct an Internet search for information related to the query and the context using a web scraper tool employing distributed data pipelines with real-time processing capabilities to obtain internet search results, the internet search results comprising spatiotemporal information;

receive heterogeneous data from third party sources and search the received heterogeneous data for information related to the query and the context, the result of the search comprising spatiotemporal information;

append data from the search results with temporal, geospatial, or information-reliability related metadata, wherein the metadata is determined via machine learning;

generate an ontological database or utilizing an existing ontological database of relationships from the search results, the relationships comprising a spatiotemporal dimension generated from the spatiotemporal information;

analyze the ontological database for query-related information using semantic computing techniques, the query-related information comprising entities, locations, and topics associated with a subject domain;

wherein the ontological database may be of any subject domain or ontological framework;

create a weighted and directed knowledge graph using graph-based information storage, the weighted and directed knowledge graph comprising nodes representing the entities, locations, and topics associated with the subject domain and edges representing the relationships to the nodes in relation to the subject domain or the associated nodes, wherein:

each node is assigned a risk value based on relationships in the ontological database, the risk value being based in part on a spatiotemporal comparative analysis of the spatiotemporal dimension of the ontological database, wherein the spatiotemporal comparative analysis comprises analyzing temporal data patterns across multiple time periods and correlating geospatial or entity specific risk factors with spatiotemporal or event proximity risk evolution; and each edge is assigned a probability of influence between the nodes to which it is connected using machine learning algorithms; and apply a graph analysis algorithm to identify a plurality of paths within the weighted and directed knowledge graph;

iterate over the nodes and edges in each identified path to determine a probability of occurrence and risk impact associated with that path; and assign a risk rating to each path identified, based on the probability of occurrence and risk impact associated with that path, wherein the risk rating comprises at least a numerical score on a customizable scale.

10. The system of claim 9, wherein the heterogenous data comprises information obtained from governmental databases, legislative actions, and news reports.

11. The system of claim 10, wherein the risk rating is associated with a third-party risk or a fourth-party risk.

12. The system of claim 10, wherein the risk rating is associated with an industry-specific risk.

13. Non-transitory, computer-readable storage media having computer-executable instructions embodied thereon that, when executed by one or more processors of a computing system employing a cyber decision platform for risk profiling and rating of extended relationships using ontological databases, cause the computing system to:

process a natural language query through natural language processing or machine learning to extract a context of the natural language query;

determine whether to construct a new ontological database or utilize an existing ontological database by performing semantic similarity analysis between the extracted context and existing database schemas;

conduct an Internet search for information related to the query and the context using a web scraper tool employing distributed data pipelines with real-time processing capabilities to obtain internet search results, the internet search results comprising spatiotemporal information;

receive heterogeneous data from third party sources and search the received heterogeneous data for information related to the query and the context, the result of the search comprising spatiotemporal information;

append data from the search results with temporal, geospatial, or information-reliability related metadata, wherein the metadata is determined via machine learning;

generate an ontological database or utilizing an existing ontological database of relationships from the search results, the relationships comprising a spatiotemporal dimension generated from the spatiotemporal information;

analyze the ontological database for query-related information using semantic computing techniques, the query-related information comprising entities, locations, and topics associated with a subject domain;

wherein the ontological database may be of any subject domain or ontological framework;

create a weighted and directed knowledge graph using graph-based information storage, the weighted and directed knowledge graph comprising nodes representing the entities, locations, and topics associated with the subject domain and edges representing the relationships to the nodes in relation to the subject domain or the associated nodes, wherein:

each node is assigned a risk value based on relationships in the ontological database, the risk value being based in part on a spatiotemporal comparative analysis of the spatiotemporal dimension of the ontological database, wherein the spatiotemporal comparative analysis comprises analyzing temporal data patterns across multiple time periods and correlating geospatial or entity specific risk factors with spatiotemporal or event proximity risk evolution; and each edge is assigned a probability of influence between the nodes to which it is connected using machine learning algorithms; and apply a graph analysis algorithm to identify a plurality of paths within the weighted and directed knowledge graph;

iterate over the nodes and edges in each identified path to determine a probability of occurrence and risk impact associated with that path; and assign a risk rating to each path identified, based on the probability of occurrence and risk impact associated with that path, wherein the risk rating comprises at least a numerical score on a customizable scale.

14. The system of claim 13, wherein the heterogenous data comprises information obtained from governmental databases, legislative actions, and news reports.

15. The system of claim 14, wherein the risk rating is associated with a third-party risk or a fourth-party risk.

16. The system of claim 14, wherein the risk rating is associated with an industry-specific risk.

* * * * *